US005870720A

United States Patent [19]

Chusid et al.

[11] Patent Number: 5,870,720

[45] Date of Patent: Feb. 9, 1999

[54] METHOD FOR IMPLEMENTING A RESTRUCTURING EXCHANGE OF AN EXCESSIVE UNDIVIDED DEBT

[76] Inventors: Candee B. Chusid, 404 E. 66th St., New York, N.Y. 10021; Julia M. Whitehead, 9 E. 96th St., New York, N.Y. 10128

[21] Appl. No.: 260,211

[22] Filed: Jun. 15, 1994

[51] Int. Cl.[6] .......... G06F 17/60

[52] U.S. Cl. .......... 705/38; 705/35

[58] Field of Search .......... 364/408, 401; 705/35, 38, 30

[56] References Cited

U.S. PATENT DOCUMENTS

| | | | |
|---|---|---|---|
| 4,346,442 | 8/1982 | Musmanno . | |
| 4,648,038 | 3/1987 | Roberts et al. . | |
| 4,750,119 | 6/1988 | Cohen et al. . | |
| 5,323,315 | 6/1994 | Highbloom | 705/38 |

*Primary Examiner*—Edward R. Cosimano
*Assistant Examiner*—Barton L. Bainbridge
*Attorney, Agent, or Firm*—Sofer & Haroun, LLP

[57] ABSTRACT

A method for restructuring an excessive underlying mortgage in excess of its current market value so that the value of the restructured underlying mortgage and the property to which it attaches exceeds the values prior to the restructuring. The method determines an existing underlying mortgage utilizing parameters which include a principal amount, a maturity date, an interest rate and payment periods. Thereafter, a first market value mortgage portion, which is substantially equal to the current mortgage value of the existing mortgage, and a second excess portion, which is the difference between the remaining principal balance of the existing underlying mortgage and the first market value portion, is determined. As such, the existing underlying mortgage is transferred into or replaced by the first market value portion and the second excess portion so that the principal of the remaining underlying mortgage is, in a most preferred form of the invention, substantially the same as the total of the principals of the first market value portion and the second excess portion. Thereafter, each shareholder's amount and percentage of liability in respect of the assessment in accordance with the number of shares owned by each shareholder is calculated.

11 Claims, 6 Drawing Sheets

METHOD FOR IMPLEMENTING A RESTRUCTURING EXCHANGE OF AN EXCESSIVE UNDIVIDED DEBT

FIELD OF THE INVENTION

The present invention is directed to a method of restructuring an excessive or over leveraged underlying mortgage on an asset with the value of the restructured underlying mortgage exceeding the values existing prior to the restructuring.

BACKGROUND OF THE INVENTION

Disclosed herein is a method for restructuring existing debt obligations on over-leveraged assets such as real property, whereby an existing obligation or mortgage is restructured or replaced by two-tier financing in which the first tier is a conventional first mortgage in an amount supported by current conservative lending standards. This first tier conventional first mortgage is referred to herein as the "Market Value Mortgage" or "MVM".

The second tier financing, which may take the form of a second mortgage or a portion of the first mortgage, is supplemented by separate debt, herein referred to as an assessment, imposed by the corporation on all of the asset's owners or shareholders ("shareholders") on the basis of their individual pro rata ownership portions of the asset. As used herein, the term "second mortgage" is intended to denote another or additional mortgage, and is not intended to refer to a mortgage that is secondary to another such that the rights of the mortgagee are inferior or subject to the rights of a mortgagee of another mortgage instrument. The second mortgage and assessment may be amortized over the same term of the first tier loan with the amortization paid by each shareholder on a fixed periodic basis. This second tier, excess or over-leveraged portion is referred to herein as a "Re-Equitizing Super-Secured Mortgage" or "RSM". The most important features of the RSM is that the assessment which supplements the RSM has separate recourse by the corporation to the individual shareholders, making the instrument more valuable to a lender on a risk/reward basis and it is due on sale of a shareholder's interest in the asset upon which it is a lien.

In addition to the implementation of the RSM, the method involves the servicing and collection of both the MVM and RSM assessment components. As each shareholder is obligated to pay on a pro rata basis their RSM assessment which covers debt service on the RSM, such amounts or RSM payment are paid to an escrow account. As such, it is then necessary to both monitor the RSM collections and payments on the RSM, as well as to periodically calculate the interest and balance due after each RSM payment date for each individual shareholder. Additionally, due to the requirement that shareholders pay on sale of their ownership interest in the property, ("units"), the remaining balance of the pro rata RSM mortgage assessment, calculations of amounts due on sale to satisfy unpaid balances on the mortgage reduction assessment must also be preformed periodically. Moreover, once the mortgage modification is in place, shareholders who are attempting to sell their units will be able to inform potential buyers of the carrying costs for the units that will be in effect for new shareholders less the debt service, principal and interest of the RSM. As such, calculations for the new maintenance to be charged a new owner must also be periodically performed.

APPLICATION TO NEW YORK COOP MARKET

As in most cities today, the bulk of residential housing in New York City is in apartment units as opposed to free-standing homes. But in contrast to much of the rest of the country, the dominant form of ownership in New York City is not direct but, rather through a Cooperative Housing Corporation ("Coop"), a corporation that owns the land and building upon which it is situated and that issues shares of its stock in blocks to purchasers together with proprietary leases appertaining to specific individual apartments in the building.

Although some Coops were formed around new construction, the majority of Coops represent "conversions" from already occupied rental housing. An important aspect of the conversion process is its ability to be carried out under applicable legal guidelines which create a limited exception to the rent regulatory laws for conversion of occupied housing to Cooperatives, specifically providing continuing rent regulatory protection for units occupied by tenants in occupancy who choose not to purchase but excepting the remaining units from rent regulation.

In a conversion, a "Sponsor", who could be the existing rental property owner or some new individual or entity, essentially arranges for the purchase of the property by the Coop. Among other things, the Sponsor sells shares to existing rental tenants who buy their shares (referred to as "sold shares" after their purchase) at inside or discounted prices to induce them to forgo their rent regulatory status and arranges financing for the Cooperative to fund the purchase of the building.

At the conversion closing, the Coop takes title subject to this financing or underlying mortgage which is secured by a first lien on the land and building and the Coop's interest in the shares and the proprietary leases that it issues to individual shareholders. Coop shareholders are responsible to the Coop for the payment of monthly rent, called maintenance, which covers each unit's proportionate share of a combination of the building's operating expenses and the debt service on the underlying mortgage. The Coop has a first lien on the shareholders' interest in the shares and the leases allocated to apartments to secure the payment of maintenance and other assessments imposed by the Coop's Board of Directors. Coop shareholders are also individually responsible for the servicing of mortgages that they may independently secure to finance their share purchase ("share" or "end" loans), which are in turn secured by a second lien on the shareholder's interest in his shares and the proprietary lease in the Coop. However, Coop shareholders are not individually liable for the underlying mortgage.

In the case of non-purchasing rental tenants, the sponsor usually continues to own the shares pertaining to such units ("unsold shares") until such time as the units are either vacated, thus freeing them to be sold to outsiders, or sold, still occupied by rental tenants, to other investors who continue to own them as unsold share units. An important aspect of unsold share units is the fact that the rents paid by the rent-regulated tenants occupying them are often insufficient to fully fund the units' maintenance costs; the resulting deficit or "shortfall" must be covered by the owner of the unsold shares.

With the rapid run-up in real estate prices through the mid-nineteen eighties, the conversion business yielded enormous profits for Coop sponsors and lenders. However, the euphoria which dominated this market was replaced by near panic when the subsequent freefall in real estate prices caused the easy money and aggressive sponsor/investor interest of the nineteen eighties to be replaced by notably higher lending standards and numerous sponsor defaults.

The tightening of lending standards, in conjunction with the sharp drop in overall market values, has had a dramatic and pervasive impact on Coop lending since together they have decreased the amounts lenders are willing to lend by as much as 50% from peak values, leaving large numbers of Coops in a significantly excess state when evaluated by current lending standards. Specifically, when the building was first converted, mortgages on the building's past value where obtained. However, with the precipitant decrease of building values, the prior existing mortgages in some instances now exceed the present value of the building. In addition, many of these excess Coops have other characteristics, some of which had been deemed acceptable in a more buoyant real estate climate, that further weaken their standing with lenders including, by way of example, high sponsor participation; shortfalls on unsold shares; share loans on sponsor unsold shares; RTC or FDIC ownership of, or liens on, unsold shares; and physical problems with the asset or property.

The excess state and severe tightening of lending criteria are the source of numerous problems for Coops and their shareholders.

First, Coops that are facing maturity of their existing mortgages find that they no longer qualify for financing in the amount of their current debt, placing them in a precarious and untenable position when their mortgage matures.

Second, shareholders of these Coops find that the market value of their units has fallen far below that which had been expected due to the overall real estate market decline. As a consequence, many of today's potential Coop buyers, acutely aware of the money lost in New York Coops over the past few years, are reluctant to consider buildings which bear any indicia of distress such as, large percentages of unsold shares, shortfalls on sponsor or investor-held unsold share units, over-leverage and the high maintenance charges which result from excessive debt service requirements. Shareholders in such buildings often find that they can only sell their units, if at all, by discounting the price substantially below market levels which are already 25% to 30% lower than the nineteen-eighties peak. And when they do agree to sell at a heavily discounted price, they often find that the buyer is unable to secure necessary financing to complete the transaction because lenders are unwilling to make end loan mortgages on the Coop shares.

Third, as individual shareholders find it difficult to sell their units, the entire Coop may be drawn into a downward spiral as some or all such shareholders default on one or both of their maintenance and mortgage payments, further clouding the financial profile of the building. And when the defaulting shareholder is a sponsor or investor, the problems become particularly acute because of the general unsalability of unsold shares, leaving the remaining shareholders additionally liable for the shortfall on those unsold shares on a near-permanent basis.

The situation is further aggravated by a fundamental mismatch between the supply and demand for capital. On the supply side, many traditional Coop lenders have exited from the market as a result of new or higher capital requirements on mortgage lending and/or strategic decisions to reduce real estate exposure because of losses sustained from over-exuberant lending of the past. And as they have left, new capital sources have been slow to develop. The demand for capital, however, remains high because most Coop loans are extended for relatively short terms, thus creating a relatively constant need for new financing as these mortgages come due. In order to eliminate these problems, the underlying mortgage must accordingly be restructured.

In the prior art, such restructuring has involved either the forgiveness of a portion of the debt, lowering of the interest rate on the mortgage (usually to a below market level), for a short period of time, extending of the term of the mortgage, assessing shareholders for all or a portion of the mortgage or instituting foreclosure proceedings so as in order to liquidate the assets. However, for reasons that are plainly evident, these currently practiced restructuring options are not beneficial to the mortgagor or mortgagee.

It is, therefore, an object of the present invention to provide a method for restructuring an existing excessive underlying debt obligation, so that the value of the restructured underlying debt obligation and the property on which the debt obligation is attached, exceeds the values existing prior to the restructuring.

A further object of the invention is to provide a method for restructuring and deleveraging Coops while restoring liquidity and rebuilding the value and marketability of the individual apartment units of the over-leveraged Coops.

Another object of the invention is to provide a pass through mechanism which credit-enhances the RSM with divisible assessments (consisting of a secured first lien with recourse) imposed against shareholders' individual leases and apartment shares, which are in addition to the existing undivided first mortgage lien on the land and building by which the MVM and RSM are already backed together with the corporation's interest in its issued (and unissued) shares and leases. By providing such additional collateral, and securing it to the RSM, the RSM assessment ranks ahead of any individual bank end loan.

A further object of the invention is to allow the RSM to fully amortize over its term at pricing which is only slightly higher, than the applicable MVM rate.

Another object of the invention is to obligate shareholders to prepay their unamortized share of the RSM upon the sale of their units, which in practice allows the RSM to amortize in less than its full term thereby providing the lender with yields based upon longer term instruments.

Another object of the invention is to enable existing shareholders to market their units with a lower maintenance cost than that which existed pre-restructuring.

A further object of the invention is to increase the amount that a new buyer will pay the seller for the units by achieving a reduction in maintenance and allocable share of the underlying mortgage for the unit.

Another object of the invention is to eliminate the over-leverage penalty associated with excess Coops and that the market typically imposes for heavily debt-laden units in excess of the pure economic value of the debt.

An additional object of the invention is to reduce both the maintenance charged to new purchasers of individual shareholder units and the purchaser's share of the underlying mortgage.

A further object of the invention is to enhance the financial status of the building by requiring the amortization of the RSM, the building's excess leverage, and assuring all shareholders that the building will be financeable by traditional lenders by the end of the mortgage term, even in the absence of a real estate market recovery.

These and other objects of the invention are accomplished by providing a data processing system which evaluates a number of different data utilized in restructuring the excess underlying mortgage. Specifically, the system evaluates the underlying mortgage utilizing parameters such as the principal amount, the maturity date, the interest rate and the payment period. Based on this data, the system then creates a report showing the principal repayments and interest payments for the existing underlying mortgage.

As well, this system evaluates the RSM amount based on the existing underlying mortgage and the current market value mortgage with the system establishing the MVM principal repayment schedules and interest payments based on a number of data inputted into the data processing system. This data includes the MVM interest rate, term, amortization and other payment terms as well as any prepayment penalties. Additionally, the data processing system also establishes the RSM principal and interest payment schedule for the entire building. As such, the system determines the RSM principal and interest payment schedule based on a number of data including the interest rate, term, amortization and other payment terms as well as prepayment penalties for the RSM.

Additionally, the data input system determines each shareholder's total assessment in respect of the RSM on both a per share and per unit basis utilizing a number of building parameters such as the number of shares, the number of units and the number of shares per unit as well as the total RSM payment. Based on this information, the system determines a shareholder's monthly assessment in respect of the RSM on a per unit basis as well as provides the shareholder with a monthly amortization schedule for the RSM.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims.

SUMMARY OF THE INVENTION

In accordance with the invention, disclosed herein is a method for restructuring an excessive underlying mortgage on an asset with the value of the restructured underlying mortgage and the property to which the debt obligation is attached exceeding the value prior to the restructuring. Typically, the asset may be real estate or securities with the asset being owned by a plurality of shareholders each owning at least one share of a multiplicity of shares in the asset and each shareholder paying a periodic assessment covering this pro rata share of the assets carrying costs.

Specifically, in accordance with the invention, an using the aforedescribed Coop by way of example, the existing mortgage is restructured or replaced by two tier financing, the first tier being a conventional first mortgage in an amount supported by current conservative lending standards. The second tier financing, which may for example be a second mortgage or a portion of the first mortgage, is structured as a mortgage and is supplemented by an assessment on all shareholders on a per share per unit basis and usually amortized over the term of the first tier loan, with the amortization paid by each shareholder along with their normal monthly maintenance as a separate special assessment. Additionally, the second tier mortgage provides the terms of the imposition and repayment of the assessment, imposed by the Coop board, with individual recourse by the Coop to the shareholders, thereby enhancing the value of the instrument to a lender on a risk/reward basis.

Thus, in a preferred method for restructuring and servicing a debt obligation, the existing debt obligation on the mortgage is replaced through division into two component parts: a Market Value Mortgage, which portion of the loan is consistent with conservative current lending standards and valuations; and a Re-Equitizing Super-Secured Mortgage portion, which represents that portion of the existing obligation of the underlying mortgage in excess of current lending standards, is a mortgage, and is passed through in addition as a pro rata divisible obligation with recourse to the individual shareholders.

While the MVM is structured along traditional lines, the RSM has three features' in the Coop example, differentiating it from the typical mortgage:

(1) Credit Enhancement—The RSM pass-through mechanism credit-enhances the RSM with divisible assessments (consisting of a secured first lien with recourse) imposed by the Coop in a fixed principal amount against the shareholder's individual leases and apartment shares under the terms of the mortgage which are in addition to the existing undivided first mortgage lien on the land and the building by which the MVM and RSM are already backed. This assessment constitutes additional collateral (doubly secured or super-secured) and its imposition in such fixed amount against a shareholder's interest in its shares and lease, allows the RSM to rank ahead of any individual bank end loan lien on such shares and lease. The fact that the RSM has individual recourse by the Coop to shareholders makes the RSM more valuable to a lender on a risk/reward basis than a traditional, nonrecourse mortgage as the RSM is then backed by the equity of the shareholder in its shares and leases.

(2) Yield Enhancement—The RSM is scheduled, in most cases, to fully amortize over its term at pricing which is about 75 basis points higher than the applicable MVM rate. However, as prepayment is permitted (a shareholder selling his shares must pay off his portion of the RSM at the closing of the sale by the seller), in practice the RSM will likely amortize in less than its full term yet provide the lender with yields based on longer term instruments.

(3) Liquidity and Market Value Improvement Through Due On Sale Clause—The RSM structure obligates individual shareholders to prepay their unamortized share of the RSM upon sale of the units, enabling existing shareholders to advertise their units for sale at a lower maintenance and allocable share of the building's mortgage corresponding to the RSM which will be paid off by the seller at closing. The reduced maintenance and debt reduction increases the amount that a new buyer will be willing to pay the seller for the unit. Additionally, since the market typically imposes a penalty for a heavily debt-laden unit in excess of the pure economic value of the debt, the seller can usually more than recoup the RSM "due on sale" payment because the selling price obtained instantly reflects the elimination of much or all of the over-leverage penalty.

SPECIFIC COOP APPLICATION

Coop buildings can be divided into three categories on the basis of a building's underlying mortgage. These categories are: CATEGORY I—Performing Coops; CATEGORY II—Performing, Non-Performing Coops; and CATEGORY III—Non-Performing Coops. The application of the RSM is essentially the same in each loan category, which are explained below.

CATEGORY I—Performing Loans-80–100% Sold Coop, No Problems

Typically, Category I Coops are the most creditworthy borrowers, with low loan to value requirements. Additionally, the spread over U.S. Treasuries is approximately 150 to 175 basis points. Borrowers in this category face none of the issues described above and have little or no difficulty with respect to either their underlying financing or the resale of their shares.

CATEGORY II—Performing, Non-Performing Loans-65–100% Sold, Over-leverage/Some Problems Category II Coops are financially stable, performing Coops whose underlying mortgages exceed current conservative loan-to-value ratios or which have other characteristics, usually related to sponsor units, that are considered risks in today's tougher lending environments. As such, the rate spread is about 200–250 basis points over U.S. Treasuries to as much as 275–400 basis points over corresponding Treasuries, if available.

In some cases, Coops in this second category are able to obtain financing from still aggressive lenders, albeit at the very high rates noted above. Many others, however, are unable to attract any lender interest. These Coops generally attempt to negotiate loan extensions from their existing lenders for short periods at high spreads plus credit enhancements and accruals and a variety of other restrictions on their operations and shareholders.

These extensions, however, only postpone the day of reckoning since the dramatic improvements in real estate values required to make these loans perform are extremely unlikely in the time granted by the lender. And, of course, these solutions do nothing to help shareholders who typically experience tremendous difficulty in selling their units given the over-leverage.

Category III—Non-Performing or Otherwise Unfinanceable Loans-Less than 50–65% Sold Excess, Severe Problems Category III Coops represent troubled buildings, usually those suffering sponsor defaults, and which are themselves in technical or financial default on their mortgage obligations. As such, many such loans have become unfinanceable solely because of tightened lending criteria which penalizes Coops with shortfalls, high sponsor participation and sublets, etc. even where the loans are performing; others are in actual default. Some of these borrowers receive short-term modifications from their existing lenders, with either sharp cuts in rates for a period of a year or two, or longer-term more minor reductions, generally with the difference between the pay rate and the market rate accrued and added to the principal balance. But it is unlikely that the financeability of these loans will increase over the term of the extension, particularly when the amount owed is increased by the addition of accrued interest.

Other borrowers are unable to come to terms with their lenders and face foreclosure and/or bankruptcy proceedings, which processes only continue to depress prices and eliminate marketability, stability and value.

As application of the RSM is essentially the same in each loan category, CATEGORY I applications, which are the most straightforward and also the one with the lowest risk and return of the three categories will be discussed first.

As noted, Coops in this group are current in their debt service obligations with low or no unsold shares and appear to be healthy in every respect except that their loans and maintenance charges are too high given current standards, resulting in depressed prices for unit resales.

Implementation of the RSM structure is relatively simple since the existing loan is usually repaid in full.

First, the existing Coop underlying mortgage is reviewed to determine the underlying mortgage amount and the principal balance. Next, information required to value and restructure the existing mortgage is required and includes both market value information such as rent roll (amount, categories), sold/unsold share ownership, ownership history, sponsor defaults, current mortgage terms/status, market maintenance and rent levels, rents, sales prices (inside and outside values), recent historical sales and regulated rent history. Thereafter, borrower financial condition information is required. This information includes Coop offering plans and amendments, budget (income/expense) information, audited financials etc. Finally, information concerning the property's physical condition is obtained.

Current mortgage valuation standards are used to determine the portion of the mortgage justified by current lending standards. Such information includes conservative loan to value ratios, required sellout ratios, capitalization rates, interest rates as well as other factors. Once these factors are determined, the portion of the mortgage justified by current lending standards or the Market Value Mortgage is determined. To determine the excess portion of the existing mortgage or "RSM", the MVM is subtracted from the total value of the loan balance. Accordingly, the optimal split of the total mortgage, between the MVM and RSM is determined using traditional mortgage valuation methodologies and analysis of the building's operating expenses and cash reserves, and based on financing terms available for each loan including interest rates, amortization, fees and prepayment penalties. The proposed financing structure is adjusted as necessary to meet Coop Board or lender's preferences with regard to overall debt service.

Using the preliminary MVM/RSM structure, surveys may be conducted canvassing shareholders on their willingness to prepay the proposed RSM prior to the refinancing, and also their estimated year of resale. Based on the upfront prepayment interest, the MVM and RSM may be readjusted to reflect lower going-in leverage. End loan financing can also be arranged to provide the financing for prepayment of the RSM and to establish a lending presence in the building for future refinancing.

Next, security for the loan is created with the MVM having the same security as the existing underlying mortgage. The RSM, also has the same security as for the existing underlying mortgage plus a creation of additional security through the Board of Director's imposition of a special assessment and direct lien on the shareholder's interest in their individual units in the entire principal amount of the RSM allocated on a per share, per unit basis with specific repayment terms. These terms are interest and principal payable monthly over the term by shareholders to the Coop who pay collected amounts periodically to a lender. Additionally, the unpaid balance is due in full on sale of each unit. Also, shareholders may be permitted to prepay their assessment in whole or in part at specified intervals.

Next, mortgage terms are finalized, upfront prepayments by individual shareholders are secured and debt service schedules are set forth for both the MVM and RSM. Schedules are sent out to all shareholders notifying them of the new monthly payment schedules and amounts which would be due on sale for each month of the term of the RSM. These due on sale payments are calculated over the life of the RSM to reflect amortization payments made prior to sale and include the amounts necessary to cover interest charged on payment from closing until the next allowable principal payment date.

As a result of the two part mortgage, the MVM and RSM assessments as well as, the due on sale payments and any other permitted prepayment must be monitored. As well, both the MVM and RSM lender must be paid according to the lender's terms. Moreover, the annual tax deductions allowed for the mortgage interest reduction reflecting the RSM and MVM assessments must be calculated. For the RSM, a lower per share allocation of overall Coop interest paid, for those units which have paid off their balance of the RSM assessment, must be taken into account.

Finally, on each prepayment date, the lender is notified of prepayments which will be made as a result of: (1) monthly amortization under the RSM, and (2) RSM payments made by selling shareholders or non-selling shareholders as allowed by the terms of the RSM. In addition, new monthly interest payments due from the Coop to the RSM lender are reset to reflect any principal reductions.

The next category, Category II: Performing, Non-Performing Coops, lend themselves to higher returns than Category I as a result of their risk and because they usually involve unsold shares owned by the Coop or sponsors/investors participating in the restructuring. These unsold shares can be used to provide additional returns for the lender, consistent with the value the investor brings to the unsold shares (which are often valueless prior to the restructuring) by funding the MVM/RSM restructuring and reducing or eliminating the shortfall on unsold share units. In the event that an interest in unsold shares is not available as additional incentive for the lender, such incentive may be provided from a "flip tax" on the resales which is calculated to reflect market value increases from the restructuring.

The restructuring process follows the same basic steps as are undertaken for Category I loans with three essential differences:

1. The existing mortgage can often be purchased at a discount which enhances returns available to both the Coop and the investor/new lender and may result in debt forgiveness. As a result, negotiations with the existing lender are an important part of the process which may be completed prior to the finalization of the MVM/RSM structure.
2. An incentive compensation structure for the restructuring may be negotiated and calculated with the Coop and/or holders of unsold shares. In situations, where the two are different, for example, where an existing sponsor agrees to pay 10% of the proceeds from the sale of his shares, additional arrangements may have to be made to compensate the sponsor for the reward he is providing in excess of his pro rata share of the Coop's burden.
3. To the extent unsold shares are involved, the sales and marketing of those unsold shares is an important part of the return realization process. This responsibility can be performed separately or in conjunction with the total refinancing package.

The next category, Category III: Non-Performing Coops, require multi-stage restructurings because, in addition to financial problems, their lack of funds has usually caused substantial deferred maintenance which must be completed prior to, or as a part of, the restructuring process. Assessment of physical needs and a plan for addressing them is completed as part of the overall restructuring. Other important elements of these restructurings is the buyout of current mortgage indebtedness, almost always at substantial discount, development of a plan to achieve desired sellout ratios (generally involving marketing to existing tenants based on tiered purchase prices and including arrangement of purchase financing) followed by bulk sale of remaining units. Although in Category II and III applications part of the underlying mortgage may be reduced, overall, the restructured underlying mortgages' total principal balances remains substantially the same as the excessive underlying mortgage prior to the restructuring.

BRIEF DESCRIPTION OF THE DRAWINGS

In the drawings, wherein like reference numerals denote similar elements throughout the several views.

DETAILED DESCRIPTION OF THE PRESENTLY PREFERRED EMBODIMENTS

Figure 1A:
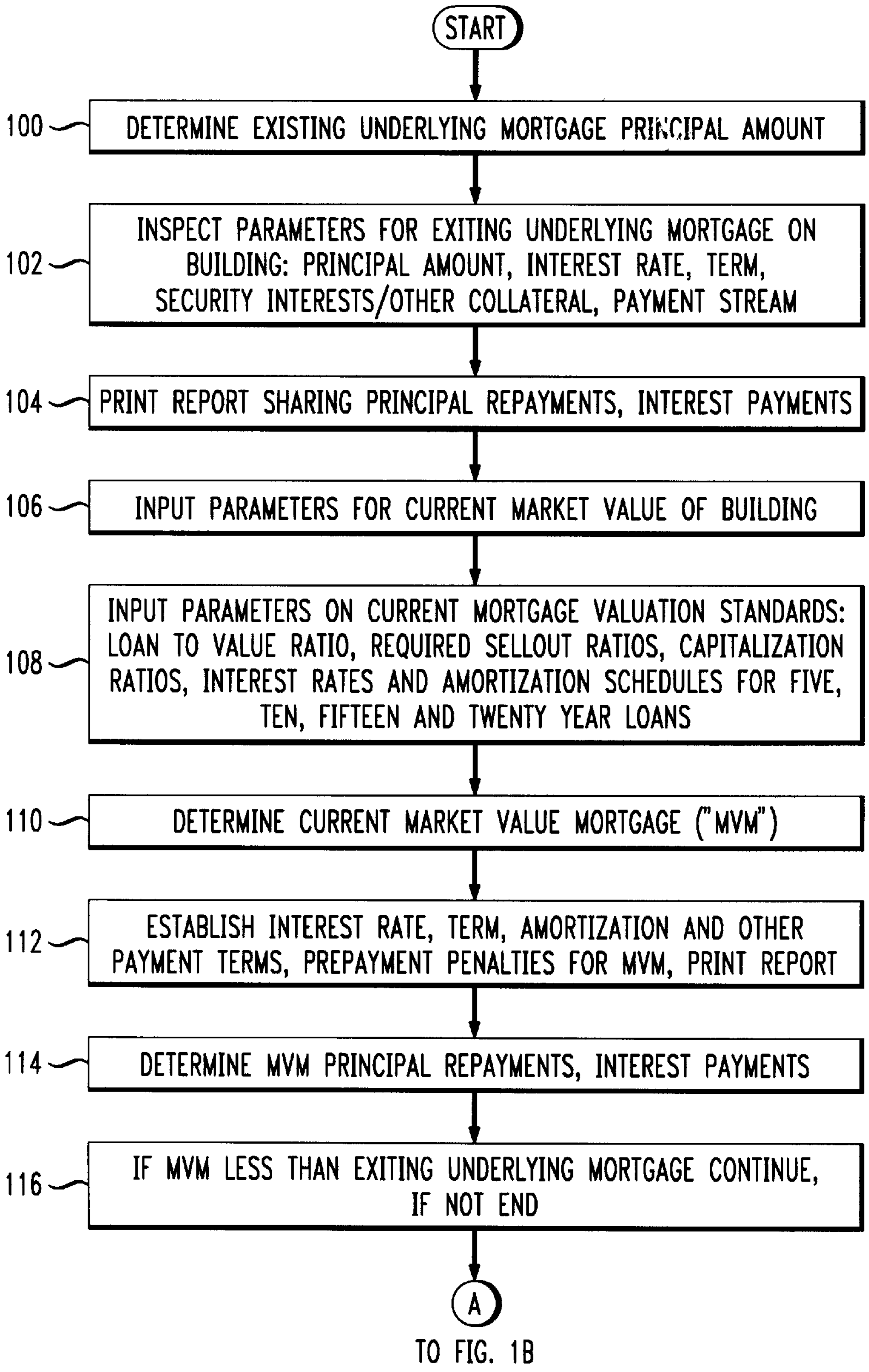
FIGS. 1A, 1B, 1C and 1D are a schematic flow chart depicting the overall methodology and structure of the invention.
Figure 1B:
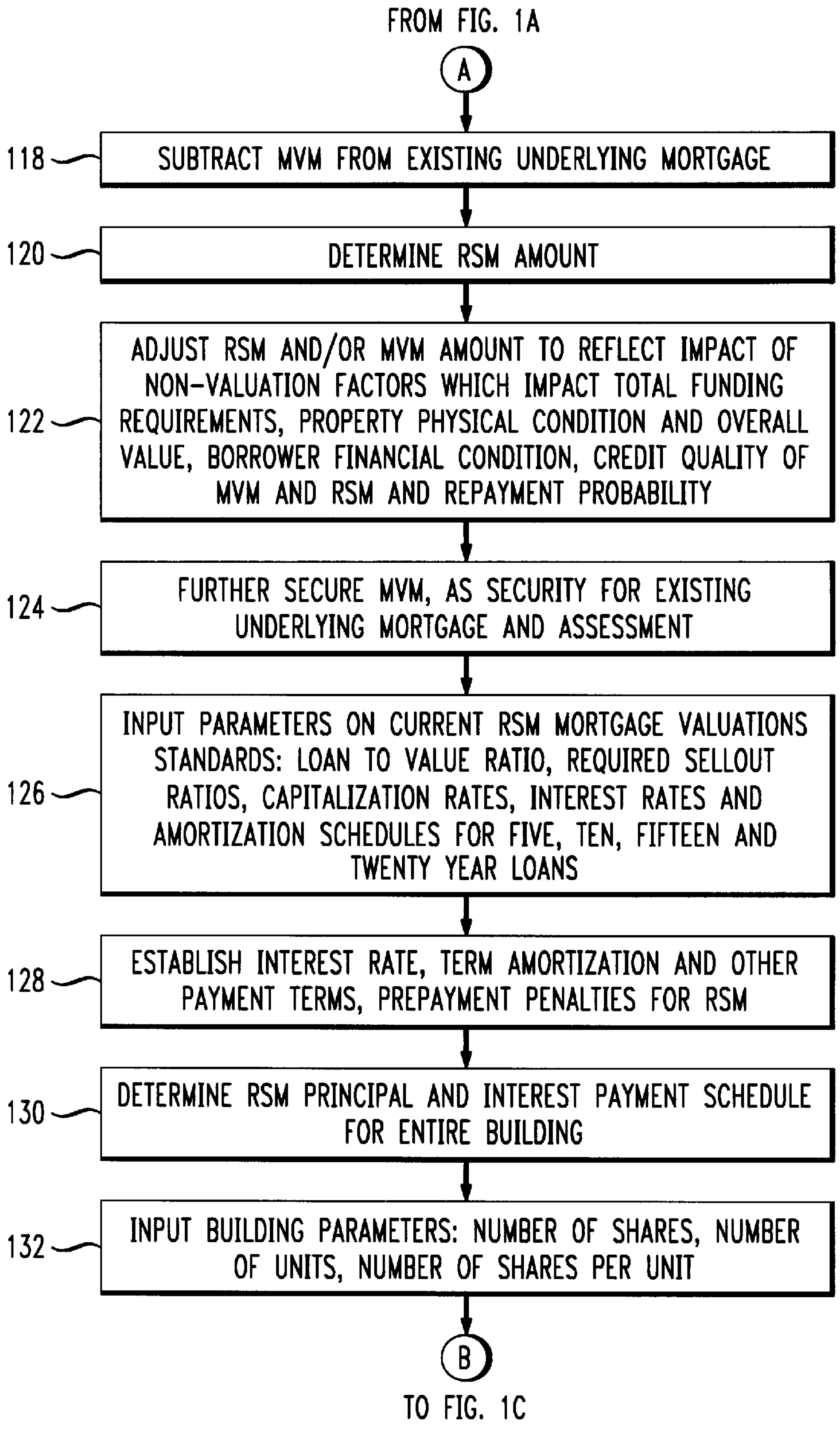

The data processing system for carrying out the invention comprises means for entering the underlying mortgage and the building current market value data, a processing unit for preforming the analysis on the underlying mortgage to determine the first and second portions and the respective principal and interest payments and output means to print the amount of principal and interest payments for both the MVM and RSM.

Additionally, a data processing system is also provided for determining a shareholder's monthly RSM assessment on a per unit basis. This processing system includes means for entering building data and means for entering RSM data concerning a RSM to be analyzed, a processing unit for performing the analysis of the building parameters and the RSM parameters and generating a shareholder's monthly RSM assessment on a per share or a per unit basis and output means to print a report schedule showing amortization and payment for each shareholder.

Furthermore, a data processing system is provided for determining the reduction in the RSM principal balance for a shareholder. This system comprises means for entering RSM and building data, a processing unit for performing the analysis of the RSM in order to determine a shareholder's monthly assessment of the RSM on a per unit basis, data entry means for entering the amount of the RSM assessment received and a processing unit for performing the analysis of the reduction in RSM principal balance. Upon inquiry from the user, the system prints a report on an output means which details the new RSM principal balances and payments as well as the interest paid by the shareholder.

A method for restructuring existing debt obligations on excess assets such as real estate is also disclosed herein. Specifically, the existing obligation or mortgage is restructured or replaced by two-tier financing so that the value of the restructured underlying mortgage and the property to which the debt is attached exceeds the value of the excessive underlying mortgage prior to the restructuring.

As disclosed herein, the method comprises the steps of determining an existing underlying mortgage with the existing underlying mortgage having parameters such as a principal amount, a maturity date, an interest rate and a payment period. As such, the existing underlying mortgage is determined using at least one or more of the existing underlying mortgage parameters. Next, a market value portion of the existing underlying mortgage is determined by substantially equating the first portion with the current market value of the mortgage. The second excess portion is determined as the difference between the remaining principal balance of the existing underlying mortgage and the first market value portion. The second mortgage parameters for defining the second mortgage having a principal balance substantially equal to the second portion, are utilized and include, an interest rate, a maturity date and a payment period. The second mortgage periodic principal and interest payments for the asset are then determined using at least one of the second mortgage parameters. An aggregate principal assessment amount, an amortization schedule and a periodic assessment amount for the second mortgage based on the number of shares owned by the shareholder is calculated.

With the foregoing overview in mind, the detailed operation of the method and system can best be understood by reference to FIGS. 1A–3.

Referring first to FIGS. 1A–1D and as shown in block 100, the existing underlying mortgage principal amount is first determined with data relating to the parameters for the existing underlying mortgage being entered at block 102. Such parameters include the principal amount, interest rate, term, security interests/other collateral and payment stream on the existing underlying mortgage. Based on this data, at block 104, the system generates a report showing principal repayments and/or interest repayments. Flow then continues to block 106 where the parameters for the current market value of the building, which are described in Tables II-A, B and C, are analyzed. Additionally, at block 108, current mortgage evaluation standards and data such as loan to value ratios, required sell out ratios, capitalization rates, interest rates and amortization schedules for 5, 10, 15 and 20 year loans are inputted. In this way, current mortgage valuation standards are used to determine the portion of the mortgage justified by current lending standards. Once these factors are entered, at block 110, the current market value mortgage ("MVM") is determined. At block 112, the interest rate, term, amortization and other payment terms as well as prepayment penalties for the MVM are entered with a printed report showing the principal repayments and interest repayment optionally being generated. As such, at block 114, and as shown in Tables II-A, B and C, the MVM principal repayments and interest repayments are determined. Flow then continues to block 116 which states that if the MVM is less than the existing underlying mortgage, the process continues.

Next, information concerning the excess portion or excess mortgage ("RSM") is required. Accordingly, to determine the excess portion or excess mortgage, at block 118 the MVM is subtracted from the existing underlying mortgage minus any portion of the existing underlying mortgage that may be forgiven by the mortgagee. At block 120 the RSM amount is thus determined. Optionally, at block 122, the RSM and/or the MVM can be adjusted by an amount to reflect the impact of non-valuation factors which impact the total funding requirements or capabilities including the property's physical condition and overall value, the borrower's financial condition, the credit quality of the MVM and the RSM and repayment probability. Accordingly, the optimal split of the total mortgage, between the MVM and the RSM is determined using traditional mortgage valuation methodologies and analysis of the building's operating expenses and cash reserves. Additionally, the proposed financing structure can be adjusted as necessary to meet the objectives of the parties at interest including the Coop board, the lender, shareholders, etc. with regard to overall debt service. Flow then continues to block 124 where the MVM is secured utilizing the same security as for the existing underlying mortgage.

Next, information about the current RSM mortgage valuation standards is inputted into a system. Specifically, at block 126, this data includes loan to value ratios, required sell out ratios, capitalization rates, interest rates and amortization schedules for 5, 10, 15 and 20 year loans. Once this data is entered into a system, at block 128 the interest rate, term, amortization and other payment terms for the RSM is calculated. At block 130 and as shown in Table III, the total RSM principal and interest payment schedule for the entire building is determined.

Flow then continues to block 132 where the building data is inputted into a system. This data which is shown in Tables I-A, B, C and D includes the number of shares, number of units and number of shares per unit. As such, at block 134, each shareholder's total assessment of the RSM on a per share basis is determined.

Thereafter, at block 136, each shareholder's monthly assessment of the RSM on a per share basis is determined. Additionally, at block 138 each shareholder's monthly assessment of the RSM, including allocable interest, on a per unit basis is determined. Thereafter, at block 140, and based on this data, the system generates a monthly amortization schedule for the RSM.

Next, at block 142, additional security for the RSM loan is created with the RSM having the same security as the existing underlying mortgage, plus a creation of additional security through the board of directors' imposition of a special assessment and direct lien in the principal amount of the RSM on the shareholder's interest in their individual units, allocated on a per share, per unit basis with specific repayment terms. These terms are interest and principal which are payable monthly over the term by shareholders to the Coop who pay collected amounts periodically to a lender. At block 142, the system generates amortization, collection and payment schedules based on the above data assuming no due on sale, or other permitted RSM prepayments, have been recorded. As well, at block 146, monthly for each shareholder, the system generates new monthly maintenance and RSM assessment payments. At block 148, the RSM assessment payments are collected and deposited into an escrow account. Thereafter at block 150, the RSM assessment payment is periodically paid to the lender. At block 152, and for each shareholder, the system utilizing the data generated above, prints new RSM principal balance and interest paid statements.

As shown in block 154, new maintenance and monthly assessment payments based on the MVM and RSM terms are periodically calculated. As shown in block 165, if the balance is greater than zero and if the unit is sold, the entire balance is due on sale. As such, and as shown in block 158, if the RSM balance is zero, the assessment is zero.

Next, as shown in block 160, the system monitors the RSM due on sale and any other permitted RSM prepayments received and periodically transfers the due on sale RSM payment to the lender. These due on sale or other permitted payments are calculated over the life of the RSM to reflect amortization payments made prior to sale and includes the amounts necessary to cover interest charged on payments from closing until the next allowable principal payment date. As such, at block 162, the system generates a proportionate reduction of the RSM balance due to the due on sale or other permitted payments.

Additionally, and as shown in block 164, the system generates annual tax deductions allowed for the RSM and the MVM mortgage expenses on a per unit basis to reflect both due on sale or other payments by individual units and the MVM and RSM principal payments. As shown in block 166, the interest is periodically recalculated after the allowable prepayment dates to reflect any principal payment. Finally, at block 168, the system prints an interest, amortization and prepayment schedule reflecting prepayments received.

Figure 1C:
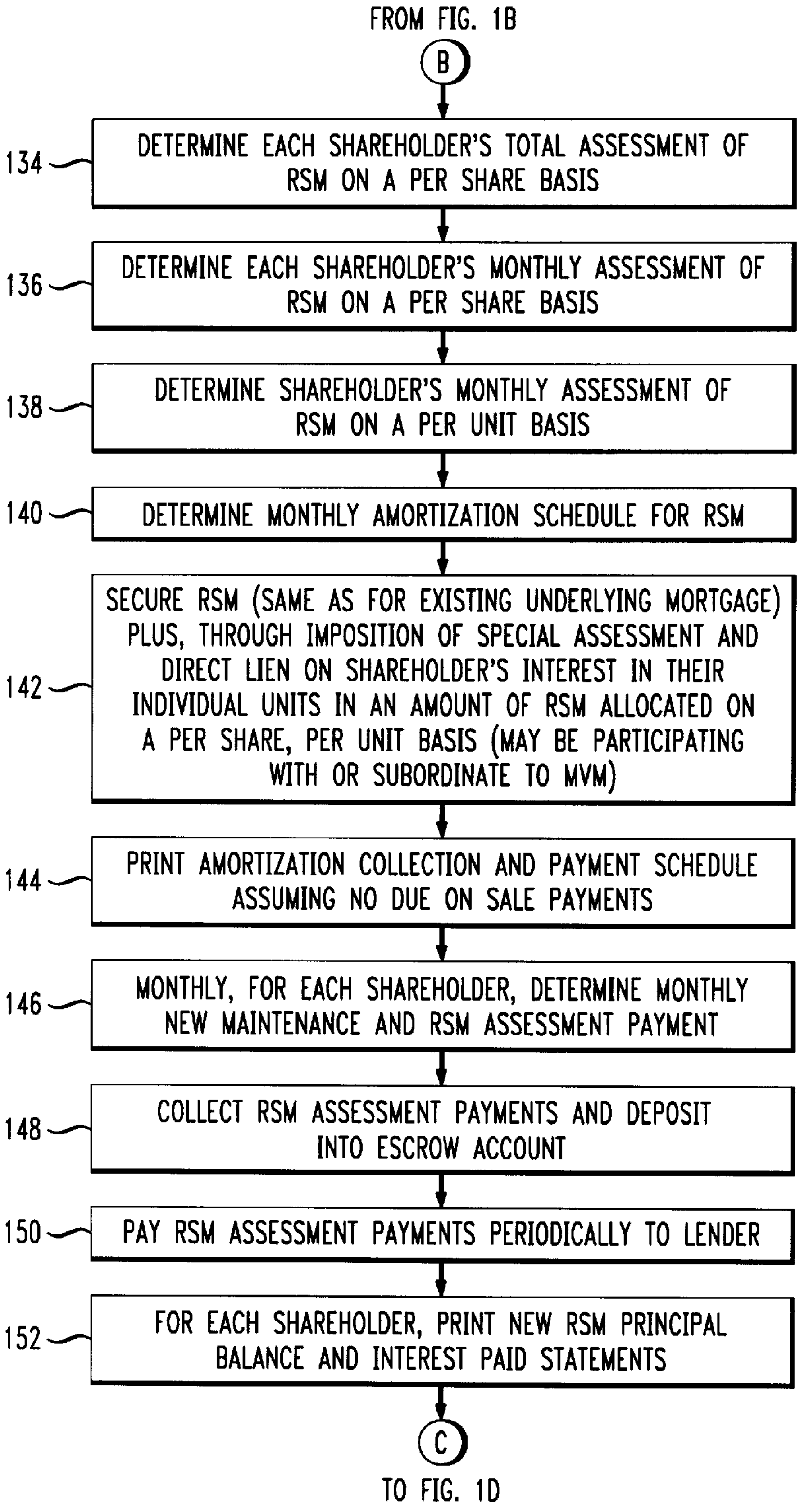
Figure 1D:
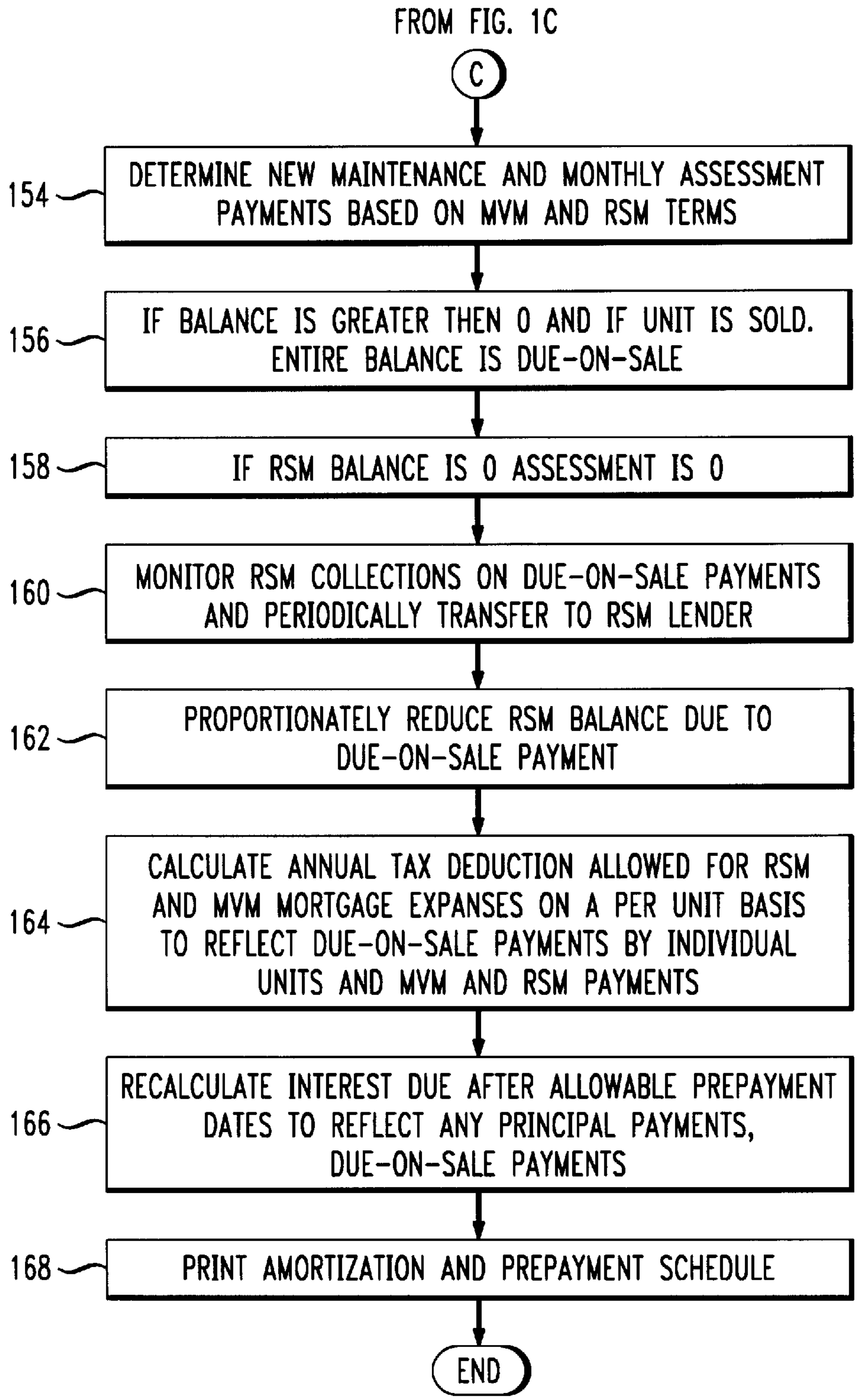
Figure 2:
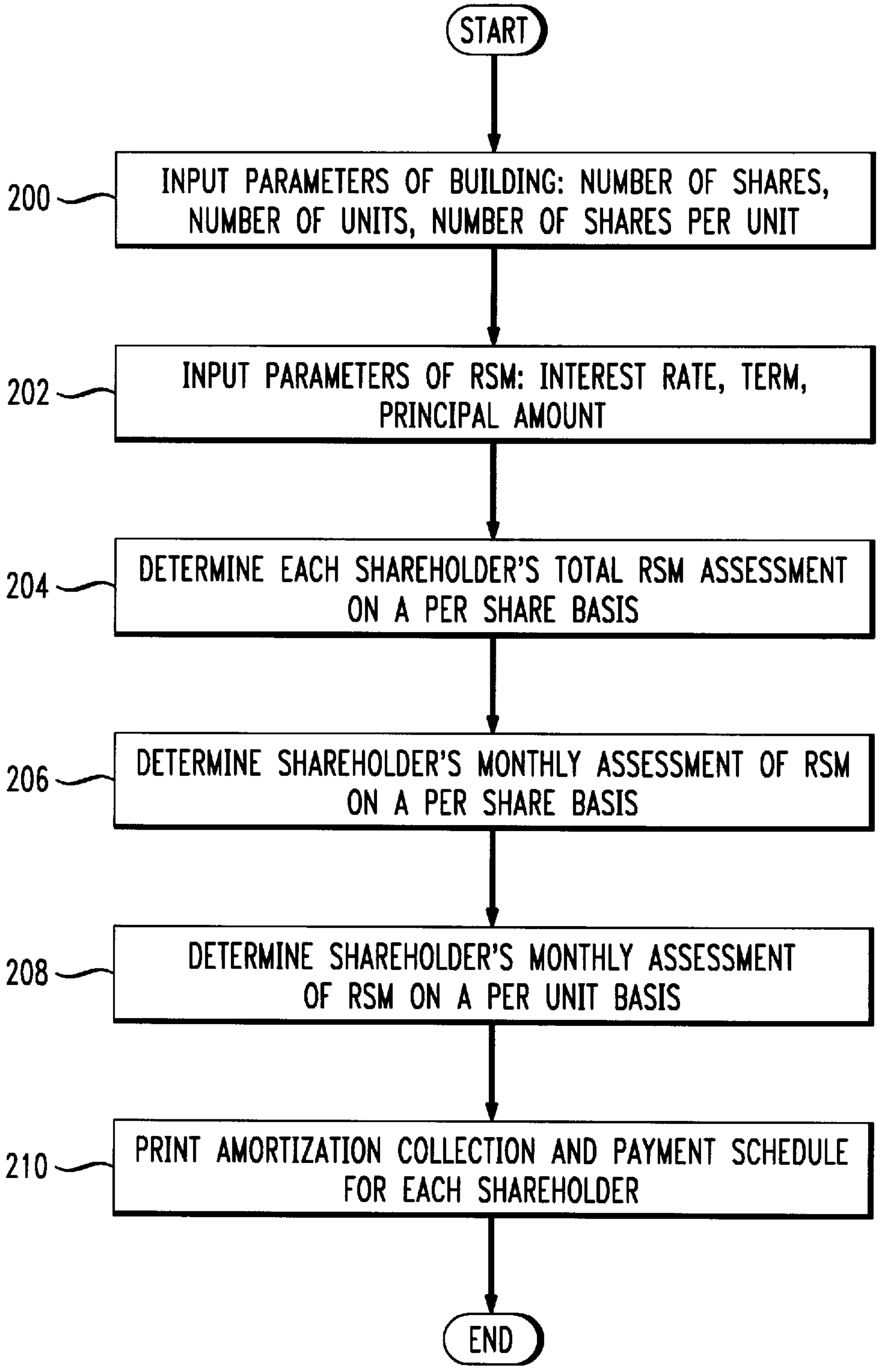
FIG. 2 is a schematic flow chart depicting the data processing methodology and structure of that part of the invention which analyzes an existing second excess portion of an underlying mortgage and creates, for each shareholder, a total excess portion assessment amount, an amortization schedule and a periodic excess portion assessment based on the number of shares of the asset owned by the shareholder.

The procedure for determining a shareholder's monthly assessment of the RSM on a per unit basis is illustrated in more detail in FIG. 2 which corresponds to block 138 of FIG. 1C. From an analysis of the building's parameters, entered at block 200, such as the number of shares, the number of units and the number of shares per unit, and the RSM data, as shown in block 202, an interest rate, a term and a principal amount, the system of the invention generates data, at block 204, for determining each of the shareholder's total RSM assessment on a per share basis. Thereafter, at block 206, the system generates data for determining the shareholder's monthly assessment of the RSM on a per share basis. As well, the system, at block 208, determines a shareholder's monthly assessment of the RSM on a per unit basis. Optionally, at block 210, amortization, collection and payment schedules for each shareholder may be printed and distributed to each shareholder.

Figure 3:
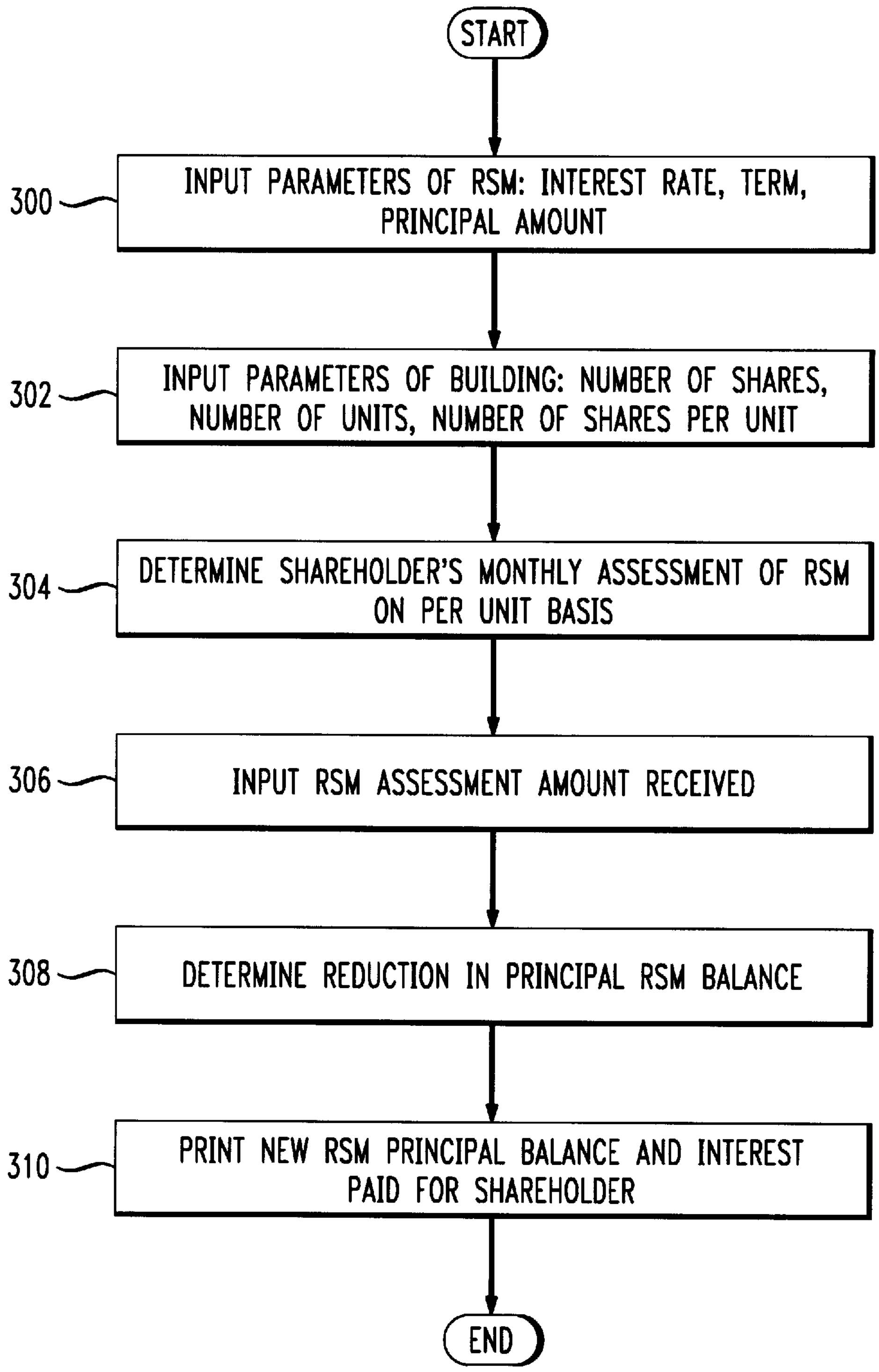
FIG. 3 is a schematic flow chart depicting the data processing methodology and structure of that part of the invention which analyzes and determines the reduction of the total assessment by a portion of the periodic assessment attributable to the second excess portion.

As illustrated in FIG. 3, the procedure for determining the reduction in the RSM principal balance and which corresponds to block 152 is illustrated in more detail. Specifically, the system of the invention, at block 300, utilizes parameters of the RSM such as an interest rate, a term and a principal amount as well as parameters of the building, at block 302 such as the number of shares, the number of units and the number of shares per unit in order to determine, at block 304, the shareholder's monthly assessment of the RSM on a per unit basis. Thereafter, at block 306, the RSM assessment amount is input into a data input system as shown in block 306. The data input system then determines the reduction in the RSM principal balance as shown at block 308. Thereafter, at block 310, the system generates new RSM principal balances and interest paid reports for the shareholder.

Tables I-A, B, C and D show a spreadsheet for calculating the payment due on a given payment date. Specifically, the spreadsheet has two parts: the first piece Table I-A gives the monthly principal amortization schedule for the life of the mortgage for the RSM portion in total and by share. The second piece Tables I-B, C and D calculates the actual amount collected by month by incorporating the information relating to "due on sale payments" or other allowable prepayments from apartment resales.

The spreadsheet works in the following fashion. Table I-A takes the beginning balance of the RSM (in this case $1,000,000, column D) and assumes equal amortization (column H, principal assessment per share) based on the months given in cell D4 (79 months). It is noted that although the amortization is shown to be even over the 79 months, this does not always have to be so. As such, the amortization amounts per share plus the associated interest determines the monthly payment per share which a shareholder would pay as an assessment on the RSM portion of the structured mortgage. This payment can be collected with the normal maintenance bill (column I). The total amounts to be collected each month are shown in columns K and L for principal and interest respectively, based on the number of paying shares determined at the initiation of the RSM (cell D3). At columns P-U the remaining principal due per share is calculated given previous amortization plus any interest which would be due on the principal until the next prepayment date. The total in a given month is used to calculate the due on sale payment per share which would be required of a shareholder selling in that month.

Tables I-B, C and D of the spreadsheet calculates the amount which should be collected by the Coop in any given month based on the normal principal and interest payments due per share adjusted for any due on sale payment. As shown in Table I-B, the schedule lists all units and shares per unit as well as each month the apartment is listed as paying or not paying. As shown on Table I-B, the first month (October, 1993) shows that the only non-paying units are ones owned by the building which were never assessed for the RSM. The next column under each month shows the principal amount due from each unit, based on the principal per share number for that month, taken from Table I-A, multiplied by the number of shares listed in Column C, Table I-A.

Due on sale payments in a given month are shown on the bottom of the spreadsheet for each month. As shown in Table I-C (page3, Column O), the first due on sale payment on unit 12B was collected in February, 1994. The principal amount charged and collected is taken from Table I-A, Column B, and is multiplied by the number of shares. At the time this payment is entered in Tables I-B and C, the monthly code on the apartment is switched from Y (yes) to N (no) for the subsequent month to reflect the fact that the principal payment is no longer collected on a monthly basis since the unit's allocable share of the RSM has been paid off. It is also noted that at the same time, the monthly bill to the shareholder of the unit is adjusted so that the new shareholder is no longer charged the RSM monthly assessment per share shown in Column J of Table I-A.

The spreadsheet also calculates the sums for each payment date Table I-C, page 3, Column T, the monthly amortization payments collected plus the due on sale payments collected. This total is the amount due to the lender and is shown in Table I-C, page 3 as $146,301.49.

Tables II-A, B and C show the spreadsheet for the calculations of the spreadsheet described in Tables I-A, B, C and D.

In Table III, a spreadsheet is shown which is utilized to determined the MVM and RSM components of the existing excess underlying mortgage. The data that is utilized is (1) the current mortgage data, (2) various financial and unit data on the building as well as (3) the current building valuation based on conventional valuation methodologies. The spreadsheet also calculates the impact of a particular MVM/RSM split and payment terms on existing shareholder's monthly payment burden divided between the new monthly maintenance (including the MVM service) and the RSM assessment. Given the results of the shareholder/tenant impacts, the RSM and MVM can be adjusted to obtain numbers more in line with negotiated objectives if necessary.

It should be understood that the preferred embodiments and examples described are for illustrative purposes only and are not to be construed as limiting the scope of the present invention which is properly delineated only in the appended claims.

TABLE I – A

| | A | B | C | D | E | F | G |
|---|---|---|---|---|---|---|---|
| 1 | | AMORTIZATION OF $1 MILLION | | | | | |
| 2 | | AMORTIZATION IN | | 13 | INSTALLMENTS TO HANCOCK (4/94, | | |
| 3 | | PAYING SHARES | | 15266 | | | |
| 4 | | PRINC ASSESS | | 79 | MONTHS STARTING 10/93 (1 MONTH | | |
| 5 | | | | | | | |
| 6 | | | 25000 | 99686.98 | 74686.98 | | |
| 7 | | | | | | | |
| 8 | | | | | | | |
| 9 | **Prepayments** | **MONTH** | | **BEG BAL** | **INT** | **AMORT** | |
| 10 | | 1 | 5/93 | 1,000,000 | 4,167 | 0 | |
| 11 | | 2 | 6/93 | 1,000,000 | 4,167 | 0 | |
| 12 | | 3 | 7/93 | 1,000,000 | 4,167 | 0 | |
| 13 | | 4 | 8/93 | 1,000,000 | 4,167 | 0 | |
| 14 | | 5 | 9/93 | 1,000,000 | 4,167 | 0 | |
| 15 | | 6 | 10/93 | 1,000,000 | 4,167 | 0 | |
| 16 | | 7 | 11/93 | 1,000,000 | 4,167 | 0 | |
| 17 | | 8 | 12/93 | 1,000,000 | 4,167 | 0 | |
| 18 | | 9 | 1/94 | 1,000,000 | 4,167 | 0 | |
| 19 | 31507.63 | 10 | 2/94 | 1,000,000 | 4,167 | 0 | |
| 20 | 27,363.70 | 11 | 3/94 | 1,000,000 | 4,167 | 0 | |

| | B | H | I | J | K | L | M | N |
|---|---|---|---|---|---|---|---|---|
| 1 | | | | | | | | |
| 2 | 10/94, 4/95, 10/95, 4/96, 10/96, 4/97, 10/97, 4/98, 10/98, 4/99, 10/99, 4/00) | | | | | | | |
| 3 | | | | | | | | |
| 4 | LEAD PLUS 1 EXTRA MONTH IN FIRST PERIOD: 10/93-4/94), ENDING 4/00 | | | | | | | |
| 5 | | | | | | | | |
| 6 | | | | | | | | |
| 7 | | **PRINC** | **INT** | **TOT** | **TOT** | **TOT** | **NET** | **NET** |
| 8 | | **ASSESS** | **ASSESS** | **ASSESS** | **COOP** | **COOP** | **COOP** | **CASH** |
| 9 | **MONTH** | **SHARE** | **SHARE** | **SHARE** | **PRINC** | **INT** | **CASH** | **TO DATE** |
| 10 | 1 | 0 | N.A. | 0 | 0 | 0 | N.A. | N.A. |
| 11 | 2 | 0 | N.A. | 0 | 0 | 0 | N.A. | N.A. |
| 12 | 3 | 0 | N.A. | 0 | 0 | 0 | N.A. | N.A. |
| 13 | 4 | 0 | N.A. | 0 | 0 | 0 | N.A. | N.A. |
| 14 | 5 | 0 | N.A. | 0 | 0 | 0 | N.A. | N.A. |
| 15 | 6 | 0.829177771 | 0.25894 | 1.08812 | 12,658 | 3,953 | 12,445 | 12,445 |
| 16 | 7 | 0.829177771 | 0.25894 | 1.08812 | 12,658 | 3,953 | 12,445 | 24,889 |
| 17 | 8 | 0.829177771 | 0.25894 | 1.08812 | 12,658 | 3,953 | 12,445 | 37,334 |
| 18 | 9 | 0.829177771 | 0.25894 | 1.08812 | 12,658 | 3,953 | 12,445 | 49,778 |
| 19 | 10 | 0.829177771 | 0.25894 | 1.08812 | 12,658 | 3,953 | 12,445 | 62,223 |
| 20 | 11 | 0.829177771 | 0.25894 | 1.08812 | 12,658 | 3,953 | 12,445 | 74,667 |

| | B | O | P | Q | R | S | T | U |
|---|---|---|---|---|---|---|---|---|
| 1 | | | | | | | | |
| 2 | | | INDIVIDUAL APARTMENT | | | | | |
| 3 | | | 1 SHARES | | | | | |
| 4 | | | | | | | | |
| 5 | | | | | | | | |
| 6 | | | | | | | | |
| 7 | | | | | | UNPAID | INT TO | TOTAL |
| 8 | | | PRINC | INT | TOT | ASSESS | NEXT | DUE |
| 9 | MONTH | | ASSESS | ASSESS | ASSESS | END MO | AMORT | COOP |
| 10 | 1 | | 0.00 | 0.00 | 0.00 | 65.51 | N.A. | 65.51 |
| 11 | 2 | | 0.00 | 0.00 | 0.00 | 65.51 | N.A. | 65.51 |
| 12 | 3 | | 0.00 | 0.00 | 0.00 | 65.51 | N.A. | 65.51 |
| 13 | 4 | | 0.00 | 0.00 | 0.00 | 65.51 | N.A. | 65.51 |
| 14 | 5 | | 0.00 | 0.00 | 0.00 | 65.51 | 1.64 | 67.14 |
| 15 | 6 | | 0.83 | 0.26 | 1.09 | 64.68 | 1.36 | 66.04 |
| 16 | 7 | | 0.83 | 0.26 | 1.09 | 63.85 | 1.09 | 64.94 |
| 17 | 8 | | 0.83 | 0.26 | 1.09 | 63.02 | 0.82 | 63.84 |
| 18 | 9 | | 0.83 | 0.26 | 1.09 | 62.19 | 0.55 | 62.73 |
| 19 | 10 | | 0.83 | 0.26 | 1.09 | 61.36 | 0.27 | 61.63 |
| 20 | 11 | | 0.83 | 0.26 | 1.09 | 60.53 | 0.00 | 60.53 |

| | A | B | C | D | E | F | G |
|---|---|---|---|---|---|---|---|
| 7 | | | | | | | |
| 8 | | | | | | | |
| 9 | **Prepayments** | **MONTH** | | **BEG BAL** | **INT** | **AMORT** | |
| 21 | | 12 | 4/94 | 1,000,000 | 4,167 | 76923 | |
| 22 | | 13 | 5/94 | 923,077 | 3,846 | 0 | |
| 23 | | 14 | 6/94 | 923,077 | 3,846 | 0 | |
| 24 | | 15 | 7/94 | 923,077 | 3,846 | 0 | |
| 25 | | 16 | 8/94 | 923,077 | 3,846 | 0 | |
| 26 | | 17 | 9/94 | 923,077 | 3,846 | 0 | |
| 27 | | 18 | 10/94 | 923,077 | 3,846 | 76923 | |
| 28 | | 19 | 11/94 | 846,154 | 3,526 | 0 | |
| 29 | | 20 | 12/94 | 846,154 | 3,526 | 0 | |
| 30 | | 21 | 1/95 | 846,154 | 3,526 | 0 | |
| 31 | | 22 | 2/95 | 846,154 | 3,526 | 0 | |
| 32 | | 23 | 3/95 | 846,154 | 3,526 | 0 | |
| 33 | | 24 | 4/95 | 846,154 | 3,526 | 76923 | |
| 34 | | 25 | 5/95 | 769,231 | 3,846 | 0 | |
| 35 | | 26 | 6/95 | 769,231 | 3,846 | 0 | |
| 36 | | 27 | 7/95 | 769,231 | 3,846 | 0 | |
| 37 | | 28 | 8/95 | 769,231 | 3,846 | 0 | |

| | B | H | I | J | K | L | M | N |
|---|---|---|---|---|---|---|---|---|
| 7 | | PRINC | INT | TOT | TOT | TOT | NET | NET |
| 8 | | ASSESS | ASSESS | ASSESS | COOP | COOP | COOP | CASH |
| 9 | MONTH | SHARE | SHARE | SHARE | PRINC | INT | CASH | TO DATE |
| 21 | 12 | 0.829177771 | 0.25894 | 1.08812 | 12,658 | 3,953 | (64,479) | 10,189 |
| 22 | 13 | 0.829177771 | 0.25894 | 1.08812 | 12,658 | 3,953 | 12,765 | 22,954 |
| 23 | 14 | 0.829177771 | 0.25894 | 1.08812 | 12,658 | 3,953 | 12,765 | 35,719 |
| 24 | 15 | 0.829177771 | 0.25894 | 1.08812 | 12,658 | 3,953 | 12,765 | 48,484 |
| 25 | 16 | 0.829177771 | 0.25894 | 1.08812 | 12,658 | 3,953 | 12,765 | 61,249 |
| 26 | 17 | 0.829177771 | 0.25894 | 1.08812 | 12,658 | 3,953 | 12,765 | 74,014 |
| 27 | 18 | 0.829177771 | 0.25894 | 1.08812 | 12,658 | 3,953 | (64,158) | 9,856 |
| 28 | 19 | 0.829177771 | 0.25894 | 1.08812 | 12,658 | 3,953 | 13,086 | 22,942 |
| 29 | 20 | 0.829177771 | 0.25894 | 1.08812 | 12,658 | 3,953 | 13,086 | 36,027 |
| 30 | 21 | 0.829177771 | 0.24075 | 1.06992 | 12,658 | 3,675 | 12,808 | 48,835 |
| 31 | 22 | 0.829177771 | 0.24075 | 1.06992 | 12,658 | 3,675 | 12,808 | 61,643 |
| 32 | 23 | 0.829177771 | 0.24075 | 1.06992 | 12,658 | 3,675 | 12,808 | 74,451 |
| 33 | 24 | 0.829177771 | 0.24075 | 1.06992 | 12,658 | 3,675 | (64,115) | 10,335 |
| 34 | 25 | 0.829177771 | 0.24075 | 1.06992 | 12,658 | 3,675 | 12,487 | 22,823 |
| 35 | 26 | 0.829177771 | 0.24075 | 1.06992 | 12,658 | 3,675 | 12,487 | 35,310 |
| 36 | 27 | 0.829177771 | 0.24075 | 1.06992 | 12,658 | 3,675 | 12,487 | 47,797 |
| 37 | 28 | 0.829177771 | 0.24075 | 1.06992 | 12,658 | 3,675 | 12,487 | 60,285 |

| | B | O | P | Q | R | S | T | U |
|---|---|---|---|---|---|---|---|---|
| 7 | | | | | | UNPAID | INT TO | TOTAL |
| 8 | | | PRINC | INT | TOT | ASSESS | NEXT | DUE |
| 9 | MONTH | | ASSESS | ASSESS | ASSESS | END MO | AMORT | COOP |
| 21 | 12 | | 0.83 | 0.26 | 1.09 | 59.70 | 1.26 | 60.96 |
| 22 | 13 | | 0.83 | 0.26 | 1.09 | 58.87 | 1.01 | 59.88 |
| 23 | 14 | | 0.83 | 0.26 | 1.09 | 58.04 | 0.76 | 58.80 |
| 24 | 15 | | 0.83 | 0.26 | 1.09 | 57.21 | 0.50 | 57.72 |
| 25 | 16 | | 0.83 | 0.26 | 1.09 | 56.38 | 0.25 | 56.64 |
| 26 | 17 | | 0.83 | 0.26 | 1.09 | 55.55 | 0.00 | 55.55 |
| 27 | 18 | | 0.83 | 0.26 | 1.09 | 54.73 | 1.15 | 55.88 |
| 28 | 19 | | 0.83 | 0.26 | 1.09 | 53.90 | 0.92 | 54.82 |
| 29 | 20 | | 0.83 | 0.26 | 1.09 | 53.07 | 0.69 | 53.76 |
| 30 | 21 | | 0.83 | 0.24 | 1.07 | 52.24 | 0.46 | 52.70 |
| 31 | 22 | | 0.83 | 0.24 | 1.07 | 51.41 | 0.23 | 51.64 |
| 32 | 23 | | 0.83 | 0.24 | 1.07 | 50.58 | 0.00 | 50.58 |
| 33 | 24 | | 0.83 | 0.24 | 1.07 | 49.75 | 1.26 | 51.01 |
| 34 | 25 | | 0.83 | 0.24 | 1.07 | 48.92 | 1.01 | 49.93 |
| 35 | 26 | | 0.83 | 0.24 | 1.07 | 48.09 | 0.76 | 48.85 |
| 36 | 27 | | 0.83 | 0.24 | 1.07 | 47.26 | 0.50 | 47.77 |
| 37 | 28 | | 0.83 | 0.24 | 1.07 | 46.43 | 0.25 | 46.69 |

| | A | B | C | D | E | F | G |
|---|---|---|---|---|---|---|---|
| 7 | | | | | | | |
| 8 | | | | | | | |
| 9 | **Prepayments** | **MONTH** | | **BEG BAL** | **INT** | **AMORT** | |
| 38 | | 29 | 9/95 | 769,231 | 3,846 | 0 | |
| 39 | | 30 | 10/95 | 769,231 | 3,846 | 76923 | |
| 40 | | 31 | 11/95 | 692,308 | 3,462 | 0 | |
| 41 | | 32 | 12/95 | 692,308 | 3,462 | 0 | |
| 42 | | 33 | 1/96 | 692,308 | 3,462 | 0 | |
| 43 | | 34 | 2/96 | 692,308 | 3,462 | 0 | |
| 44 | | 35 | 3/96 | 692,308 | 3,462 | 0 | |
| 45 | | 36 | 4/96 | 692,308 | 3,462 | 76923 | |
| 46 | | 37 | 5/96 | 615,385 | 3,718 | 0 | |
| 47 | | 38 | 6/96 | 615,385 | 3,718 | 0 | |
| 48 | | 39 | 7/96 | 615,385 | 3,718 | 0 | |
| 49 | | 40 | 8/96 | 615,385 | 3,718 | 0 | |
| 50 | | 41 | 9/96 | 615,385 | 3,718 | 0 | |
| 51 | | 42 | 10/96 | 615,385 | 3,718 | 76923 | |
| 52 | | 43 | 11/96 | 538,462 | 3,253 | 0 | |
| 53 | | 44 | 12/96 | 538,462 | 3,253 | 0 | |
| 54 | | 45 | 1/97 | 538,462 | 3,253 | 0 | |

| | B | H | I | J | K | L | M | N |
|---|---|---|---|---|---|---|---|---|
| 7 | | PRINC | INT | TOT | TOT | TOT | NET | NET |
| 8 | | ASSESS | ASSESS | ASSESS | COOP | COOP | COOP | CASH |
| 9 | MONTH | SHARE | SHARE | SHARE | PRINC | INT | CASH | TO DATE |
| 38 | 29 | 0.829177771 | 0.24075 | 1.06992 | 12,658 | 3,675 | 12,487 | 72,772 |
| 39 | 30 | 0.829177771 | 0.24075 | 1.06992 | 12,658 | 3,675 | (64,436) | 8,336 |
| 40 | 31 | 0.829177771 | 0.24075 | 1.06992 | 12,658 | 3,675 | 12,872 | 21,208 |
| 41 | 32 | 0.829177771 | 0.24075 | 1.06992 | 12,658 | 3,675 | 12,872 | 34,080 |
| 42 | 33 | 0.829177771 | 0.23287 | 1.06205 | 12,658 | 3,555 | 12,752 | 46,832 |
| 43 | 34 | 0.829177771 | 0.23287 | 1.06205 | 12,658 | 3,555 | 12,752 | 59,583 |
| 44 | 35 | 0.829177771 | 0.23287 | 1.06205 | 12,658 | 3,555 | 12,752 | 72,335 |
| 45 | 36 | 0.829177771 | 0.23287 | 1.06205 | 12,658 | 3,555 | (64,171) | 8,164 |
| 46 | 37 | 0.829177771 | 0.23287 | 1.06205 | 12,658 | 3,555 | 12,495 | 20,659 |
| 47 | 38 | 0.829177771 | 0.23287 | 1.06205 | 12,658 | 3,555 | 12,495 | 33,154 |
| 48 | 39 | 0.829177771 | 0.23287 | 1.06205 | 12,658 | 3,555 | 12,495 | 45,650 |
| 49 | 40 | 0.829177771 | 0.23287 | 1.06205 | 12,658 | 3,555 | 12,495 | 58,145 |
| 50 | 41 | 0.829177771 | 0.23287 | 1.06205 | 12,658 | 3,555 | 12,495 | 70,640 |
| 51 | 42 | 0.829177771 | 0.23287 | 1.06205 | 12,658 | 3,555 | (64,428) | 6,212 |
| 52 | 43 | 0.829177771 | 0.23287 | 1.06205 | 12,658 | 3,555 | 12,960 | 19,172 |
| 53 | 44 | 0.829177771 | 0.23287 | 1.06205 | 12,658 | 3,555 | 12,960 | 32,132 |
| 54 | 45 | 0.829177771 | 0.18773 | 1.01691 | 12,658 | 2,866 | 12,271 | 44,403 |

| | B | O | P | Q | R | S | T | U |
|---|---|---|---|---|---|---|---|---|
| 7 | | | | | | UNPAID | INT TO | TOTAL |
| 8 | | | PRINC | INT | TOT | ASSESS | NEXT | DUE |
| 9 | MONTH | | ASSESS | ASSESS | ASSESS | END MO | AMORT | COOP |
| 38 | 29 | | 0.83 | 0.24 | 1.07 | 45.60 | 0.00 | 45.60 |
| 39 | 30 | | 0.83 | 0.24 | 1.07 | 44.78 | 1.13 | 45.91 |
| 40 | 31 | | 0.83 | 0.24 | 1.07 | 43.95 | 0.91 | 44.85 |
| 41 | 32 | | 0.83 | 0.24 | 1.07 | 43.12 | 0.68 | 43.80 |
| 42 | 33 | | 0.83 | 0.23 | 1.06 | 42.29 | 0.45 | 42.74 |
| 43 | 34 | | 0.83 | 0.23 | 1.06 | 41.46 | 0.23 | 41.69 |
| 44 | 35 | | 0.83 | 0.23 | 1.06 | 40.63 | 0.00 | 40.63 |
| 45 | 36 | | 0.83 | 0.23 | 1.06 | 39.80 | 1.22 | 41.02 |
| 46 | 37 | | 0.83 | 0.23 | 1.06 | 38.97 | 0.97 | 39.95 |
| 47 | 38 | | 0.83 | 0.23 | 1.06 | 38.14 | 0.73 | 38.87 |
| 48 | 39 | | 0.83 | 0.23 | 1.06 | 37.31 | 0.49 | 37.80 |
| 49 | 40 | | 0.83 | 0.23 | 1.06 | 36.48 | 0.24 | 36.73 |
| 50 | 41 | | 0.83 | 0.23 | 1.06 | 35.65 | 0.00 | 35.65 |
| 51 | 42 | | 0.83 | 0.23 | 1.06 | 34.83 | 1.07 | 35.89 |
| 52 | 43 | | 0.83 | 0.23 | 1.06 | 34.00 | 0.85 | 34.85 |
| 53 | 44 | | 0.83 | 0.23 | 1.06 | 33.17 | 0.64 | 33.81 |
| 54 | 45 | | 0.83 | 0.19 | 1.02 | 32.34 | 0.43 | 32.76 |

| | A | B | C | D | E | F | G |
|---|---|---|---|---|---|---|---|
| 7 | | | | | | | |
| 8 | | | | | | | |
| 9 | **Prepayments** | **MONTH** | | **BEG BAL** | **INT** | **AMORT** | |
| 55 | | 46 | 2/97 | 538,462 | 3,253 | 0 | |
| 56 | | 47 | 3/97 | 538,462 | 3,253 | 0 | |
| 57 | | 48 | 4/97 | 538,462 | 3,253 | 76923 | |
| 58 | | 49 | 5/97 | 461,538 | 2,788 | 0 | |
| 59 | | 50 | 6/97 | 461,538 | 2,788 | 0 | |
| 60 | | 51 | 7/97 | 461,538 | 2,788 | 0 | |
| 61 | | 52 | 8/97 | 461,538 | 2,788 | 0 | |
| 62 | | 53 | 9/97 | 461,538 | 2,788 | 0 | |
| 63 | | 54 | 10/97 | 461,538 | 2,788 | 76923 | |
| 64 | | 55 | 11/97 | 384,615 | 2,324 | 0 | |
| 65 | | 56 | 12/97 | 384,615 | 2,324 | 0 | |
| 66 | | 57 | 1/98 | 384,615 | 2,324 | 0 | |
| 67 | | 58 | 2/98 | 384,615 | 2,324 | 0 | |
| 68 | | 59 | 3/98 | 384,615 | 2,324 | 0 | |
| 69 | | 60 | 4/98 | 384,615 | 2,324 | 76923 | |
| 70 | | 61 | 5/98 | 307,692 | 2,564 | 0 | |
| 71 | | 62 | 6/98 | 307,692 | 2,564 | 0 | |

| | B | H | I | J | K | L | M | N |
|---|---|---|---|---|---|---|---|---|
| 7 | | PRINC | INT | TOT | TOT | TOT | NET | NET |
| 8 | | ASSESS | ASSESS | ASSESS | COOP | COOP | COOP | CASH |
| 9 | MONTH | SHARE | SHARE | SHARE | PRINC | INT | CASH | TO DATE |
| 55 | 46 | 0.829177771 | 0.18773 | 1.01691 | 12,658 | 2,866 | 12,271 | 56,674 |
| 56 | 47 | 0.829177771 | 0.18773 | 1.01691 | 12,658 | 2,866 | 12,271 | 68,945 |
| 57 | 48 | 0.829177771 | 0.18773 | 1.01691 | 12,658 | 2,866 | (64,652) | 4,293 |
| 58 | 49 | 0.829177771 | 0.18773 | 1.01691 | 12,658 | 2,866 | 12,736 | 17,029 |
| 59 | 50 | 0.829177771 | 0.18773 | 1.01691 | 12,658 | 2,866 | 12,736 | 29,764 |
| 60 | 51 | 0.829177771 | 0.18773 | 1.01691 | 12,658 | 2,866 | 12,736 | 42,500 |
| 61 | 52 | 0.829177771 | 0.18773 | 1.01691 | 12,658 | 2,866 | 12,736 | 55,236 |
| 62 | 53 | 0.829177771 | 0.18773 | 1.01691 | 12,658 | 2,866 | 12,736 | 67,972 |
| 63 | 54 | 0.829177771 | 0.18773 | 1.01691 | 12,658 | 2,866 | (64,187) | 3,784 |
| 64 | 55 | 0.829177771 | 0.18773 | 1.01691 | 12,658 | 2,866 | 13,200 | 16,985 |
| 65 | 56 | 0.829177771 | 0.18773 | 1.01691 | 12,658 | 2,866 | 13,200 | 30,185 |
| 66 | 57 | 0.829177771 | 0.15571 | 0.98489 | 12,658 | 2,377 | 12,712 | 42,897 |
| 67 | 58 | 0.829177771 | 0.15571 | 0.98489 | 12,658 | 2,377 | 12,712 | 55,608 |
| 68 | 59 | 0.829177771 | 0.15571 | 0.98489 | 12,658 | 2,377 | 12,712 | 68,320 |
| 69 | 60 | 0.829177771 | 0.15571 | 0.98489 | 12,658 | 2,377 | (64,211) | 4,109 |
| 70 | 61 | 0.829177771 | 0.15571 | 0.98489 | 12,658 | 2,377 | 12,471 | 16,580 |
| 71 | 62 | 0.829177771 | 0.15571 | 0.98489 | 12,658 | 2,377 | 12,471 | 29,051 |

| | B | O | P | Q | R | S | T | U |
|---|---|---|---|---|---|---|---|---|
| 7 | | | | | | UNPAID | INT TO | TOTAL |
| 8 | | | PRINC | INT | TOT | ASSESS | NEXT | DUE |
| 9 | MONTH | | ASSESS | ASSESS | ASSESS | END MO | AMORT | COOP |
| 55 | 46 | | 0.83 | 0.19 | 1.02 | 31.51 | 0.21 | 31.72 |
| 56 | 47 | | 0.83 | 0.19 | 1.02 | 30.68 | 0.00 | 30.68 |
| 57 | 48 | | 0.83 | 0.19 | 1.02 | 29.85 | 0.91 | 30.76 |
| 58 | 49 | | 0.83 | 0.19 | 1.02 | 29.02 | 0.73 | 29.75 |
| 59 | 50 | | 0.83 | 0.19 | 1.02 | 28.19 | 0.55 | 28.74 |
| 60 | 51 | | 0.83 | 0.19 | 1.02 | 27.36 | 0.37 | 27.73 |
| 61 | 52 | | 0.83 | 0.19 | 1.02 | 26.53 | 0.18 | 26.72 |
| 62 | 53 | | 0.83 | 0.19 | 1.02 | 25.70 | 0.00 | 25.70 |
| 63 | 54 | | 0.83 | 0.19 | 1.02 | 24.88 | 0.76 | 25.64 |
| 64 | 55 | | 0.83 | 0.19 | 1.02 | 24.05 | 0.61 | 24.66 |
| 65 | 56 | | 0.83 | 0.19 | 1.02 | 23.22 | 0.46 | 23.67 |
| 66 | 57 | | 0.83 | 0.16 | 0.98 | 22.39 | 0.30 | 22.69 |
| 67 | 58 | | 0.83 | 0.16 | 0.98 | 21.56 | 0.15 | 21.71 |
| 68 | 59 | | 0.83 | 0.16 | 0.98 | 20.73 | 0.00 | 20.73 |
| 69 | 60 | | 0.83 | 0.16 | 0.98 | 19.90 | 0.84 | 20.74 |
| 70 | 61 | | 0.83 | 0.16 | 0.98 | 19.07 | 0.67 | 19.74 |
| 71 | 62 | | 0.83 | 0.16 | 0.98 | 18.24 | 0.50 | 18.75 |

| | A | B | C | D | E | F | G |
|---|---|---|---|---|---|---|---|
| 7 | | | | | | | |
| 8 | | | | | | | |
| 9 | **Prepayments** | **MONTH** | | **BEG BAL** | **INT** | **AMORT** | |
| 72 | | 63 | 7/98 | 307,692 | 2,564 | 0 | |
| 73 | | 64 | 8/98 | 307,692 | 2,564 | 0 | |
| 74 | | 65 | 9/98 | 307,692 | 2,564 | 0 | |
| 75 | | 66 | 10/98 | 307,692 | 2,564 | 76923 | |
| 76 | | 67 | 11/98 | 230,769 | 1,923 | 0 | |
| 77 | | 68 | 12/98 | 230,769 | 1,923 | 0 | |
| 78 | | 69 | 1/99 | 230,769 | 1,923 | 0 | |
| 79 | | 70 | 2/99 | 230,769 | 1,923 | 0 | |
| 80 | | 71 | 3/99 | 230,769 | 1,923 | 0 | |
| 81 | | 72 | 4/99 | 230,769 | 1,923 | 76923 | |
| 82 | | 73 | 5/99 | 153,846 | 1,314 | 0 | |
| 83 | | 74 | 6/99 | 153,846 | 1,314 | 0 | |
| 84 | | 75 | 7/99 | 153,846 | 1,314 | 0 | |
| 85 | | 76 | 8/99 | 153,846 | 1,314 | 0 | |
| 86 | | 77 | 9/99 | 153,846 | 1,314 | 0 | |
| 87 | | 78 | 10/99 | 153,846 | 1,314 | 76923 | |
| 88 | | 79 | 11/99 | 76,923 | 657 | 0 | |

| | B | H | I | J | K | L | M | N |
|---|---|---|---|---|---|---|---|---|
| 7 | | PRINC | INT | TOT | TOT | TOT | NET | NET |
| 8 | | ASSESS | ASSESS | ASSESS | COOP | COOP | COOP | CASH |
| 9 | MONTH | SHARE | SHARE | SHARE | PRINC | INT | CASH | TO DATE |
| 72 | 63 | 0.829177771 | 0.15571 | 0.98489 | 12,658 | 2,377 | 12,471 | 41,522 |
| 73 | 64 | 0.829177771 | 0.15571 | 0.98489 | 12,658 | 2,377 | 12,471 | 53,994 |
| 74 | 65 | 0.829177771 | 0.15571 | 0.98489 | 12,658 | 2,377 | 12,471 | 66,465 |
| 75 | 66 | 0.829177771 | 0.15571 | 0.98489 | 12,658 | 2,377 | (64,452) | 2,013 |
| 76 | 67 | 0.829177771 | 0.15571 | 0.98489 | 12,658 | 2,377 | 13,112 | 15,125 |
| 77 | 68 | 0.829177771 | 0.15571 | 0.98489 | 12,658 | 2,377 | 13,112 | 28,238 |
| 78 | 69 | 0.829177771 | 0.09220 | 0.92138 | 12,658 | 1,408 | 12,143 | 40,380 |
| 79 | 70 | 0.829177771 | 0.09220 | 0.92138 | 12,658 | 1,408 | 12,143 | 52,523 |
| 80 | 71 | 0.829177771 | 0.09220 | 0.92138 | 12,658 | 1,408 | 12,143 | 64,666 |
| 81 | 72 | 0.829177771 | 0.09220 | 0.92138 | 12,658 | 1,408 | (64,780) | (115) |
| 82 | 73 | 0.829177771 | 0.09220 | 0.92138 | 12,658 | 1,408 | 12,752 | 12,637 |
| 83 | 74 | 0.829177771 | 0.09220 | 0.92138 | 12,658 | 1,408 | 12,752 | 25,389 |
| 84 | 75 | 0.829177771 | 0.09220 | 0.92138 | 12,658 | 1,408 | 12,752 | 38,141 |
| 85 | 76 | 0.829177771 | 0.09220 | 0.92138 | 12,658 | 1,408 | 12,752 | 50,892 |
| 86 | 77 | 0.829177771 | 0.09220 | 0.92138 | 12,658 | 1,408 | 12,752 | 63,644 |
| 87 | 78 | 0.829177771 | 0.09220 | 0.92138 | 12,658 | 1,408 | (64,171) | (527) |
| 88 | 79 | 0.829177771 | 0.09220 | 0.92138 | 12,658 | 1,408 | 13,409 | 12,881 |

| | B | O | P | Q | R | S | T | U |
|---|---|---|---|---|---|---|---|---|
| 7 | | | | | | UNPAID | INT TO | TOTAL |
| 8 | | | PRINC | INT | TOT | ASSESS | NEXT | DUE |
| 9 | MONTH | | ASSESS | ASSESS | ASSESS | END MO | AMORT | COOP |
| 72 | 63 | | 0.83 | 0.16 | 0.98 | 17.41 | 0.34 | 17.75 |
| 73 | 64 | | 0.83 | 0.16 | 0.98 | 16.58 | 0.17 | 16.75 |
| 74 | 65 | | 0.83 | 0.16 | 0.98 | 15.75 | 0.00 | 15.75 |
| 75 | 66 | | 0.83 | 0.16 | 0.98 | 14.93 | 0.63 | 15.56 |
| 76 | 67 | | 0.83 | 0.16 | 0.98 | 14.10 | 0.50 | 14.60 |
| 77 | 68 | | 0.83 | 0.16 | 0.98 | 13.27 | 0.38 | 13.64 |
| 78 | 69 | | 0.83 | 0.09 | 0.92 | 12.44 | 0.25 | 12.69 |
| 79 | 70 | | 0.83 | 0.09 | 0.92 | 11.61 | 0.13 | 11.73 |
| 80 | 71 | | 0.83 | 0.09 | 0.92 | 10.78 | 0.00 | 10.78 |
| 81 | 72 | | 0.83 | 0.09 | 0.92 | 9.95 | 0.43 | 10.38 |
| 82 | 73 | | 0.83 | 0.09 | 0.92 | 9.12 | 0.34 | 9.47 |
| 83 | 74 | | 0.83 | 0.09 | 0.92 | 8.29 | 0.26 | 8.55 |
| 84 | 75 | | 0.83 | 0.09 | 0.92 | 7.46 | 0.17 | 7.63 |
| 85 | 76 | | 0.83 | 0.09 | 0.92 | 6.63 | 0.09 | 6.72 |
| 86 | 77 | | 0.83 | 0.09 | 0.92 | 5.80 | 0.00 | 5.80 |
| 87 | 78 | | 0.83 | 0.09 | 0.92 | 4.98 | 0.22 | 5.19 |
| 88 | 79 | | 0.83 | 0.09 | 0.92 | 4.15 | 0.17 | 4.32 |

| | A | B | C | D | E | F | G |
|---|---|---|---|---|---|---|---|
| 7 | | | | | | | |
| 8 | | | | | | | |
| 9 | **Prepayments** | **MONTH** | | **BEG BAL** | **INT** | **AMORT** | |
| 89 | | 80 | 12/99 | 76,923 | 657 | 0 | |
| 90 | | 81 | 1/00 | 76,923 | 657 | 0 | |
| 91 | | 82 | 2/00 | 76,923 | 657 | 0 | |
| 92 | | 83 | 3/00 | 76,923 | 657 | 0 | |
| 93 | | 84 | 4/00 | 76,923 | 657 | 76923 | |
| 94 | | | | | ---------------- | ------------------- | |
| 95 | | | | | 249,327 | 1000000 | |
| 96 | | | | | | | |

| | B | H | I | J | K | L | M | N |
|---|---|---|---|---|---|---|---|---|
| 7 | | PRINC | INT | TOT | TOT | TOT | NET | NET |
| 8 | | ASSESS | ASSESS | ASSESS | COOP | COOP | COOP | CASH |
| 9 | MONTH | SHARE | SHARE | SHARE | PRINC | INT | CASH | TO DATE |
| 89 | 80 | 0.829177771 | 0.09220 | 0.92138 | 12,658 | 1,408 | 13,409 | 26,290 |
| 90 | 81 | 0.829177771 | 0.04304 | 0.87222 | 12,658 | 657 | 12,658 | 38,948 |
| 91 | 82 | 0.829177771 | 0.04304 | 0.87222 | 12,658 | 657 | 12,658 | 51,607 |
| 92 | 83 | 0.829177771 | 0.04304 | 0.87222 | 12,658 | 657 | 12,658 | 64,265 |
| 93 | 84 | 0.829177771 | 0.04304 | 0.87222 | 12,658 | 657 | (64,265) | 0 |
| 94 | | | | | ---------------------- | ---------------------- | | |
| 95 | | | | | 1,000,000 | 228,494 | | |
| 96 | | | | | | | | |

| | B | O | P | Q | R | S | T | U |
|---|---|---|---|---|---|---|---|---|
| 7 | | | | | | UNPAID | INT TO | TOTAL |
| 8 | | | PRINC | INT | TOT | ASSESS | NEXT | DUE |
| 9 | MONTH | | ASSESS | ASSESS | ASSESS | END MO | AMORT | COOP |
| 89 | 80 | | 0.83 | 0.09 | 0.92 | 3.32 | 0.13 | 3.45 |
| 90 | 81 | | 0.83 | 0.04 | 0.87 | 2.49 | 0.09 | 2.57 |
| 91 | 82 | | 0.83 | 0.04 | 0.87 | 1.66 | 0.04 | 1.70 |
| 92 | 83 | | 0.83 | 0.04 | 0.87 | 0.83 | 0.00 | 0.83 |
| 93 | 84 | | 0.83 | 0.04 | 0.87 | 0.00 | 0.00 | 0.00 |
| 94 | | | | | | | | |
| 95 | | | | | | | | |
| 96 | | | | | | | | |

TABLE I – B

| | A | B | C | D | E | F | G |
|---|---|---|---|---|---|---|---|
| 98 | | JOHN HANCOCK PRINCIPAL PAYMENT CALCULATION | | | | | |
| 99 | | | | | | | |
| 100 | | | | | | | |
| 101 | | **Unit** | **Total** | **Owner** | **Tenant** | **Paying=Y** | **10/93** |
| 102 | | | **Shares** | | | | **0.829177771** |
| 103 | | | | | | | |
| 104 | 492 | 01A | 492 | FOSTER | | Y | $407.96 |
| 105 | 0 | 01B | 0 | BLDG | HERRERA | N | $0.00 |
| 106 | 132 | 01C | 132 | MILLER | MORGAN | Y | $109.45 |
| 107 | 135 | 01CA | 135 | HERRERA | ANDRADE | Y | $111.94 |
| 108 | 0 | 02A | 419 | BLDG | WEILL | N | $0.00 |
| 109 | 443 | 02B | 443 | BERNER/MORIARTY | | Y | $367.33 |
| 110 | 0 | 02C | 313 | BLDG | DUNSTON | N | $0.00 |
| 111 | 0 | 03A | 424 | BLDG | MARX | N | $0.00 |
| 112 | 448 | 03B | 448 | MILLER | | Y | $371.47 |
| 113 | 316 | 03C | 316 | URBAN/FRIEDBERG | SKOLER | Y | $262.02 |
| 114 | 429 | 04A | 429 | JUNQUERA | | Y | $355.72 |
| 115 | 453 | 04B | 453 | LUXNER | | Y | $375.62 |
| 116 | 319 | 04C | 319 | ROLAND | STALMAN | Y | $264.51 |
| 117 | 434 | 05A | 434 | QUILLEN | | Y | $359.86 |

| | H | I | J | K | L | M | N |
|---|---|---|---|---|---|---|---|
| 98 | | | | | | | |
| 99 | | | | | | | |
| 100 | | | | | | | |
| 101 | **Paying=Y** | **11/93** | **Paying=Y** | **12/93** | **Paying=Y** | **1/94** | **Paying=Y** |
| 102 | | **0.829177771** | | **0.829177771** | | **0.829177771** | |
| 103 | | | | | | | |
| 104 | Y | $407.96 | Y | $407.96 | Y | $407.96 | Y |
| 105 | N | $0.00 | N | $0.00 | N | $0.00 | N |
| 106 | Y | $109.45 | Y | $109.45 | Y | $109.45 | Y |
| 107 | Y | $111.94 | Y | $111.94 | Y | $111.94 | Y |
| 108 | N | $0.00 | N | $0.00 | N | $0.00 | N |
| 109 | Y | $367.33 | Y | $367.33 | Y | $367.33 | Y |
| 110 | N | $0.00 | N | $0.00 | N | $0.00 | N |
| 111 | N | $0.00 | N | $0.00 | N | $0.00 | N |
| 112 | Y | $371.47 | Y | $371.47 | Y | $371.47 | Y |
| 113 | Y | $262.02 | Y | $262.02 | Y | $262.02 | Y |
| 114 | Y | $355.72 | Y | $355.72 | Y | $355.72 | Y |
| 115 | Y | $375.62 | Y | $375.62 | Y | $375.62 | Y |
| 116 | Y | $264.51 | Y | $264.51 | Y | $264.51 | Y |
| 117 | Y | $359.86 | Y | $359.86 | Y | $359.86 | Y |

| | O | P | Q | R | S | T | U |
|---|---|---|---|---|---|---|---|
| 98 | | | | | | Apartments To Be | |
| 99 | | | | | | Sold Within | |
| 100 | | | | | | | |
| 101 | **2/94** | **Paying=Y** | **3/94** | **Paying=Y** | **4/94** | **Paying=Y** | **5/94** |
| 102 | **0.829177771** | | **0.829177771** | | **0.829177771** | | **0.829177771** |
| 103 | | | | | | | |
| 104 | $407.96 | Y | $407.96 | Y | $407.96 | Y | $407.96 |
| 105 | $0.00 | N | $0.00 | N | $0.00 | N | $0.00 |
| 106 | $109.45 | Y | $109.45 | Y | $109.45 | Y | $109.45 |
| 107 | $111.94 | Y | $111.94 | Y | $111.94 | Y | $111.94 |
| 108 | $0.00 | N | $0.00 | N | $0.00 | N | $0.00 |
| 109 | $367.33 | Y | $367.33 | Y | $367.33 | Y | $367.33 |
| 110 | $0.00 | N | $0.00 | N | $0.00 | N | $0.00 |
| 111 | $0.00 | N | $0.00 | N | $0.00 | N | $0.00 |
| 112 | $371.47 | Y | $371.47 | Y | $371.47 | Y | $371.47 |
| 113 | $262.02 | Y | $262.02 | Y | $262.02 | Y | $262.02 |
| 114 | $355.72 | Y | $355.72 | Y | $355.72 | Y | $355.72 |
| 115 | $375.62 | Y | $375.62 | Y | $375.62 | Y | $375.62 |
| 116 | $264.51 | Y | $264.51 | Y | $264.51 | Y | $264.51 |
| 117 | $359.86 | Y | $359.86 | N | $0.00 | N | $0.00 |

| | V | W | X | Y | Z | AA | AB |
|---|---|---|---|---|---|---|---|
| 98 | | | | | | | |
| 99 | | | | | | | |
| 100 | | | | | | | |
| 101 | **Paying=Y** | **6/94** | **Paying=Y** | **7/94** | **Paying=Y** | **8/94** | **Paying=Y** |
| 102 | | **0.829177771** | | **0.829177771** | | **0.829177771** | |
| 103 | | | | | | | |
| 104 | Y | $407.96 | Y | $407.96 | Y | $407.96 | Y |
| 105 | N | $0.00 | N | $0.00 | N | $0.00 | N |
| 106 | Y | $109.45 | Y | $109.45 | Y | $109.45 | Y |
| 107 | Y | $111.94 | Y | $111.94 | Y | $111.94 | Y |
| 108 | N | $0.00 | N | $0.00 | N | $0.00 | N |
| 109 | Y | $367.33 | Y | $367.33 | Y | $367.33 | Y |
| 110 | N | $0.00 | N | $0.00 | N | $0.00 | N |
| 111 | N | $0.00 | N | $0.00 | N | $0.00 | N |
| 112 | Y | $371.47 | Y | $371.47 | Y | $371.47 | Y |
| 113 | Y | $262.02 | Y | $262.02 | Y | $262.02 | Y |
| 114 | Y | $355.72 | Y | $355.72 | Y | $355.72 | Y |
| 115 | Y | $375.62 | Y | $375.62 | Y | $375.62 | Y |
| 116 | Y | $264.51 | Y | $264.51 | Y | $264.51 | Y |
| 117 | N | $0.00 | N | $0.00 | N | $0.00 | N |

| | AC | AD | AE |
|---|---|---|---|
| 98 | | | |
| 99 | | | |
| 100 | | | |
| 101 | **9/94** | **Paying=Y** | **10/94** |
| 102 | **0.829177771** | | **0.829177771** |
| 103 | | | |
| 104 | $407.96 | Y | $407.96 |
| 105 | $0.00 | N | $0.00 |
| 106 | $109.45 | Y | $109.45 |
| 107 | $111.94 | Y | $111.94 |
| 108 | $0.00 | N | $0.00 |
| 109 | $367.33 | Y | $367.33 |
| 110 | $0.00 | N | $0.00 |
| 111 | $0.00 | N | $0.00 |
| 112 | $371.47 | Y | $371.47 |
| 113 | $262.02 | Y | $262.02 |
| 114 | $355.72 | Y | $355.72 |
| 115 | $375.62 | Y | $375.62 |
| 116 | $264.51 | Y | $264.51 |
| 117 | $0.00 | N | $0.00 |

| | A | B | C | D | E | F | G |
|---|---|---|---|---|---|---|---|
| 101 | | Unit | Total | Owner | Tenant | Paying=Y | 10/93 |
| 102 | | | Shares | | | | 0.829177771 |
| 118 | 458 | 05B | 458 | DOUGHERTY | BERNBACH | Y | $379.76 |
| 119 | 322 | 05C | 322 | FRIEDMAN/BAUDRY | | Y | $267.00 |
| 120 | 439 | 06A | 439 | NIAGARA ASSETS | MARGINI | Y | $364.01 |
| 121 | 463 | 06B | 463 | URB/MARGOLIES/GRSS | NORSA | Y | $383.91 |
| 122 | 325 | 06C | 325 | LEHMKUHL | | Y | $269.48 |
| 123 | 444 | 07A | 444 | KREZ | | Y | $368.15 |
| 124 | 468 | 07B | 468 | URBAN ASSTS GRP | PEPPER | Y | $388.06 |
| 125 | 130 | 07C | 130 | LEVISON | | Y | $107.79 |
| 126 | 182 | 07D | 182 | URBAN/KOTLER | BABIJ | Y | $150.91 |
| 127 | 449 | 08A | 449 | SETTLE | | Y | $372.30 |
| 128 | 473 | 08B | 473 | SETTLE | | Y | $392.20 |
| 129 | 331 | 08C | 331 | MIRANDA | | Y | $274.46 |
| 130 | 454 | 09A | 454 | BROWNING PLATT | | Y | $376.45 |
| 131 | 478 | 09B | 478 | SLAVINSKA | | Y | $396.35 |
| 132 | 334 | 09C | 334 | NORTON | | Y | $276.95 |
| 133 | 459 | 10A | 459 | PARKER | | Y | $380.59 |
| 134 | 483 | 10B | 483 | ROLAND | | Y | $400.49 |
| 135 | 337 | 10C | 337 | GELMAN | | Y | $279.43 |

| | H | I | J | K | L | M | N |
|---|---|---|---|---|---|---|---|
| 101 | **Paying=Y** | **11/93** | **Paying=Y** | **12/93** | **Paying=Y** | **1/94** | **Paying=Y** |
| 102 | | **0.829177771** | | **0.829177771** | | **0.829177771** | |
| 118 | Y | $379.76 | Y | $379.76 | Y | $379.76 | Y |
| 119 | Y | $267.00 | Y | $267.00 | Y | $267.00 | Y |
| 120 | Y | $364.01 | Y | $364.01 | Y | $364.01 | Y |
| 121 | Y | $383.91 | Y | $383.91 | Y | $383.91 | Y |
| 122 | Y | $269.48 | Y | $269.48 | Y | $269.48 | Y |
| 123 | Y | $368.15 | Y | $368.15 | Y | $368.15 | Y |
| 124 | Y | $388.06 | Y | $388.06 | Y | $388.06 | Y |
| 125 | Y | $107.79 | Y | $107.79 | Y | $107.79 | Y |
| 126 | Y | $150.91 | Y | $150.91 | Y | $150.91 | Y |
| 127 | Y | $372.30 | Y | $372.30 | Y | $372.30 | Y |
| 128 | Y | $392.20 | Y | $392.20 | Y | $392.20 | Y |
| 129 | Y | $274.46 | Y | $274.46 | Y | $274.46 | Y |
| 130 | Y | $376.45 | Y | $376.45 | Y | $376.45 | Y |
| 131 | Y | $396.35 | Y | $396.35 | Y | $396.35 | Y |
| 132 | Y | $276.95 | Y | $276.95 | Y | $276.95 | Y |
| 133 | Y | $380.59 | Y | $380.59 | Y | $380.59 | Y |
| 134 | Y | $400.49 | Y | $400.49 | Y | $400.49 | Y |
| 135 | Y | $279.43 | Y | $279.43 | Y | $279.43 | Y |

| | O | P | Q | R | S | T | U |
|---|---|---|---|---|---|---|---|
| 101 | **2/94** | **Paying=Y** | **3/94** | **Paying=Y** | **4/94** | **Paying=Y** | **5/94** |
| 102 | **0.829177771** | | **0.829177771** | | **0.829177771** | | **0.829177771** |
| 118 | $379.76 | Y | $379.76 | Y | $379.76 | Y | $379.76 |
| 119 | $267.00 | Y | $267.00 | Y | $267.00 | Y | $267.00 |
| 120 | $364.01 | Y | $364.01 | Y | $364.01 | Y | $364.01 |
| 121 | $383.91 | Y | $383.91 | Y | $383.91 | Y | $383.91 |
| 122 | $269.48 | Y | $269.48 | Y | $269.48 | Y | $269.48 |
| 123 | $368.15 | Y | $368.15 | Y | $368.15 | Y | $368.15 |
| 124 | $388.06 | Y | $388.06 | Y | $388.06 | Y | $388.06 |
| 125 | $107.79 | Y | $107.79 | Y | $107.79 | Y | $107.79 |
| 126 | $150.91 | Y | $150.91 | Y | $150.91 | Y | $150.91 |
| 127 | $372.30 | Y | $372.30 | Y | $372.30 | Y | $372.30 |
| 128 | $392.20 | Y | $392.20 | Y | $392.20 | Y | $392.20 |
| 129 | $274.46 | Y | $274.46 | Y | $274.46 | Y | $274.46 |
| 130 | $376.45 | Y | $376.45 | Y | $376.45 | Y | $376.45 |
| 131 | $396.35 | Y | $396.35 | Y | $396.35 | Y | $396.35 |
| 132 | $276.95 | Y | $276.95 | Y | $276.95 | Y | $276.95 |
| 133 | $380.59 | Y | $380.59 | Y | $380.59 | Y | $380.59 |
| 134 | $400.49 | Y | $400.49 | Y | $400.49 | Y | $400.49 |
| 135 | $279.43 | Y | $279.43 | Y | $279.43 | Y | $279.43 |

| | V | W | X | Y | Z | AA | AB |
|---|---|---|---|---|---|---|---|
| 101 | **Paying=Y** | **6/94** | **Paying=Y** | **7/94** | **Paying=Y** | **8/94** | **Paying=Y** |
| 102 | | **0.829177771** | | **0.829177771** | | **0.829177771** | |
| 118 | Y | $379.76 | Y | $379.76 | Y | $379.76 | Y |
| 119 | Y | $267.00 | Y | $267.00 | Y | $267.00 | Y |
| 120 | Y | $364.01 | Y | $364.01 | Y | $364.01 | Y |
| 121 | Y | $383.91 | Y | $383.91 | Y | $383.91 | Y |
| 122 | Y | $269.48 | Y | $269.48 | Y | $269.48 | Y |
| 123 | Y | $368.15 | Y | $368.15 | Y | $368.15 | Y |
| 124 | Y | $388.06 | Y | $388.06 | Y | $388.06 | Y |
| 125 | Y | $107.79 | Y | $107.79 | Y | $107.79 | Y |
| 126 | Y | $150.91 | Y | $150.91 | Y | $150.91 | Y |
| 127 | Y | $372.30 | Y | $372.30 | Y | $372.30 | Y |
| 128 | Y | $392.20 | Y | $392.20 | Y | $392.20 | Y |
| 129 | Y | $274.46 | Y | $274.46 | Y | $274.46 | Y |
| 130 | Y | $376.45 | Y | $376.45 | Y | $376.45 | Y |
| 131 | Y | $396.35 | Y | $396.35 | Y | $396.35 | Y |
| 132 | Y | $276.95 | Y | $276.95 | Y | $276.95 | Y |
| 133 | Y | $380.59 | Y | $380.59 | Y | $380.59 | Y |
| 134 | Y | $400.49 | Y | $400.49 | Y | $400.49 | Y |
| 135 | Y | $279.43 | Y | $279.43 | Y | $279.43 | Y |

| | AC | AD | AE |
|---|---|---|---|
| 101 | **9/94** | **Paying=Y** | **10/94** |
| 102 | **0.829177771** | | **0.829177771** |
| 118 | $379.76 | Y | $379.76 |
| 119 | $267.00 | Y | $267.00 |
| 120 | $364.01 | Y | $364.01 |
| 121 | $383.91 | Y | $383.91 |
| 122 | $269.48 | Y | $269.48 |
| 123 | $368.15 | Y | $368.15 |
| 124 | $388.06 | Y | $388.06 |
| 125 | $107.79 | Y | $107.79 |
| 126 | $150.91 | Y | $150.91 |
| 127 | $372.30 | Y | $372.30 |
| 128 | $392.20 | Y | $392.20 |
| 129 | $274.46 | Y | $274.46 |
| 130 | $376.45 | Y | $376.45 |
| 131 | $396.35 | Y | $396.35 |
| 132 | $276.95 | Y | $276.95 |
| 133 | $380.59 | Y | $380.59 |
| 134 | $400.49 | Y | $400.49 |
| 135 | $279.43 | Y | $279.43 |

| | A | B | C | D | E | F | G |
|---|---|---|---|---|---|---|---|
| 101 | | **Unit** | **Total** | **Owner** | **Tenant** | **Paying=Y** | **10/93** |
| 102 | | | **Shares** | | | | **0.829177771** |
| 136 | 0 | 11A | 464 | BLDG | SIMON | N | $0.00 |
| 137 | 488 | 11B | 488 | JOHNSON | | Y | $404.64 |
| 138 | 340 | 11C | 340 | WARREN | | Y | $281.92 |
| 139 | 469 | 12A | 469 | GRUSKY EISMAN | | Y | $388.88 |
| 140 | 493 | 12B | 493 | GITOW/LALONDE | | Y | $408.78 |
| 141 | 343 | 12C | 343 | BASCH/FLEGENHEIM | | Y | $284.41 |
| 142 | 474 | 14A | 474 | DIME | CASTILE | Y | $393.03 |
| 143 | 0 | 14B | 498 | BLDG | PEARSON | N | $0.00 |
| 144 | 346 | 14C | 346 | NEFF | | Y | $286.90 |
| 145 | 479 | 15A | 479 | ALLEN | | Y | $397.18 |
| 146 | 503 | 15B | 503 | URBAN/MALMAN | KARIA | Y | $417.08 |
| 147 | 349 | 15C | 349 | ORFUSS | | Y | $289.38 |
| 148 | 0 | 16A | 484 | BLDG | WALLACE | N | $0.00 |
| 149 | 0 | 16B | 508 | BLDG | MURRAY | N | $0.00 |
| 150 | 352 | 16C | 352 | SMILOVIK | | Y | $291.87 |
| 151 | 0 | PH | 905 | BLDG | KAPLAN | N | $0.00 |
| 152 | | | ----- | | | | |
| 153 | 15,266 | | 19,281 | | | | 12,658 |

| | H | I | J | K | L | M | N |
|---|---|---|---|---|---|---|---|
| 101 | **Paying=Y** | **11/93** | **Paying=Y** | **12/93** | **Paying=Y** | **1/94** | **Paying=Y** |
| 102 | | **0.829177771** | | **0.829177771** | | **0.829177771** | |
| 136 | N | $0.00 | N | $0.00 | N | $0.00 | N |
| 137 | Y | $404.64 | Y | $404.64 | Y | $404.64 | Y |
| 138 | Y | $281.92 | Y | $281.92 | Y | $281.92 | Y |
| 139 | Y | $388.88 | Y | $388.88 | Y | $388.88 | Y |
| 140 | Y | $408.78 | Y | $408.78 | Y | $408.78 | Y |
| 141 | Y | $284.41 | Y | $284.41 | Y | $284.41 | Y |
| 142 | Y | $393.03 | Y | $393.03 | Y | $393.03 | Y |
| 143 | N | $0.00 | N | $0.00 | N | $0.00 | N |
| 144 | Y | $286.90 | Y | $286.90 | Y | $286.90 | Y |
| 145 | Y | $397.18 | Y | $397.18 | Y | $397.18 | Y |
| 146 | Y | $417.08 | Y | $417.08 | Y | $417.08 | Y |
| 147 | Y | $289.38 | Y | $289.38 | Y | $289.38 | Y |
| 148 | N | $0.00 | N | $0.00 | N | $0.00 | N |
| 149 | N | $0.00 | N | $0.00 | N | $0.00 | N |
| 150 | Y | $291.87 | Y | $291.87 | Y | $291.87 | Y |
| 151 | N | $0.00 | N | $0.00 | N | $0.00 | N |
| 152 | | | | | | | |
| 153 | | 12,658 | | 12,658 | | 12,658 | |

| | O | P | Q | R | S | T | U |
|---|---|---|---|---|---|---|---|
| 101 | **2/94** | **Paying=Y** | **3/94** | **Paying=Y** | **4/94** | **Paying=Y** | **5/94** |
| 102 | **0.829177771** | | **0.829177771** | | **0.829177771** | | **0.829177771** |
| 136 | $0.00 | N | $0.00 | N | $0.00 | N | $0.00 |
| 137 | $404.64 | Y | $404.64 | Y | $404.64 | Y | $404.64 |
| 138 | $281.92 | Y | $281.92 | Y | $281.92 | Y | $281.92 |
| 139 | $388.88 | Y | $388.88 | Y | $388.88 | Y | $388.88 |
| 140 | $408.78 | N | $0.00 | N | $0.00 | N | $0.00 |
| 141 | $284.41 | Y | $284.41 | Y | $284.41 | Y | $284.41 |
| 142 | $393.03 | Y | $393.03 | Y | $393.03 | Y | $393.03 |
| 143 | $0.00 | N | $0.00 | N | $0.00 | N | $0.00 |
| 144 | $286.90 | Y | $286.90 | Y | $286.90 | Y | $286.90 |
| 145 | $397.18 | Y | $397.18 | Y | $397.18 | Y | $397.18 |
| 146 | $417.08 | Y | $417.08 | Y | $417.08 | Y | $417.08 |
| 147 | $289.38 | Y | $289.38 | Y | $289.38 | Y | $289.38 |
| 148 | $0.00 | N | $0.00 | N | $0.00 | N | $0.00 |
| 149 | $0.00 | N | $0.00 | N | $0.00 | N | $0.00 |
| 150 | $291.87 | Y | $291.87 | Y | $291.87 | Y | $291.87 |
| 151 | $0.00 | N | $0.00 | N | $0.00 | N | $0.00 |
| 152 | | | | | | | |
| 153 | 12,658 | | 12,249 | | 11,890 | 87,430.16 | 11,890 |

| | V | W | X | Y | Z | AA | AB |
|---|---|---|---|---|---|---|---|
| 101 | **Paying=Y** | **6/94** | **Paying=Y** | **7/94** | **Paying=Y** | **8/94** | **Paying=Y** |
| 102 | | **0.829177771** | | **0.829177771** | | **0.829177771** | |
| 136 | N | $0.00 | N | $0.00 | N | $0.00 | N |
| 137 | Y | $404.64 | Y | $404.64 | Y | $404.64 | Y |
| 138 | Y | $281.92 | Y | $281.92 | Y | $281.92 | Y |
| 139 | Y | $388.88 | Y | $388.88 | Y | $388.88 | Y |
| 140 | N | $0.00 | N | $0.00 | N | $0.00 | N |
| 141 | Y | $284.41 | Y | $284.41 | Y | $284.41 | Y |
| 142 | Y | $393.03 | Y | $393.03 | Y | $393.03 | Y |
| 143 | N | $0.00 | N | $0.00 | N | $0.00 | N |
| 144 | Y | $286.90 | Y | $286.90 | Y | $286.90 | Y |
| 145 | Y | $397.18 | Y | $397.18 | Y | $397.18 | N |
| 146 | Y | $417.08 | Y | $417.08 | Y | $417.08 | Y |
| 147 | Y | $289.38 | Y | $289.38 | Y | $289.38 | Y |
| 148 | N | $0.00 | N | $0.00 | N | $0.00 | N |
| 149 | N | $0.00 | N | $0.00 | N | $0.00 | N |
| 150 | Y | $291.87 | Y | $291.87 | Y | $291.87 | Y |
| 151 | N | $0.00 | N | $0.00 | N | $0.00 | N |
| 152 | | | | | | | |
| 153 | 174,091.68 | 11,890 | | 11,890 | | 11,890 | |

| | AC | AD | AE |
|---|---|---|---|
| 101 | **9/94** | **Paying=Y** | **10/94** |
| 102 | **0.829177771** | | **0.829177771** |
| 136 | $0.00 | N | $0.00 |
| 137 | $404.64 | Y | $404.64 |
| 138 | $281.92 | Y | $281.92 |
| 139 | $388.88 | Y | $388.88 |
| 140 | $0.00 | N | $0.00 |
| 141 | $284.41 | Y | $284.41 |
| 142 | $393.03 | Y | $393.03 |
| 143 | $0.00 | N | $0.00 |
| 144 | $286.90 | Y | $286.90 |
| 145 | $0.00 | N | $0.00 |
| 146 | $417.08 | Y | $417.08 |
| 147 | $289.38 | Y | $289.38 |
| 148 | $0.00 | N | $0.00 |
| 149 | $0.00 | N | $0.00 |
| 150 | $291.87 | Y | $291.87 |
| 151 | $0.00 | N | $0.00 |
| 152 | | | |
| 153 | 11,492 | 47,161.14 | 11,492 |

TABLE I – C

| | A | B | C | D | E | F | G |
|---|---|---|---|---|---|---|---|
| 101 | | **Unit** | **Total** | **Owner** | **Tenant** | **Paying=Y** | **10/93** |
| 102 | | | **Shares** | | | | **0.829177771** |
| 155 | | Prepayments | | Unit | | | |
| 156 | | | | Shares | | | |
| 157 | | | | Prin. Amt/Share | | | |
| 158 | | | | Total | | | |
| 159 | | | | | | | |
| 160 | | | | Unit | | | |
| 161 | | | | Shares | | | |
| 162 | | | | Prin. Amt/Share | | | |
| 163 | | | | Total | | | |
| 164 | | | | | | | |
| 165 | | | | Unit | | | |
| 166 | | | | Shares | | | |
| 167 | | | | Prin. Amt/Share | | | |
| 168 | | | | Total | | | |
| 169 | | | | | | | |
| 170 | | | | | | | |
| 171 | | | | | | | |

| | H | I | J | K | L | M | N |
|---|---|---|---|---|---|---|---|
| 101 | Paying=Y | 11/93 | Paying=Y | 12/93 | Paying=Y | 1/94 | Paying=Y |
| 102 | | 0.829177771 | | 0.829177771 | | 0.829177771 | |
| 155 | | | | | | | |
| 156 | | | | | | | |
| 157 | | | | | | | |
| 158 | | | | | | | |
| 159 | | | | | | | |
| 160 | | | | | | | |
| 161 | | | | | | | |
| 162 | | | | | | | |
| 163 | | | | | | | |
| 164 | | | | | | | |
| 165 | | | | | | | |
| 166 | | | | | | | |
| 167 | | | | | | | |
| 168 | | | | | | | |
| 169 | | | | | | | |
| 170 | | | | | | | |
| 171 | | | | | | | |

| | O | P | Q | R | S | T | U |
|---|---|---|---|---|---|---|---|
| 101 | **2/94** | **Paying=Y** | **3/94** | **Paying=Y** | **4/94** | **Paying=Y** | **5/94** |
| 102 | **0.829177771** | | **0.829177771** | | **0.829177771** | | **0.829177771** |
| 155 | 12B | | 5A | | | | |
| 156 | 493 | | 434 | | | | |
| 157 | 63.91 | | 63.05 | | | | |
| 158 | 31507.63 | | 27,363.70 | | | 58,871.33 | |
| 159 | | | | | | | |
| 160 | | | | | | | |
| 161 | | | | | | | |
| 162 | | | | | | | |
| 163 | | | | | | 0.00 | |
| 164 | | | | | | | |
| 165 | | | | | | | |
| 166 | | | | | | | |
| 167 | | | | | | | |
| 168 | | | | | | | |
| 169 | | | | | | | |
| 170 | | Total Prepayment | | | | 146,301.49 | |
| 171 | | | | | | | |

| | V | W | X | Y | Z | AA | AB |
|---|---|---|---|---|---|---|---|
| 101 | **Paying=Y** | **6/94** | **Paying=Y** | **7/94** | **Paying=Y** | **8/94** | **Paying=Y** |
| 102 | | **0.829177771** | | **0.829177771** | | **0.829177771** | |
| 155 | | | | | | 15A | |
| 156 | | | | | | 479 | |
| 157 | | | | | | 56.38 | |
| 158 | | | | | | 27,007.98 | |
| 159 | | | | | | | |
| 160 | | | | | | | |
| 161 | | | | | | | |
| 162 | | | | | | | |
| 163 | | | | | | | |
| 164 | | | | | | | |
| 165 | | | | | | | |
| 166 | | | | | | | |
| 167 | | | | | | | |
| 168 | | | | | | | |
| 169 | | | | | | | |
| 170 | | | | | | | |
| 171 | | | | | | | |

| | AC | AD |
|---|---|---|
| 101 | **9/94** | **Paying=Y** |
| 102 | **0.829177771** | |
| 155 | | |
| 156 | | |
| 157 | | |
| 158 | | 27,007.98 |
| 159 | | 74,169.12 |
| 160 | | |
| 161 | | |
| 162 | | |
| 163 | | 0.00 |
| 164 | | |
| 165 | | |
| 166 | | |
| 167 | | |
| 168 | | |
| 169 | | |
| 170 | | |
| 171 | | |

TABLE I – D

| | A | B | C | D | E |
|---|---|---|---|---|---|
| 175 | **Reconciliation** | | | | To Be Paid |
| 176 | | | | | |
| 177 | Principal due | | 6Mos | | 76,923.08 |
| 178 | | | April | | 12820.51 |
| 179 | Less: | | 2 mos 12B | | -817.57 |
| 180 | | | 1mos 5A | | -359.86 |
| 181 | Monthly Amort. Cllect | | | | 88,566.16 |
| 182 | | | | | |
| 183 | Plus Due on Sale Payments | | 12A | | 31,507.63 |
| 184 | | | 5A | | 27,363.70 |
| 185 | | | | | 147,437.49 |
| 186 | Amount Collected: | | | | (146,301.49) |
| 187 | Timing Differences | | | | 1,135.99 |
| 188 | | | | | |
| 189 | | | | | |
| 190 | | 01B | 0 | BLDG | HERRERA |
| 191 | | 02A | 419 | BLDG | WEILL |
| 192 | | 02C | 313 | BLDG | DUNSTON |
| 193 | | 03A | 424 | BLDG | MARX |
| 194 | | 11A | 464 | BLDG | SIMON |

| | A | B | C | D | E |
|---|---|---|---|---|---|
| 195 | | 14B | 498 | BLDG | PEARSON |
| 196 | | 16A | 484 | BLDG | WALLACE |
| 197 | | 16B | 508 | BLDG | MURRAY |
| 198 | | PH | 905 | BLDG | KAPLAN |
| 199 | | | 4015 | | |
| 200 | | | | | |
| 201 | | | | | |
| 202 | | | | | |
| 203 | | | | | |
| 204 | | | | | |
| 205 | | 01C | 132 | MILLER | MORGAN |
| 206 | | 03C | 316 | URBAN/FRIEDBERG | SKOLER |
| 207 | | 06A | 439 | NIAGARA ASSETS | MARGINI |
| 208 | | 06B | 463 | URB/MARGOLIES/GRSS | NORSA |
| 209 | | 07B | 468 | URBAN ASSTS GRP | PEPPER |
| 210 | | 07D | 182 | URBAN/KOTLER | BABIJ |
| 211 | | 14A | 474 | DIME | CASTILE |
| 212 | | 15B | 503 | URBAN/MALMAN | KARIA |
| 213 | | | ----- | | |
| 214 | | | 2977 | | |

TABLE II – A

| | A | B | C | D |
|---|---|---|---|---|
| 1 | | AMORTIZATION OF $1 MIL | | |
| 2 | | AMORTIZATION IN | | 13 |
| 3 | | PAYING SHARES | | 15266 |
| 4 | | PRINC ASSESS | | 79 |
| 5 | | | | |
| 6 | | | =1000000*0.05/2 | =13.06*D3/2 |
| 7 | | | | |
| 8 | | | | |
| 9 | | | | |
| 10 | **Prepayments** | **MONTH** | | **BEG BAL** |
| 11 | | | | |
| 12 | | 1 | 5/93 | 1000000 |
| 13 | | =B12+1 | 6/93 | =D12-F12 |
| 14 | | =B13+1 | 7/93 | =D13-F13 |
| 15 | | =B14+1 | 8/93 | =D14-F14 |
| 16 | | =B15+1 | 9/93 | =D15-F15 |
| 17 | | =B16+1 | 10/93 | =D16-F16 |
| 18 | | =B17+1 | 11/93 | =D17-F17 |
| 19 | | =B18+1 | 12/93 | =D18-F18 |
| 20 | | =B19+1 | 1/94 | =D19-F19 |

| | E | F | G | H |
|---|---|---|---|---|
| 1 | | | | |
| 2 | INSTALLMENTS TO | HANCOCK | (4/94, 10/94, 4/95, 10/95, 4/96, | 10/96, 4/97, 10/97, 4/98, 10/98, |
| 3 | | | | |
| 4 | MONTHS STARTING | (1 MONTH LEAD | PLUS 1 EXTRA MONTH IN FIRST | PERIOD: 10/93-4/94), ENDING 4/00 |
| 5 | | | | |
| 6 | =D6-C6 | | | |
| 7 | | | | |
| 8 | | | | PRINC |
| 9 | | | | ASSESS |
| 10 | INT | AMORT | | SHARE |
| 11 | | | | |
| 12 | =D12*0.05/12 | 0 | | =IF(84-D$4>=B12,0,1000000/D$4/D$3) |
| 13 | =D13*0.05/12 | 0 | | =IF(84-D$4>=B13,0,1000000/D$4/D$3) |
| 14 | =D14*0.05/12 | 0 | | =IF(84-D$4>=B14,0,1000000/D$4/D$3) |
| 15 | =D15*0.05/12 | 0 | | =IF(84-D$4>=B15,0,1000000/D$4/D$3) |
| 16 | =D16*0.05/12 | 0 | | =IF(84-D$4>=B16,0,1000000/D$4/D$3) |
| 17 | =D17*0.05/12 | 0 | | =IF(84-D$4>=B17,0,1000000/D$4/D$3) |
| 18 | =D18*0.05/12 | 0 | | =IF(84-D$4>=B18,0,1000000/D$4/D$3) |
| 19 | =D19*0.05/12 | 0 | | =IF(84-D$4>=B19,0,1000000/D$4/D$3) |
| 20 | =D20*0.05/12 | 0 | | =IF(84-D$4>=B20,0,1000000/D$4/D$3) |

| | I | J | K | L |
|---|---|---|---|---|
| 1 | | | | |
| 2 | 4/99, 10/99, 4/00) | | | |
| 3 | | | | |
| 4 | | | | |
| 5 | | | | |
| 6 | | | | |
| 7 | | | | |
| 8 | **INT** | **TOT** | **TOT** | **TOT** |
| 9 | **ASSESS** | **ASSESS** | **COOP** | **COOP** |
| 10 | **SHARE** | **SHARE** | **PRINC** | **INT** |
| 11 | | | | |
| 12 | N.A. | =H12+I12 | =D$3*H12 | =D$3*I12 |
| 13 | N.A. | =H13+I13 | =D$3*H13 | =D$3*I13 |
| 14 | N.A. | =H14+I14 | =D$3*H14 | =D$3*I14 |
| 15 | N.A. | =H15+I15 | =D$3*H15 | =D$3*I15 |
| 16 | N.A. | =H16+I16 | =D$3*H16 | =D$3*I16 |
| 17 | =SUM(E$17:E$31)/D$3/15 | =H17+I17 | =D$3*H17 | =D$3*I17 |
| 18 | =SUM(E$17:E$31)/D$3/15 | =H18+I18 | =D$3*H18 | =D$3*I18 |
| 19 | =SUM(E$17:E$31)/D$3/15 | =H19+I19 | =D$3*H19 | =D$3*I19 |
| 20 | =SUM(E$17:E$31)/D$3/15 | =H20+I20 | =D$3*H20 | =D$3*I20 |

| | M | N | O |
|---|---|---|---|
| 1 | | | |
| 2 | | | |
| 3 | | | |
| 4 | | | |
| 5 | | | |
| 6 | | | |
| 7 | | | |
| 8 | NET | NET | |
| 9 | COOP | CASH | |
| 10 | CASH | TO DATE | |
| 11 | | | |
| 12 | N.A. | N.A. | |
| 13 | N.A. | N.A. | |
| 14 | N.A. | N.A. | |
| 15 | N.A. | N.A. | |
| 16 | N.A. | N.A. | |
| 17 | =K17+L17-E17-F17 | =SUM(M$12:M17) | |
| 18 | =K18+L18-E18-F18 | =SUM(M$12:M18) | |
| 19 | =K19+L19-E19-F19 | =SUM(M$12:M19) | |
| 20 | =K20+L20-E20-F20 | =SUM(M$12:M20) | |

| | P | Q | R | S |
|---|---|---|---|---|
| 1 | | | | |
| 2 | INDIVIDUAL APARTMENT | | | |
| 3 | 1 | SHARES | | |
| 4 | | | | |
| 5 | | | | |
| 6 | | | | |
| 7 | | | | |
| 8 | | | | **UNPAID** |
| 9 | **PRINC** | **INT** | **TOT** | **ASSESS** |
| 10 | **ASSESS** | **ASSESS** | **ASSESS** | **END MO** |
| 11 | | | | |
| 12 | =P$3*H12 | =P$3*I12 | =P12+Q12 | =1000000/D3*P3 |
| 13 | =P$3*H13 | =P$3*I13 | =P13+Q13 | =S12-P13 |
| 14 | =P$3*H14 | =P$3*I14 | =P14+Q14 | =S13-P14 |
| 15 | =P$3*H15 | =P$3*I15 | =P15+Q15 | =S14-P15 |
| 16 | =P$3*H16 | =P$3*I16 | =P16+Q16 | =S15-P16 |
| 17 | =P$3*H17 | =P$3*I17 | =P17+Q17 | =S16-P17 |
| 18 | =P$3*H18 | =P$3*I18 | =P18+Q18 | =S17-P18 |
| 19 | =P$3*H19 | =P$3*I19 | =P19+Q19 | =S18-P19 |
| 20 | =P$3*H20 | =P$3*I20 | =P20+Q20 | =S19-P20 |

| | T | U |
|---|---|---|
| 1 | | |
| 2 | | |
| 3 | | |
| 4 | | |
| 5 | | |
| 6 | | |
| 7 | | |
| 8 | INT TO | TOTAL |
| 9 | NEXT | DUE |
| 10 | AMORT | COOP |
| 11 | | |
| 12 | N.A. | =S12+T12 |
| 13 | N.A. | =S13+T13 |
| 14 | N.A. | =S14+T14 |
| 15 | N.A. | =S15+T15 |
| 16 | =SUM(E17:E$22)/D$3*P$3 | =S16+T16 |
| 17 | =SUM(E18:E$22)/D$3*P$3 | =S17+T17 |
| 18 | =SUM(E19:E$22)/D$3*P$3 | =S18+T18 |
| 19 | =SUM(E20:E$22)/D$3*P$3 | =S19+T19 |
| 20 | =SUM(E21:E$22)/D$3*P$3 | =S20+T20 |

| | A | B | C | D |
|---|---|---|---|---|
| 8 | | | | |
| 9 | | | | |
| 10 | **Prepayments** | **MONTH** | | **BEG BAL** |
| 21 | =O157 | =B20+1 | 2/94 | =D20-F20 |
| 22 | =P157 | =B21+1 | 3/94 | =D21-F21 |
| 23 | | =B22+1 | 4/94 | =D22-F22 |
| 24 | | =B23+1 | 5/94 | =D23-F23 |
| 25 | | =B24+1 | 6/94 | =D24-F24 |
| 26 | | =B25+1 | 7/94 | =D25-F25 |
| 27 | | =B26+1 | 8/94 | =D26-F26 |
| 28 | | =B27+1 | 9/94 | =D27-F27 |
| 29 | | =B28+1 | 10/94 | =D28-F28 |
| 30 | | =B29+1 | 11/94 | =D29-F29 |
| 31 | | =B30+1 | 12/94 | =D30-F30 |
| 32 | | =B31+1 | 1/95 | =D31-F31 |
| 33 | | =B32+1 | 2/95 | =D32-F32 |
| 34 | | =B33+1 | 3/95 | =D33-F33 |
| 35 | | =B34+1 | 4/95 | =D34-F34 |
| 36 | | =B35+1 | 5/95 | =D35-F35 |
| 37 | | =B36+1 | 6/95 | =D36-F36 |

| | E | F | G | H |
|---|---|---|---|---|
| 8 | | | | PRINC |
| 9 | | | | ASSESS |
| 10 | INT | AMORT | | SHARE |
| 21 | =D21*0.05/12 | 0 | | =IF(84-D$4>=B21,0,1000000/D$4/D$3) |
| 22 | =D22*0.05/12 | 0 | | =IF(84-D$4>=B22,0,1000000/D$4/D$3) |
| 23 | =D23*0.05/12 | =1000000/D$2 | | =IF(84-D$4>=B23,0,1000000/D$4/D$3) |
| 24 | =D24*0.05/12 | 0 | | =IF(84-D$4>=B24,0,1000000/D$4/D$3) |
| 25 | =D25*0.05/12 | 0 | | =IF(84-D$4>=B25,0,1000000/D$4/D$3) |
| 26 | =D26*0.05/12 | 0 | | =IF(84-D$4>=B26,0,1000000/D$4/D$3) |
| 27 | =D27*0.05/12 | 0 | | =IF(84-D$4>=B27,0,1000000/D$4/D$3) |
| 28 | =D28*0.05/12 | 0 | | =IF(84-D$4>=B28,0,1000000/D$4/D$3) |
| 29 | =D29*0.05/12 | =1000000/D$2 | | =IF(84-D$4>=B29,0,1000000/D$4/D$3) |
| 30 | =D30*0.05/12 | 0 | | =IF(84-D$4>=B30,0,1000000/D$4/D$3) |
| 31 | =D31*0.05/12 | 0 | | =IF(84-D$4>=B31,0,1000000/D$4/D$3) |
| 32 | =D32*0.05/12 | 0 | | =IF(84-D$4>=B32,0,1000000/D$4/D$3) |
| 33 | =D33*0.05/12 | 0 | | =IF(84-D$4>=B33,0,1000000/D$4/D$3) |
| 34 | =D34*0.05/12 | 0 | | =IF(84-D$4>=B34,0,1000000/D$4/D$3) |
| 35 | =D35*0.05/12 | =1000000/D$2 | | =IF(84-D$4>=B35,0,1000000/D$4/D$3) |
| 36 | =D36*0.06/12 | 0 | | =IF(84-D$4>=B36,0,1000000/D$4/D$3) |
| 37 | =D37*0.06/12 | 0 | | =IF(84-D$4>=B37,0,1000000/D$4/D$3) |

| | I | J | K | L |
|---|---|---|---|---|
| 8 | INT | TOT | TOT | TOT |
| 9 | ASSESS | ASSESS | COOP | COOP |
| 10 | SHARE | SHARE | PRINC | INT |
| 21 | =SUM(E$17:E$31)/D$3/15 | =H21+I21 | =D$3*H21 | =D$3*I21 |
| 22 | =SUM(E$17:E$31)/D$3/15 | =H22+I22 | =D$3*H22 | =D$3*I22 |
| 23 | =SUM(E$17:E$31)/D$3/15 | =H23+I23 | =D$3*H23 | =D$3*I23 |
| 24 | =SUM(E$17:E$31)/D$3/15 | =H24+I24 | =D$3*H24 | =D$3*I24 |
| 25 | =SUM(E$17:E$31)/D$3/15 | =H25+I25 | =D$3*H25 | =D$3*I25 |
| 26 | =SUM(E$17:E$31)/D$3/15 | =H26+I26 | =D$3*H26 | =D$3*I26 |
| 27 | =SUM(E$17:E$31)/D$3/15 | =H27+I27 | =D$3*H27 | =D$3*I27 |
| 28 | =SUM(E$17:E$31)/D$3/15 | =H28+I28 | =D$3*H28 | =D$3*I28 |
| 29 | =SUM(E$17:E$31)/D$3/15 | =H29+I29 | =D$3*H29 | =D$3*I29 |
| 30 | =SUM(E$17:E$31)/D$3/15 | =H30+I30 | =D$3*H30 | =D$3*I30 |
| 31 | =SUM(E$17:E$31)/D$3/15 | =H31+I31 | =D$3*H31 | =D$3*I31 |
| 32 | =SUM(E$32:E$43)/D$3/12 | =H32+I32 | =D$3*H32 | =D$3*I32 |
| 33 | =SUM(E$32:E$43)/D$3/12 | =H33+I33 | =D$3*H33 | =D$3*I33 |
| 34 | =SUM(E$32:E$43)/D$3/12 | =H34+I34 | =D$3*H34 | =D$3*I34 |
| 35 | =SUM(E$32:E$43)/D$3/12 | =H35+I35 | =D$3*H35 | =D$3*I35 |
| 36 | =SUM(E$32:E$43)/D$3/12 | =H36+I36 | =D$3*H36 | =D$3*I36 |
| 37 | =SUM(E$32:E$43)/D$3/12 | =H37+I37 | =D$3*H37 | =D$3*I37 |

| | M | N | O |
|---|---|---|---|
| 8 | NET | NET | |
| 9 | COOP | CASH | |
| 10 | CASH | TO DATE | |
| 21 | =K21+L21-E21-F21 | =SUM(M$12:M21) | |
| 22 | =K22+L22-E22-F22 | =SUM(M$12:M22) | |
| 23 | =K23+L23-E23-F23 | =SUM(M$12:M23) | |
| 24 | =K24+L24-E24-F24 | =SUM(M$12:M24) | |
| 25 | =K25+L25-E25-F25 | =SUM(M$12:M25) | |
| 26 | =K26+L26-E26-F26 | =SUM(M$12:M26) | |
| 27 | =K27+L27-E27-F27 | =SUM(M$12:M27) | |
| 28 | =K28+L28-E28-F28 | =SUM(M$12:M28) | |
| 29 | =K29+L29-E29-F29 | =SUM(M$12:M29) | |
| 30 | =K30+L30-E30-F30 | =SUM(M$12:M30) | |
| 31 | =K31+L31-E31-F31 | =SUM(M$12:M31) | |
| 32 | =K32+L32-E32-F32 | =SUM(M$12:M32) | |
| 33 | =K33+L33-E33-F33 | =SUM(M$12:M33) | |
| 34 | =K34+L34-E34-F34 | =SUM(M$12:M34) | |
| 35 | =K35+L35-E35-F35 | =SUM(M$12:M35) | |
| 36 | =K36+L36-E36-F36 | =SUM(M$12:M36) | |
| 37 | =K37+L37-E37-F37 | =SUM(M$12:M37) | |

| | P | Q | R | S |
|---|---|---|---|---|
| 8 | | | | UNPAID |
| 9 | PRINC | INT | TOT | ASSESS |
| 10 | ASSESS | ASSESS | ASSESS | END MO |
| 21 | =P$3*H21 | =P$3*I21 | =P21+Q21 | =S20-P21 |
| 22 | =P$3*H22 | =P$3*I22 | =P22+Q22 | =S21-P22 |
| 23 | =P$3*H23 | =P$3*I23 | =P23+Q23 | =S22-P23 |
| 24 | =P$3*H24 | =P$3*I24 | =P24+Q24 | =S23-P24 |
| 25 | =P$3*H25 | =P$3*I25 | =P25+Q25 | =S24-P25 |
| 26 | =P$3*H26 | =P$3*I26 | =P26+Q26 | =S25-P26 |
| 27 | =P$3*H27 | =P$3*I27 | =P27+Q27 | =S26-P27 |
| 28 | =P$3*H28 | =P$3*I28 | =P28+Q28 | =S27-P28 |
| 29 | =P$3*H29 | =P$3*I29 | =P29+Q29 | =S28-P29 |
| 30 | =P$3*H30 | =P$3*I30 | =P30+Q30 | =S29-P30 |
| 31 | =P$3*H31 | =P$3*I31 | =P31+Q31 | =S30-P31 |
| 32 | =P$3*H32 | =P$3*I32 | =P32+Q32 | =S31-P32 |
| 33 | =P$3*H33 | =P$3*I33 | =P33+Q33 | =S32-P33 |
| 34 | =P$3*H34 | =P$3*I34 | =P34+Q34 | =S33-P34 |
| 35 | =P$3*H35 | =P$3*I35 | =P35+Q35 | =S34-P35 |
| 36 | =P$3*H36 | =P$3*I36 | =P36+Q36 | =S35-P36 |
| 37 | =P$3*H37 | =P$3*I37 | =P37+Q37 | =S36-P37 |

| | T | U |
|---|---|---|
| 8 | INT TO | TOTAL |
| 9 | NEXT | DUE |
| 10 | AMORT | COOP |
| 21 | =SUM(E$22)/D$3*P$3 | =S21+T21 |
| 22 | 0 | =S22+T22 |
| 23 | =SUM(E24:E$28)/D$3*P$3 | =S23+T23 |
| 24 | =SUM(E25:E$28)/D$3*P$3 | =S24+T24 |
| 25 | =SUM(E26:E$28)/D$3*P$3 | =S25+T25 |
| 26 | =SUM(E27:E$28)/D$3*P$3 | =S26+T26 |
| 27 | =SUM(E$28)/D$3*P$3 | =S27+T27 |
| 28 | 0 | =S28+T28 |
| 29 | =SUM(E30:E$34)/D$3*P$3 | =S29+T29 |
| 30 | =SUM(E31:E$34)/D$3*P$3 | =S30+T30 |
| 31 | =SUM(E32:E$34)/D$3*P$3 | =S31+T31 |
| 32 | =SUM(E33:E$34)/D$3*P$3 | =S32+T32 |
| 33 | =SUM(E$34)/D$3*P$3 | =S33+T33 |
| 34 | 0 | =S34+T34 |
| 35 | =SUM(E36:E$40)/D$3*P$3 | =S35+T35 |
| 36 | =SUM(E37:E$40)/D$3*P$3 | =S36+T36 |
| 37 | =SUM(E38:E$40)/D$3*P$3 | =S37+T37 |

| | A | B | C | D |
|---|---|---|---|---|
| 8 | | | | |
| 9 | | | | |
| 10 | **Prepayments** | **MONTH** | | **BEG BAL** |
| 38 | | =B37+1 | 7/95 | =D37-F37 |
| 39 | | =B38+1 | 8/95 | =D38-F38 |
| 40 | | =B39+1 | 9/95 | =D39-F39 |
| 41 | | =B40+1 | 10/95 | =D40-F40 |
| 42 | | =B41+1 | 11/95 | =D41-F41 |
| 43 | | =B42+1 | 12/95 | =D42-F42 |
| 44 | | =B43+1 | 1/96 | =D43-F43 |
| 45 | | =B44+1 | 2/96 | =D44-F44 |
| 46 | | =B45+1 | 3/96 | =D45-F45 |
| 47 | | =B46+1 | 4/96 | =D46-F46 |
| 48 | | =B47+1 | 5/96 | =D47-F47 |
| 49 | | =B48+1 | 6/96 | =D48-F48 |
| 50 | | =B49+1 | 7/96 | =D49-F49 |
| 51 | | =B50+1 | 8/96 | =D50-F50 |
| 52 | | =B51+1 | 9/96 | =D51-F51 |
| 53 | | =B52+1 | 10/96 | =D52-F52 |
| 54 | | =B53+1 | 11/96 | =D53-F53 |

| | E | F | G | H |
|---|---|---|---|---|
| 8 | | | | PRINC |
| 9 | | | | ASSESS |
| 10 | INT | AMORT | | SHARE |
| 38 | =D38*0.06/12 | 0 | | =IF(84-D$4>=B38,0,1000000/D$4/D$3) |
| 39 | =D39*0.06/12 | 0 | | =IF(84-D$4>=B39,0,1000000/D$4/D$3) |
| 40 | =D40*0.06/12 | 0 | | =IF(84-D$4>=B40,0,1000000/D$4/D$3) |
| 41 | =D41*0.06/12 | =1000000/D$2 | | =IF(84-D$4>=B41,0,1000000/D$4/D$3) |
| 42 | =D42*0.06/12 | 0 | | =IF(84-D$4>=B42,0,1000000/D$4/D$3) |
| 43 | =D43*0.06/12 | 0 | | =IF(84-D$4>=B43,0,1000000/D$4/D$3) |
| 44 | =D44*0.06/12 | 0 | | =IF(84-D$4>=B44,0,1000000/D$4/D$3) |
| 45 | =D45*0.06/12 | 0 | | =IF(84-D$4>=B45,0,1000000/D$4/D$3) |
| 46 | =D46*0.06/12 | 0 | | =IF(84-D$4>=B46,0,1000000/D$4/D$3) |
| 47 | =D47*0.06/12 | =1000000/D$2 | | =IF(84-D$4>=B47,0,1000000/D$4/D$3) |
| 48 | =D48*0.0725/12 | 0 | | =IF(84-D$4>=B48,0,1000000/D$4/D$3) |
| 49 | =D49*0.0725/12 | 0 | | =IF(84-D$4>=B49,0,1000000/D$4/D$3) |
| 50 | =D50*0.0725/12 | 0 | | =IF(84-D$4>=B50,0,1000000/D$4/D$3) |
| 51 | =D51*0.0725/12 | 0 | | =IF(84-D$4>=B51,0,1000000/D$4/D$3) |
| 52 | =D52*0.0725/12 | 0 | | =IF(84-D$4>=B52,0,1000000/D$4/D$3) |
| 53 | =D53*0.0725/12 | =1000000/D$2 | | =IF(84-D$4>=B53,0,1000000/D$4/D$3) |
| 54 | =D54*0.0725/12 | 0 | | =IF(84-D$4>=B54,0,1000000/D$4/D$3) |

| | I | J | K | L |
|---|---|---|---|---|
| 8 | INT | TOT | TOT | TOT |
| 9 | ASSESS | ASSESS | COOP | COOP |
| 10 | SHARE | SHARE | PRINC | INT |
| 38 | =SUM(E$32:E$43)/D$3/12 | =H38+I38 | =D$3*H38 | =D$3*I38 |
| 39 | =SUM(E$32:E$43)/D$3/12 | =H39+I39 | =D$3*H39 | =D$3*I39 |
| 40 | =SUM(E$32:E$43)/D$3/12 | =H40+I40 | =D$3*H40 | =D$3*I40 |
| 41 | =SUM(E$32:E$43)/D$3/12 | =H41+I41 | =D$3*H41 | =D$3*I41 |
| 42 | =SUM(E$32:E$43)/D$3/12 | =H42+I42 | =D$3*H42 | =D$3*I42 |
| 43 | =SUM(E$32:E$43)/D$3/12 | =H43+I43 | =D$3*H43 | =D$3*I43 |
| 44 | =SUM(E$44:E$55)/D$3/12 | =H44+I44 | =D$3*H44 | =D$3*I44 |
| 45 | =SUM(E$44:E$55)/D$3/12 | =H45+I45 | =D$3*H45 | =D$3*I45 |
| 46 | =SUM(E$44:E$55)/D$3/12 | =H46+I46 | =D$3*H46 | =D$3*I46 |
| 47 | =SUM(E$44:E$55)/D$3/12 | =H47+I47 | =D$3*H47 | =D$3*I47 |
| 48 | =SUM(E$44:E$55)/D$3/12 | =H48+I48 | =D$3*H48 | =D$3*I48 |
| 49 | =SUM(E$44:E$55)/D$3/12 | =H49+I49 | =D$3*H49 | =D$3*I49 |
| 50 | =SUM(E$44:E$55)/D$3/12 | =H50+I50 | =D$3*H50 | =D$3*I50 |
| 51 | =SUM(E$44:E$55)/D$3/12 | =H51+I51 | =D$3*H51 | =D$3*I51 |
| 52 | =SUM(E$44:E$55)/D$3/12 | =H52+I52 | =D$3*H52 | =D$3*I52 |
| 53 | =SUM(E$44:E$55)/D$3/12 | =H53+I53 | =D$3*H53 | =D$3*I53 |
| 54 | =SUM(E$44:E$55)/D$3/12 | =H54+I54 | =D$3*H54 | =D$3*I54 |

| | M | N | O |
|---|---|---|---|
| 8 | NET | NET | |
| 9 | COOP | CASH | |
| 10 | CASH | TO DATE | |
| 38 | =K38+L38-E38-F38 | =SUM(M$12:M38) | |
| 39 | =K39+L39-E39-F39 | =SUM(M$12:M39) | |
| 40 | =K40+L40-E40-F40 | =SUM(M$12:M40) | |
| 41 | =K41+L41-E41-F41 | =SUM(M$12:M41) | |
| 42 | =K42+L42-E42-F42 | =SUM(M$12:M42) | |
| 43 | =K43+L43-E43-F43 | =SUM(M$12:M43) | |
| 44 | =K44+L44-E44-F44 | =SUM(M$12:M44) | |
| 45 | =K45+L45-E45-F45 | =SUM(M$12:M45) | |
| 46 | =K46+L46-E46-F46 | =SUM(M$12:M46) | |
| 47 | =K47+L47-E47-F47 | =SUM(M$12:M47) | |
| 48 | =K48+L48-E48-F48 | =SUM(M$12:M48) | |
| 49 | =K49+L49-E49-F49 | =SUM(M$12:M49) | |
| 50 | =K50+L50-E50-F50 | =SUM(M$12:M50) | |
| 51 | =K51+L51-E51-F51 | =SUM(M$12:M51) | |
| 52 | =K52+L52-E52-F52 | =SUM(M$12:M52) | |
| 53 | =K53+L53-E53-F53 | =SUM(M$12:M53) | |
| 54 | =K54+L54-E54-F54 | =SUM(M$12:M54) | |

| | P | Q | R | S |
|---|---|---|---|---|
| 8 | | | | |
| 9 | PRINC | INT | TOT | UNPAID |
| 10 | ASSESS | ASSESS | ASSESS | ASSESS END MO |
| 38 | =P$3*H38 | =P$3*I38 | =P38+Q38 | =S37-P38 |
| 39 | =P$3*H39 | =P$3*I39 | =P39+Q39 | =S38-P39 |
| 40 | =P$3*H40 | =P$3*I40 | =P40+Q40 | =S39-P40 |
| 41 | =P$3*H41 | =P$3*I41 | =P41+Q41 | =S40-P41 |
| 42 | =P$3*H42 | =P$3*I42 | =P42+Q42 | =S41-P42 |
| 43 | =P$3*H43 | =P$3*I43 | =P43+Q43 | =S42-P43 |
| 44 | =P$3*H44 | =P$3*I44 | =P44+Q44 | =S43-P44 |
| 45 | =P$3*H45 | =P$3*I45 | =P45+Q45 | =S44-P45 |
| 46 | =P$3*H46 | =P$3*I46 | =P46+Q46 | =S45-P46 |
| 47 | =P$3*H47 | =P$3*I47 | =P47+Q47 | =S46-P47 |
| 48 | =P$3*H48 | =P$3*I48 | =P48+Q48 | =S47-P48 |
| 49 | =P$3*H49 | =P$3*I49 | =P49+Q49 | =S48-P49 |
| 50 | =P$3*H50 | =P$3*I50 | =P50+Q50 | =S49-P50 |
| 51 | =P$3*H51 | =P$3*I51 | =P51+Q51 | =S50-P51 |
| 52 | =P$3*H52 | =P$3*I52 | =P52+Q52 | =S51-P52 |
| 53 | =P$3*H53 | =P$3*I53 | =P53+Q53 | =S52-P53 |
| 54 | =P$3*H54 | =P$3*I54 | =P54+Q54 | =S53-P54 |

| | T | U |
|---|---|---|
| 8 | INT TO | TOTAL |
| 9 | NEXT | DUE |
| 10 | AMORT | COOP |
| 38 | =SUM(E39:E$40)/D$3*P$3 | =S38+T38 |
| 39 | =SUM(E$40)/D$3*P$3 | =S39+T39 |
| 40 | 0 | =S40+T40 |
| 41 | =SUM(E42:E$46)/D$3*P$3 | =S41+T41 |
| 42 | =SUM(E43:E$46)/D$3*P$3 | =S42+T42 |
| 43 | =SUM(E44:E$46)/D$3*P$3 | =S43+T43 |
| 44 | =SUM(E45:E$46)/D$3*P$3 | =S44+T44 |
| 45 | =SUM(E$46)/D$3*P$3 | =S45+T45 |
| 46 | 0 | =S46+T46 |
| 47 | =SUM(E48:E$52)/D$3*P$3 | =S47+T47 |
| 48 | =SUM(E49:E$52)/D$3*P$3 | =S48+T48 |
| 49 | =SUM(E50:E$52)/D$3*P$3 | =S49+T49 |
| 50 | =SUM(E51:E$52)/D$3*P$3 | =S50+T50 |
| 51 | =SUM(E$52)/D$3*P$3 | =S51+T51 |
| 52 | 0 | =S52+T52 |
| 53 | =SUM(E54:E$58)/D$3*P$3 | =S53+T53 |
| 54 | =SUM(E55:E$58)/D$3*P$3 | =S54+T54 |

| | A | B | C | D |
|---|---|---|---|---|
| 8 | | | | |
| 9 | | | | |
| 10 | **Prepayments** | **MONTH** | | **BEG BAL** |
| 55 | | =B54+1 | 12/96 | =D54-F54 |
| 56 | | =B55+1 | 1/97 | =D55-F55 |
| 57 | | =B56+1 | 2/97 | =D56-F56 |
| 58 | | =B57+1 | 3/97 | =D57-F57 |
| 59 | | =B58+1 | 4/97 | =D58-F58 |
| 60 | | =B59+1 | 5/97 | =D59-F59 |
| 61 | | =B60+1 | 6/97 | =D60-F60 |
| 62 | | =B61+1 | 7/97 | =D61-F61 |
| 63 | | =B62+1 | 8/97 | =D62-F62 |
| 64 | | =B63+1 | 9/97 | =D63-F63 |
| 65 | | =B64+1 | 10/97 | =D64-F64 |
| 66 | | =B65+1 | 11/97 | =D65-F65 |
| 67 | | =B66+1 | 12/97 | =D66-F66 |
| 68 | | =B67+1 | 1/98 | =D67-F67 |
| 69 | | =B68+1 | 2/98 | =D68-F68 |
| 70 | | =B69+1 | 3/98 | =D69-F69 |
| 71 | | =B70+1 | 4/98 | =D70-F70 |

| | E | F | G | H |
|---|---|---|---|---|
| 8 | | | | **PRINC** |
| 9 | | | | **ASSESS** |
| 10 | **INT** | **AMORT** | | **SHARE** |
| 55 | =D55*0.0725/12 | 0 | | =IF(84-D$4>=B55,0,1000000/D$4/D$3) |
| 56 | =D56*0.0725/12 | 0 | | =IF(84-D$4>=B56,0,1000000/D$4/D$3) |
| 57 | =D57*0.0725/12 | 0 | | =IF(84-D$4>=B57,0,1000000/D$4/D$3) |
| 58 | =D58*0.0725/12 | 0 | | =IF(84-D$4>=B58,0,1000000/D$4/D$3) |
| 59 | =D59*0.0725/12 | =1000000/D$2 | | =IF(84-D$4>=B59,0,1000000/D$4/D$3) |
| 60 | =D60*0.0725/12 | 0 | | =IF(84-D$4>=B60,0,1000000/D$4/D$3) |
| 61 | =D61*0.0725/12 | 0 | | =IF(84-D$4>=B61,0,1000000/D$4/D$3) |
| 62 | =D62*0.0725/12 | 0 | | =IF(84-D$4>=B62,0,1000000/D$4/D$3) |
| 63 | =D63*0.0725/12 | 0 | | =IF(84-D$4>=B63,0,1000000/D$4/D$3) |
| 64 | =D64*0.0725/12 | 0 | | =IF(84-D$4>=B64,0,1000000/D$4/D$3) |
| 65 | =D65*0.0725/12 | =1000000/D$2 | | =IF(84-D$4>=B65,0,1000000/D$4/D$3) |
| 66 | =D66*0.0725/12 | 0 | | =IF(84-D$4>=B66,0,1000000/D$4/D$3) |
| 67 | =D67*0.0725/12 | 0 | | =IF(84-D$4>=B67,0,1000000/D$4/D$3) |
| 68 | =D68*0.0725/12 | 0 | | =IF(84-D$4>=B68,0,1000000/D$4/D$3) |
| 69 | =D69*0.0725/12 | 0 | | =IF(84-D$4>=B69,0,1000000/D$4/D$3) |
| 70 | =D70*0.0725/12 | 0 | | =IF(84-D$4>=B70,0,1000000/D$4/D$3) |
| 71 | =D71*0.0725/12 | =1000000/D$2 | | =IF(84-D$4>=B71,0,1000000/D$4/D$3) |

| | I | J | K | L |
|---|---|---|---|---|
| 8 | INT | TOT | TOT | TOT |
| 9 | ASSESS | ASSESS | COOP | COOP |
| 10 | SHARE | SHARE | PRINC | INT |
| 55 | =SUM(E$44:E$55)/D$3/12 | =H55+I55 | =D$3*H55 | =D$3*I55 |
| 56 | =SUM(E$56:E$67)/D$3/12 | =H56+I56 | =D$3*H56 | =D$3*I56 |
| 57 | =SUM(E$56:E$67)/D$3/12 | =H57+I57 | =D$3*H57 | =D$3*I57 |
| 58 | =SUM(E$56:E$67)/D$3/12 | =H58+I58 | =D$3*H58 | =D$3*I58 |
| 59 | =SUM(E$56:E$67)/D$3/12 | =H59+I59 | =D$3*H59 | =D$3*I59 |
| 60 | =SUM(E$56:E$67)/D$3/12 | =H60+I60 | =D$3*H60 | =D$3*I60 |
| 61 | =SUM(E$56:E$67)/D$3/12 | =H61+I61 | =D$3*H61 | =D$3*I61 |
| 62 | =SUM(E$56:E$67)/D$3/12 | =H62+I62 | =D$3*H62 | =D$3*I62 |
| 63 | =SUM(E$56:E$67)/D$3/12 | =H63+I63 | =D$3*H63 | =D$3*I63 |
| 64 | =SUM(E$56:E$67)/D$3/12 | =H64+I64 | =D$3*H64 | =D$3*I64 |
| 65 | =SUM(E$56:E$67)/D$3/12 | =H65+I65 | =D$3*H65 | =D$3*I65 |
| 66 | =SUM(E$56:E$67)/D$3/12 | =H66+I66 | =D$3*H66 | =D$3*I66 |
| 67 | =SUM(E$56:E$67)/D$3/12 | =H67+I67 | =D$3*H67 | =D$3*I67 |
| 68 | =SUM(E$68:E$79)/D$3/12 | =H68+I68 | =D$3*H68 | =D$3*I68 |
| 69 | =SUM(E$68:E$79)/D$3/12 | =H69+I69 | =D$3*H69 | =D$3*I69 |
| 70 | =SUM(E$68:E$79)/D$3/12 | =H70+I70 | =D$3*H70 | =D$3*I70 |
| 71 | =SUM(E$68:E$79)/D$3/12 | =H71+I71 | =D$3*H71 | =D$3*I71 |

| | M | N | O |
|---|---|---|---|
| 8 | NET | NET | |
| 9 | COOP | CASH | |
| 10 | CASH | TO DATE | |
| 55 | =K55+L55-E55-F55 | =SUM(M$12:M55) | |
| 56 | =K56+L56-E56-F56 | =SUM(M$12:M56) | |
| 57 | =K57+L57-E57-F57 | =SUM(M$12:M57) | |
| 58 | =K58+L58-E58-F58 | =SUM(M$12:M58) | |
| 59 | =K59+L59-E59-F59 | =SUM(M$12:M59) | |
| 60 | =K60+L60-E60-F60 | =SUM(M$12:M60) | |
| 61 | =K61+L61-E61-F61 | =SUM(M$12:M61) | |
| 62 | =K62+L62-E62-F62 | =SUM(M$12:M62) | |
| 63 | =K63+L63-E63-F63 | =SUM(M$12:M63) | |
| 64 | =K64+L64-E64-F64 | =SUM(M$12:M64) | |
| 65 | =K65+L65-E65-F65 | =SUM(M$12:M65) | |
| 66 | =K66+L66-E66-F66 | =SUM(M$12:M66) | |
| 67 | =K67+L67-E67-F67 | =SUM(M$12:M67) | |
| 68 | =K68+L68-E68-F68 | =SUM(M$12:M68) | |
| 69 | =K69+L69-E69-F69 | =SUM(M$12:M69) | |
| 70 | =K70+L70-E70-F70 | =SUM(M$12:M70) | |
| 71 | =K71+L71-E71-F71 | =SUM(M$12:M71) | |

| | P | Q | R | S |
|---|---|---|---|---|
| 8 | | | | UNPAID |
| 9 | PRINC | INT | TOT | ASSESS |
| 10 | ASSESS | ASSESS | ASSESS | END MO |
| 55 | =P$3*H55 | =P$3*I55 | =P55+Q55 | =S54-P55 |
| 56 | =P$3*H56 | =P$3*I56 | =P56+Q56 | =S55-P56 |
| 57 | =P$3*H57 | =P$3*I57 | =P57+Q57 | =S56-P57 |
| 58 | =P$3*H58 | =P$3*I58 | =P58+Q58 | =S57-P58 |
| 59 | =P$3*H59 | =P$3*I59 | =P59+Q59 | =S58-P59 |
| 60 | =P$3*H60 | =P$3*I60 | =P60+Q60 | =S59-P60 |
| 61 | =P$3*H61 | =P$3*I61 | =P61+Q61 | =S60-P61 |
| 62 | =P$3*H62 | =P$3*I62 | =P62+Q62 | =S61-P62 |
| 63 | =P$3*H63 | =P$3*I63 | =P63+Q63 | =S62-P63 |
| 64 | =P$3*H64 | =P$3*I64 | =P64+Q64 | =S63-P64 |
| 65 | =P$3*H65 | =P$3*I65 | =P65+Q65 | =S64-P65 |
| 66 | =P$3*H66 | =P$3*I66 | =P66+Q66 | =S65-P66 |
| 67 | =P$3*H67 | =P$3*I67 | =P67+Q67 | =S66-P67 |
| 68 | =P$3*H68 | =P$3*I68 | =P68+Q68 | =S67-P68 |
| 69 | =P$3*H69 | =P$3*I69 | =P69+Q69 | =S68-P69 |
| 70 | =P$3*H70 | =P$3*I70 | =P70+Q70 | =S69-P70 |
| 71 | =P$3*H71 | =P$3*I71 | =P71+Q71 | =S70-P71 |

| | T | U |
|---|---|---|
| 8 | INT TO | TOTAL |
| 9 | NEXT | DUE |
| 10 | AMORT | COOP |
| 55 | =SUM(E56:E$58)/D$3*P$3 | =S55+T55 |
| 56 | =SUM(E57:E$58)/D$3*P$3 | =S56+T56 |
| 57 | =SUM(E$58)/D$3*P$3 | =S57+T57 |
| 58 | 0 | =S58+T58 |
| 59 | =SUM(E60:E$64)/D$3*P$3 | =S59+T59 |
| 60 | =SUM(E61:E$64)/D$3*P$3 | =S60+T60 |
| 61 | =SUM(E62:E$64)/D$3*P$3 | =S61+T61 |
| 62 | =SUM(E63:E$64)/D$3*P$3 | =S62+T62 |
| 63 | =SUM(E$64)/D$3*P$3 | =S63+T63 |
| 64 | 0 | =S64+T64 |
| 65 | =SUM(E66:E$70)/D$3*P$3 | =S65+T65 |
| 66 | =SUM(E67:E$70)/D$3*P$3 | =S66+T66 |
| 67 | =SUM(E68:E$70)/D$3*P$3 | =S67+T67 |
| 68 | =SUM(E69:E$70)/D$3*P$3 | =S68+T68 |
| 69 | =SUM(E$70)/D$3*P$3 | =S69+T69 |
| 70 | 0 | =S70+T70 |
| 71 | =SUM(E72:E$76)/D$3*P$3 | =S71+T71 |

| | A | B | C | D |
|---|---|---|---|---|
| 8 | | | | |
| 9 | | | | |
| 10 | **Prepayments** | **MONTH** | | **BEG BAL** |
| 72 | | =B71+1 | 5/98 | =D71-F71 |
| 73 | | =B72+1 | 6/98 | =D72-F72 |
| 74 | | =B73+1 | 7/98 | =D73-F73 |
| 75 | | =B74+1 | 8/98 | =D74-F74 |
| 76 | | =B75+1 | 9/98 | =D75-F75 |
| 77 | | =B76+1 | 10/98 | =D76-F76 |
| 78 | | =B77+1 | 11/98 | =D77-F77 |
| 79 | | =B78+1 | 12/98 | =D78-F78 |
| 80 | | =B79+1 | 1/99 | =D79-F79 |
| 81 | | =B80+1 | 2/99 | =D80-F80 |
| 82 | | =B81+1 | 3/99 | =D81-F81 |
| 83 | | =B82+1 | 4/99 | =D82-F82 |
| 84 | | =B83+1 | 5/99 | =D83-F83 |
| 85 | | =B84+1 | 6/99 | =D84-F84 |
| 86 | | =B85+1 | 7/99 | =D85-F85 |
| 87 | | =B86+1 | 8/99 | =D86-F86 |
| 88 | | =B87+1 | 9/99 | =D87-F87 |

| | E | F | G | H |
|---|---|---|---|---|
| 8 | | | | PRINC |
| 9 | | | | ASSESS |
| 10 | INT | AMORT | | SHARE |
| 72 | =D72*0.1/12 | 0 | | =IF(84-D$4>=B72,0,1000000/D$4/D$3) |
| 73 | =D73*0.1/12 | 0 | | =IF(84-D$4>=B73,0,1000000/D$4/D$3) |
| 74 | =D74*0.1/12 | 0 | | =IF(84-D$4>=B74,0,1000000/D$4/D$3) |
| 75 | =D75*0.1/12 | 0 | | =IF(84-D$4>=B75,0,1000000/D$4/D$3) |
| 76 | =D76*0.1/12 | 0 | | =IF(84-D$4>=B76,0,1000000/D$4/D$3) |
| 77 | =D77*0.1/12 | =1000000/D$2 | | =IF(84-D$4>=B77,0,1000000/D$4/D$3) |
| 78 | =D78*0.1/12 | 0 | | =IF(84-D$4>=B78,0,1000000/D$4/D$3) |
| 79 | =D79*0.1/12 | 0 | | =IF(84-D$4>=B79,0,1000000/D$4/D$3) |
| 80 | =D80*0.1/12 | 0 | | =IF(84-D$4>=B80,0,1000000/D$4/D$3) |
| 81 | =D81*0.1/12 | 0 | | =IF(84-D$4>=B81,0,1000000/D$4/D$3) |
| 82 | =D82*0.1/12 | 0 | | =IF(84-D$4>=B82,0,1000000/D$4/D$3) |
| 83 | =D83*0.1/12 | =1000000/D$2 | | =IF(84-D$4>=B83,0,1000000/D$4/D$3) |
| 84 | =D84*0.1025/12 | 0 | | =IF(84-D$4>=B84,0,1000000/D$4/D$3) |
| 85 | =D85*0.1025/12 | 0 | | =IF(84-D$4>=B85,0,1000000/D$4/D$3) |
| 86 | =D86*0.1025/12 | 0 | | =IF(84-D$4>=B86,0,1000000/D$4/D$3) |
| 87 | =D87*0.1025/12 | 0 | | =IF(84-D$4>=B87,0,1000000/D$4/D$3) |
| 88 | =D88*0.1025/12 | 0 | | =IF(84-D$4>=B88,0,1000000/D$4/D$3) |

| | I | J | K | L |
|---|---|---|---|---|
| 8 | INT | TOT | TOT | TOT |
| 9 | ASSESS | ASSESS | COOP | COOP |
| 10 | SHARE | SHARE | PRINC | INT |
| 72 | =SUM(E$68:E$79)/D$3/12 | =H72+I72 | =D$3*H72 | =D$3*I72 |
| 73 | =SUM(E$68:E$79)/D$3/12 | =H73+I73 | =D$3*H73 | =D$3*I73 |
| 74 | =SUM(E$68:E$79)/D$3/12 | =H74+I74 | =D$3*H74 | =D$3*I74 |
| 75 | =SUM(E$68:E$79)/D$3/12 | =H75+I75 | =D$3*H75 | =D$3*I75 |
| 76 | =SUM(E$68:E$79)/D$3/12 | =H76+I76 | =D$3*H76 | =D$3*I76 |
| 77 | =SUM(E$68:E$79)/D$3/12 | =H77+I77 | =D$3*H77 | =D$3*I77 |
| 78 | =SUM(E$68:E$79)/D$3/12 | =H78+I78 | =D$3*H78 | =D$3*I78 |
| 79 | =SUM(E$68:E$79)/D$3/12 | =H79+I79 | =D$3*H79 | =D$3*I79 |
| 80 | =SUM(E$80:E$91)/D$3/12 | =H80+I80 | =D$3*H80 | =D$3*I80 |
| 81 | =SUM(E$80:E$91)/D$3/12 | =H81+I81 | =D$3*H81 | =D$3*I81 |
| 82 | =SUM(E$80:E$91)/D$3/12 | =H82+I82 | =D$3*H82 | =D$3*I82 |
| 83 | =SUM(E$80:E$91)/D$3/12 | =H83+I83 | =D$3*H83 | =D$3*I83 |
| 84 | =SUM(E$80:E$91)/D$3/12 | =H84+I84 | =D$3*H84 | =D$3*I84 |
| 85 | =SUM(E$80:E$91)/D$3/12 | =H85+I85 | =D$3*H85 | =D$3*I85 |
| 86 | =SUM(E$80:E$91)/D$3/12 | =H86+I86 | =D$3*H86 | =D$3*I86 |
| 87 | =SUM(E$80:E$91)/D$3/12 | =H87+I87 | =D$3*H87 | =D$3*I87 |
| 88 | =SUM(E$80:E$91)/D$3/12 | =H88+I88 | =D$3*H88 | =D$3*I88 |

| | M | N | O |
|---|---|---|---|
| 8 | NET | NET | |
| 9 | COOP | CASH | |
| 10 | CASH | TO DATE | |
| 72 | =K72+L72-E72-F72 | =SUM(M$12:M72) | |
| 73 | =K73+L73-E73-F73 | =SUM(M$12:M73) | |
| 74 | =K74+L74-E74-F74 | =SUM(M$12:M74) | |
| 75 | =K75+L75-E75-F75 | =SUM(M$12:M75) | |
| 76 | =K76+L76-E76-F76 | =SUM(M$12:M76) | |
| 77 | =K77+L77-E77-F77 | =SUM(M$12:M77) | |
| 78 | =K78+L78-E78-F78 | =SUM(M$12:M78) | |
| 79 | =K79+L79-E79-F79 | =SUM(M$12:M79) | |
| 80 | =K80+L80-E80-F80 | =SUM(M$12:M80) | |
| 81 | =K81+L81-E81-F81 | =SUM(M$12:M81) | |
| 82 | =K82+L82-E82-F82 | =SUM(M$12:M82) | |
| 83 | =K83+L83-E83-F83 | =SUM(M$12:M83) | |
| 84 | =K84+L84-E84-F84 | =SUM(M$12:M84) | |
| 85 | =K85+L85-E85-F85 | =SUM(M$12:M85) | |
| 86 | =K86+L86-E86-F86 | =SUM(M$12:M86) | |
| 87 | =K87+L87-E87-F87 | =SUM(M$12:M87) | |
| 88 | =K88+L88-E88-F88 | =SUM(M$12:M88) | |

| | P | Q | R | S |
|---|---|---|---|---|
| 8 | | | | UNPAID |
| 9 | PRINC | INT | TOT | ASSESS |
| 10 | ASSESS | ASSESS | ASSESS | END MO |
| 72 | =P$3*H72 | =P$3*I72 | =P72+Q72 | =S71-P72 |
| 73 | =P$3*H73 | =P$3*I73 | =P73+Q73 | =S72-P73 |
| 74 | =P$3*H74 | =P$3*I74 | =P74+Q74 | =S73-P74 |
| 75 | =P$3*H75 | =P$3*I75 | =P75+Q75 | =S74-P75 |
| 76 | =P$3*H76 | =P$3*I76 | =P76+Q76 | =S75-P76 |
| 77 | =P$3*H77 | =P$3*I77 | =P77+Q77 | =S76-P77 |
| 78 | =P$3*H78 | =P$3*I78 | =P78+Q78 | =S77-P78 |
| 79 | =P$3*H79 | =P$3*I79 | =P79+Q79 | =S78-P79 |
| 80 | =P$3*H80 | =P$3*I80 | =P80+Q80 | =S79-P80 |
| 81 | =P$3*H81 | =P$3*I81 | =P81+Q81 | =S80-P81 |
| 82 | =P$3*H82 | =P$3*I82 | =P82+Q82 | =S81-P82 |
| 83 | =P$3*H83 | =P$3*I83 | =P83+Q83 | =S82-P83 |
| 84 | =P$3*H84 | =P$3*I84 | =P84+Q84 | =S83-P84 |
| 85 | =P$3*H85 | =P$3*I85 | =P85+Q85 | =S84-P85 |
| 86 | =P$3*H86 | =P$3*I86 | =P86+Q86 | =S85-P86 |
| 87 | =P$3*H87 | =P$3*I87 | =P87+Q87 | =S86-P87 |
| 88 | =P$3*H88 | =P$3*I88 | =P88+Q88 | =S87-P88 |

| | T | U |
|---|---|---|
| 8 | INT TO | TOTAL |
| 9 | NEXT | DUE |
| 10 | AMORT | COOP |
| 72 | =SUM(E73:E$76)/D$3*P$3 | =S72+T72 |
| 73 | =SUM(E74:E$76)/D$3*P$3 | =S73+T73 |
| 74 | =SUM(E75:E$76)/D$3*P$3 | =S74+T74 |
| 75 | =SUM(E$76)/D$3*P$3 | =S75+T75 |
| 76 | 0 | =S76+T76 |
| 77 | =SUM(E78:E$82)/D$3*P$3 | =S77+T77 |
| 78 | =SUM(E79:E$82)/D$3*P$3 | =S78+T78 |
| 79 | =SUM(E80:E$82)/D$3*P$3 | =S79+T79 |
| 80 | =SUM(E81:E$82)/D$3*P$3 | =S80+T80 |
| 81 | =SUM(E$82)/D$3*P$3 | =S81+T81 |
| 82 | 0 | =S82+T82 |
| 83 | =SUM(E84:E$88)/D$3*P$3 | =S83+T83 |
| 84 | =SUM(E85:E$88)/D$3*P$3 | =S84+T84 |
| 85 | =SUM(E86:E$88)/D$3*P$3 | =S85+T85 |
| 86 | =SUM(E87:E$88)/D$3*P$3 | =S86+T86 |
| 87 | =SUM(E$88)/D$3*P$3 | =S87+T87 |
| 88 | 0 | =S88+T88 |

| | A | B | C | D |
|---|---|---|---|---|
| 8 | | | | |
| 9 | | | | |
| 10 | **Prepayments** | **MONTH** | | **BEG BAL** |
| 89 | | =B88+1 | 10/99 | =D88-F88 |
| 90 | | =B89+1 | 11/99 | =D89-F89 |
| 91 | | =B90+1 | 12/99 | =D90-F90 |
| 92 | | =B91+1 | 1/00 | =D91-F91 |
| 93 | | =B92+1 | 2/00 | =D92-F92 |
| 94 | | =B93+1 | 3/00 | =D93-F93 |
| 95 | | =B94+1 | 4/00 | =D94-F94 |
| 96 | | | | |
| 97 | | | | |

| | E | F | G | H |
|---|---|---|---|---|
| 8 | | | | PRINC |
| 9 | | | | ASSESS |
| 10 | INT | AMORT | | SHARE |
| 89 | =D89*0.1025/12 | =1000000/D$2 | | =IF(84-D$4>=B89,0,1000000/D$4/D$3) |
| 90 | =D90*0.1025/12 | 0 | | =IF(84-D$4>=B90,0,1000000/D$4/D$3) |
| 91 | =D91*0.1025/12 | 0 | | =IF(84-D$4>=B91,0,1000000/D$4/D$3) |
| 92 | =D92*0.1025/12 | 0 | | =IF(84-D$4>=B92,0,1000000/D$4/D$3) |
| 93 | =D93*0.1025/12 | 0 | | =IF(84-D$4>=B93,0,1000000/D$4/D$3) |
| 94 | =D94*0.1025/12 | 0 | | =IF(84-D$4>=B94,0,1000000/D$4/D$3) |
| 95 | =D95*0.1025/12 | =1000000/D$2 | | =IF(84-D$4>=B95,0,1000000/D$4/D$3) |
| 96 | - | - | | |
| 97 | =SUM(E8:E96) | =SUM(F8:F96) | | |

| | I | J | K | L |
|---|---|---|---|---|
| 8 | INT | TOT | TOT | TOT |
| 9 | ASSESS | ASSESS | COOP | COOP |
| 10 | SHARE | SHARE | PRINC | INT |
| 89 | =SUM(E$80:E$91)/D$3/12 | =H89+I89 | =D$3*H89 | =D$3*I89 |
| 90 | =SUM(E$80:E$91)/D$3/12 | =H90+I90 | =D$3*H90 | =D$3*I90 |
| 91 | =SUM(E$80:E$91)/D$3/12 | =H91+I91 | =D$3*H91 | =D$3*I91 |
| 92 | =SUM(E$92:E$95)/D$3/4 | =H92+I92 | =D$3*H92 | =D$3*I92 |
| 93 | =SUM(E$92:E$95)/D$3/4 | =H93+I93 | =D$3*H93 | =D$3*I93 |
| 94 | =SUM(E$92:E$95)/D$3/4 | =H94+I94 | =D$3*H94 | =D$3*I94 |
| 95 | =SUM(E$92:E$95)/D$3/4 | =H95+I95 | =D$3*H95 | =D$3*I95 |
| 96 | | | - | - |
| 97 | | | =SUM(K8:K96) | =SUM(L8:L96) |

| | M | N | O |
|---|---|---|---|
| 8 | **NET** | **NET** | |
| 9 | **COOP** | **CASH** | |
| 10 | **CASH** | **TO DATE** | |
| 89 | =K89+L89-E89-F89 | =SUM(M$12:M89) | |
| 90 | =K90+L90-E90-F90 | =SUM(M$12:M90) | |
| 91 | =K91+L91-E91-F91 | =SUM(M$12:M91) | |
| 92 | =K92+L92-E92-F92 | =SUM(M$12:M92) | |
| 93 | =K93+L93-E93-F93 | =SUM(M$12:M93) | |
| 94 | =K94+L94-E94-F94 | =SUM(M$12:M94) | |
| 95 | =K95+L95-E95-F95 | =SUM(M$12:M95) | |
| 96 | | | |
| 97 | | | |

| | P | Q | R | S |
|---|---|---|---|---|
| 8 | | | | UNPAID |
| 9 | PRINC | INT | TOT | ASSESS |
| 10 | ASSESS | ASSESS | ASSESS | END MO |
| 89 | =P$3*H89 | =P$3*I89 | =P89+Q89 | =S88-P89 |
| 90 | =P$3*H90 | =P$3*I90 | =P90+Q90 | =S89-P90 |
| 91 | =P$3*H91 | =P$3*I91 | =P91+Q91 | =S90-P91 |
| 92 | =P$3*H92 | =P$3*I92 | =P92+Q92 | =S91-P92 |
| 93 | =P$3*H93 | =P$3*I93 | =P93+Q93 | =S92-P93 |
| 94 | =P$3*H94 | =P$3*I94 | =P94+Q94 | =S93-P94 |
| 95 | =P$3*H95 | =P$3*I95 | =P95+Q95 | =S94-P95 |
| 96 | | | | |
| 97 | | | | |

| | T | U |
|---|---|---|
| 8 | INT TO | TOTAL |
| 9 | NEXT | DUE |
| 10 | AMORT | COOP |
| 89 | =SUM(E90:E$94)/D$3*P$3 | =S89+T89 |
| 90 | =SUM(E91:E$94)/D$3*P$3 | =S90+T90 |
| 91 | =SUM(E92:E$94)/D$3*P$3 | =S91+T91 |
| 92 | =SUM(E93:E$94)/D$3*P$3 | =S92+T92 |
| 93 | =SUM(E$94)/D$3*P$3 | =S93+T93 |
| 94 | 0 | =S94+T94 |
| 95 | 0 | =S95+T95 |
| 96 | | |
| 97 | | |

TABLE II – B

| | A | B | C | D |
|---|---|---|---|---|
| 98 | JOHN HANCOCK PRINCIPAL PAYMENT CALCULATION | | | |
| 99 | | | | |
| 100 | | | | |
| 101 | | Unit | TOTAL | Owner |
| 102 | | | SHARES | |
| 103 | | | | |
| 104 | =IF(F104="y",C104,0) | 01A 492 | | FOSTER |
| 105 | =IF(F105="y",C105,0) | 01B 0 | | BLDG |
| 106 | =IF(F106="y",C106,0) | 01C 132 | | MILLER |
| 107 | =IF(F107="y",C107,0) | 01CA 135 | | HERRERA |
| 108 | =IF(F108="y",C108,0) | 02A 418 | | BLDG |
| 109 | =IF(F109="y",C109,0) | 02B 443 | | BERNER/MORIARTY |
| 110 | =IF(F110="y",C110,0) | 02C 313 | | BLDG |
| 111 | =IF(F111="y",C111,0) | 03A 424 | | BLDG |
| 112 | =IF(F112="y",C112,0) | 03B 448 | | MILLER |
| 113 | =IF(F113="y",C113,0) | 03C 316 | | URBAN/FRIEDBERG |
| 114 | =IF(F114="y",C114,0) | 04A 429 | | JUNQUERA |
| 115 | =IF(F115="y",C115,0) | 04B 453 | | LUXNER |
| 116 | =IF(F116="y",C116,0) | 04C 319 | | ROLAND |
| 117 | =IF(F117="y",C117,0) | 05A 434 | | QUILLEN |

| | E | F | G | H |
|---|---|---|---|---|
| 98 | | | | |
| 99 | | | | |
| 100 | | | | |
| 101 | Tenant | PAYING=Y | 10/93 | PAYING=Y |
| 102 | | | =H17 | |
| 103 | | | | |
| 104 | | Y | =IF(F104="Y",+G$102*$C104,0) | Y |
| 105 | HERRERA | N | =IF(F105="Y",+G$102*$C105,0) | N |
| 106 | MORGAN | Y | =IF(F106="Y",+G$102*$C106,0) | Y |
| 107 | ANDRADE | Y | =IF(F107="Y",+G$102*$C107,0) | Y |
| 108 | WEILL | N | =IF(F108="Y",+G$102*$C108,0) | N |
| 109 | | Y | =IF(F109="Y",+G$102*$C109,0) | Y |
| 110 | DUNSTON | N | =IF(F110="Y",+G$102*$C110,0) | N |
| 111 | MARX | N | =IF(F111="Y",+G$102*$C111,0) | N |
| 112 | | Y | =IF(F112="Y",+G$102*$C112,0) | Y |
| 113 | SKOLER | Y | =IF(F113="Y",+G$102*$C113,0) | Y |
| 114 | | Y | =IF(F114="Y",+G$102*$C114,0) | Y |
| 115 | | Y | =IF(F115="Y",+G$102*$C115,0) | Y |
| 116 | STALMAN | Y | =IF(F116="Y",+G$102*$C116,0) | Y |
| 117 | | Y | =IF(F117="Y",+G$102*$C117,0) | Y |

| | I | J | K | L |
|---|---|---|---|---|
| 98 | | | | |
| 99 | | | | |
| 100 | | | | |
| 101 | 11/93 | PAYING=Y | 12/93 | PAYING=Y |
| 102 | =H18 | | =H19 | |
| 103 | | | | |
| 104 | =IF(H104="Y",+I$102*$C104,0) | Y | =IF(J104="Y",+K$102*$C104,0) | Y |
| 105 | =IF(H105="Y",+I$102*$C105,0) | N | =IF(J105="Y",+K$102*$C105,0) | N |
| 106 | =IF(H106="Y",+I$102*$C106,0) | Y | =IF(J106="Y",+K$102*$C106,0) | Y |
| 107 | =IF(H107="Y",+I$102*$C107,0) | Y | =IF(J107="Y",+K$102*$C107,0) | Y |
| 108 | =IF(H108="Y",+I$102*$C108,0) | N | =IF(J108="Y",+K$102*$C108,0) | N |
| 109 | =IF(H109="Y",+I$102*$C109,0) | Y | =IF(J109="Y",+K$102*$C109,0) | Y |
| 110 | =IF(H110="Y",+I$102*$C110,0) | N | =IF(J110="Y",+K$102*$C110,0) | N |
| 111 | =IF(H111="Y",+I$102*$C111,0) | N | =IF(J111="Y",+K$102*$C111,0) | N |
| 112 | =IF(H112="Y",+I$102*$C112,0) | Y | =IF(J112="Y",+K$102*$C112,0) | Y |
| 113 | =IF(H113="Y",+I$102*$C113,0) | Y | =IF(J113="Y",+K$102*$C113,0) | Y |
| 114 | =IF(H114="Y",+I$102*$C114,0) | Y | =IF(J114="Y",+K$102*$C114,0) | Y |
| 115 | =IF(H115="Y",+I$102*$C115,0) | Y | =IF(J115="Y",+K$102*$C115,0) | Y |
| 116 | =IF(H116="Y",+I$102*$C116,0) | Y | =IF(J116="Y",+K$102*$C116,0) | Y |
| 117 | =IF(H117="Y",+I$102*$C117,0) | Y | =IF(J117="Y",+K$102*$C117,0) | Y |

| | M | N | O |
|---|---|---|---|
| 98 | | | |
| 99 | | | |
| 100 | | | |
| 101 | 1/94 | PAYING=Y | 2/94 |
| 102 | =H20 | | =H21 |
| 103 | | | |
| 104 | =IF(L104="Y",+M$102*$C104,0) | Y | =IF(N104="Y",+O$102*$C104,0) |
| 105 | =IF(L105="Y",+M$102*$C105,0) | N | =IF(N105="Y",+O$102*$C105,0) |
| 106 | =IF(L106="Y",+M$102*$C106,0) | Y | =IF(N106="Y",+O$102*$C106,0) |
| 107 | =IF(L107="Y",+M$102*$C107,0) | Y | =IF(N107="Y",+O$102*$C107,0) |
| 108 | =IF(L108="Y",+M$102*$C108,0) | N | =IF(N108="Y",+O$102*$C108,0) |
| 109 | =IF(L109="Y",+M$102*$C109,0) | Y | =IF(N109="Y",+O$102*$C109,0) |
| 110 | =IF(L110="Y",+M$102*$C110,0) | N | =IF(N110="Y",+O$102*$C110,0) |
| 111 | =IF(L111="Y",+M$102*$C111,0) | N | =IF(N111="Y",+O$102*$C111,0) |
| 112 | =IF(L112="Y",+M$102*$C112,0) | Y | =IF(N112="Y",+O$102*$C112,0) |
| 113 | =IF(L113="Y",+M$102*$C113,0) | Y | =IF(N113="Y",+O$102*$C113,0) |
| 114 | =IF(L114="Y",+M$102*$C114,0) | Y | =IF(N114="Y",+O$102*$C114,0) |
| 115 | =IF(L115="Y",+M$102*$C115,0) | Y | =IF(N115="Y",+O$102*$C115,0) |
| 116 | =IF(L116="Y",+M$102*$C116,0) | Y | =IF(N116="Y",+O$102*$C116,0) |
| 117 | =IF(L117="Y",+M$102*$C117,0) | Y | =IF(N117="Y",+O$102*$C117,0) |

| | P | Q | R | S |
|---|---|---|---|---|
| 98 | | | | |
| 99 | | | | |
| 100 | | | | |
| 101 | PAYING=Y | 3/94 | PAYING=Y | 4/94 |
| 102 | | =H22 | | =H23 |
| 103 | | | | |
| 104 | Y | =IF(P104="Y",+Q$102*$C104,0) | Y | =IF(R104="Y",+S$102*$C104,0) |
| 105 | N | =IF(P105="Y",+Q$102*$C105,0) | N | =IF(R105="Y",+S$102*$C105,0) |
| 106 | Y | =IF(P106="Y",+Q$102*$C106,0) | Y | =IF(R106="Y",+S$102*$C106,0) |
| 107 | Y | =IF(P107="Y",+Q$102*$C107,0) | Y | =IF(R107="Y",+S$102*$C107,0) |
| 108 | N | =IF(P108="Y",+Q$102*$C108,0) | N | =IF(R108="Y",+S$102*$C108,0) |
| 109 | Y | =IF(P109="Y",+Q$102*$C109,0) | Y | =IF(R109="Y",+S$102*$C109,0) |
| 110 | N | =IF(P110="Y",+Q$102*$C110,0) | N | =IF(R110="Y",+S$102*$C110,0) |
| 111 | N | =IF(P111="Y",+Q$102*$C111,0) | N | =IF(R111="Y",+S$102*$C111,0) |
| 112 | Y | =IF(P112="Y",+Q$102*$C112,0) | Y | =IF(R112="Y",+S$102*$C112,0) |
| 113 | Y | =IF(P113="Y",+Q$102*$C113,0) | Y | =IF(R113="Y",+S$102*$C113,0) |
| 114 | Y | =IF(P114="Y",+Q$102*$C114,0) | Y | =IF(R114="Y",+S$102*$C114,0) |
| 115 | Y | =IF(P115="Y",+Q$102*$C115,0) | Y | =IF(R115="Y",+S$102*$C115,0) |
| 116 | Y | =IF(P116="Y",+Q$102*$C116,0) | Y | =IF(R116="Y",+S$102*$C116,0) |
| 117 | Y | =IF(P117="Y",+Q$102*$C117,0) | N | =IF(R117="Y",+S$102*$C117,0) |

| | T | U |
|---|---|---|
| 98 | Apartments To Be | |
| 99 | Sold Within | |
| 100 | | |
| 101 | PAYING=Y | |
| 102 | | =H24 |
| 103 | | |
| 104 | Y | |
| 105 | N | |
| 106 | Y | |
| 107 | Y | |
| 108 | N | |
| 109 | Y | |
| 110 | N | |
| 111 | N | |
| 112 | Y | |
| 113 | Y | |
| 114 | Y | |
| 115 | Y | |
| 116 | Y | |
| 117 | Y | |

| | A | B | C | D |
|---|---|---|---|---|
| 101 | | Unit | TOTAL | Owner |
| 102 | | | SHARES | |
| 118 | =IF(F118="y",C118,0) | 05B 458 | | DOUGHERTY |
| 119 | =IF(F119="y",C119,0) | 05C 322 | | FRIEDMAN/BAUDRY |
| 120 | =IF(F120="y",C120,0) | 06A 439 | | NIAGARA ASSETS |
| 121 | =IF(F121="y",C121,0) | 06B 463 | | URB/MARGOLIES/GRSS |
| 122 | =IF(F122="y",C122,0) | 06C 325 | | LEHMKUHL |
| 123 | =IF(F123="y",C123,0) | 07A 444 | | KREZ |
| 124 | =IF(F124="y",C124,0) | 07B 468 | | URBAN ASSTS GRP |
| 125 | =IF(F125="y",C125,0) | 07C 130 | | LEVISON |
| 126 | =IF(F126="y",C126,0) | 07D 182 | | URBAN/KOTLER |
| 127 | =IF(F127="y",C127,0) | 08A 449 | | SETTLE |
| 128 | =IF(F128="y",C128,0) | 08B 473 | | SETTLE |
| 129 | =IF(F129="y",C129,0) | 08C 331 | | MIRANDA |
| 130 | =IF(F130="y",C130,0) | 09A 454 | | BROWNING PLATT |
| 131 | =IF(F131="y",C131,0) | 09B 478 | | SLAVINSKA |
| 132 | =IF(F132="y",C132,0) | 09C 334 | | NORTON |
| 133 | =IF(F133="y",C133,0) | 10A 459 | | PARKER |
| 134 | =IF(F134="y",C134,0) | 10B 483 | | ROLAND |
| 135 | =IF(F135="y",C135,0) | 10C 337 | | GELMAN |

| | E | F | G | H |
|---|---|---|---|---|
| 101 | Tenant | PAYING=Y | 10/93 | PAYING=Y |
| 102 | | | =H17 | |
| 118 | BERNBACH | Y | =IF(F118="Y",+G$102*$C118,0) | Y |
| 119 | | Y | =IF(F119="Y",+G$102*$C119,0) | Y |
| 120 | MARGINI | Y | =IF(F120="Y",+G$102*$C120,0) | Y |
| 121 | NORSA | Y | =IF(F121="Y",+G$102*$C121,0) | Y |
| 122 | | Y | =IF(F122="Y",+G$102*$C122,0) | Y |
| 123 | | Y | =IF(F123="Y",+G$102*$C123,0) | Y |
| 124 | PEPPER | Y | =IF(F124="Y",+G$102*$C124,0) | Y |
| 125 | | Y | =IF(F125="Y",+G$102*$C125,0) | Y |
| 126 | BABIJ | Y | =IF(F126="Y",+G$102*$C126,0) | Y |
| 127 | | Y | =IF(F127="Y",+G$102*$C127,0) | Y |
| 128 | | Y | =IF(F128="Y",+G$102*$C128,0) | Y |
| 129 | | Y | =IF(F129="Y",+G$102*$C129,0) | Y |
| 130 | | Y | =IF(F130="Y",+G$102*$C130,0) | Y |
| 131 | | Y | =IF(F131="Y",+G$102*$C131,0) | Y |
| 132 | | Y | =IF(F132="Y",+G$102*$C132,0) | Y |
| 133 | | Y | =IF(F133="Y",+G$102*$C133,0) | Y |
| 134 | | Y | =IF(F134="Y",+G$102*$C134,0) | Y |
| 135 | | Y | =IF(F135="Y",+G$102*$C135,0) | Y |

| | I | J | K | L |
|---|---|---|---|---|
| 101 | 11/93 | PAYING=Y | 12/93 | PAYING=Y |
| 102 | =H18 | | =H19 | |
| 118 | =IF(H118="Y",+I$102*$C118,0) | Y | =IF(J118="Y",+K$102*$C118,0) | Y |
| 119 | =IF(H119="Y",+I$102*$C119,0) | Y | =IF(J119="Y",+K$102*$C119,0) | Y |
| 120 | =IF(H120="Y",+I$102*$C120,0) | Y | =IF(J120="Y",+K$102*$C120,0) | Y |
| 121 | =IF(H121="Y",+I$102*$C121,0) | Y | =IF(J121="Y",+K$102*$C121,0) | Y |
| 122 | =IF(H122="Y",+I$102*$C122,0) | Y | =IF(J122="Y",+K$102*$C122,0) | Y |
| 123 | =IF(H123="Y",+I$102*$C123,0) | Y | =IF(J123="Y",+K$102*$C123,0) | Y |
| 124 | =IF(H124="Y",+I$102*$C124,0) | Y | =IF(J124="Y",+K$102*$C124,0) | Y |
| 125 | =IF(H125="Y",+I$102*$C125,0) | Y | =IF(J125="Y",+K$102*$C125,0) | Y |
| 126 | =IF(H126="Y",+I$102*$C126,0) | Y | =IF(J126="Y",+K$102*$C126,0) | Y |
| 127 | =IF(H127="Y",+I$102*$C127,0) | Y | =IF(J127="Y",+K$102*$C127,0) | Y |
| 128 | =IF(H128="Y",+I$102*$C128,0) | Y | =IF(J128="Y",+K$102*$C128,0) | Y |
| 129 | =IF(H129="Y",+I$102*$C129,0) | Y | =IF(J129="Y",+K$102*$C129,0) | Y |
| 130 | =IF(H130="Y",+I$102*$C130,0) | Y | =IF(J130="Y",+K$102*$C130,0) | Y |
| 131 | =IF(H131="Y",+I$102*$C131,0) | Y | =IF(J131="Y",+K$102*$C131,0) | Y |
| 132 | =IF(H132="Y",+I$102*$C132,0) | Y | =IF(J132="Y",+K$102*$C132,0) | Y |
| 133 | =IF(H133="Y",+I$102*$C133,0) | Y | =IF(J133="Y",+K$102*$C133,0) | Y |
| 134 | =IF(H134="Y",+I$102*$C134,0) | Y | =IF(J134="Y",+K$102*$C134,0) | Y |
| 135 | =IF(H135="Y",+I$102*$C135,0) | Y | =IF(J135="Y",+K$102*$C135,0) | Y |

| | M | N | O |
|---|---|---|---|
| 101 | 1/94 | PAYING=Y | 2/94 |
| 102 | =H20 | | =H21 |
| 118 | =IF(L118="Y",+M$102*$C118,0) | Y | =IF(N118="Y",+O$102*$C118,0) |
| 119 | =IF(L119="Y",+M$102*$C119,0) | Y | =IF(N119="Y",+O$102*$C119,0) |
| 120 | =IF(L120="Y",+M$102*$C120,0) | Y | =IF(N120="Y",+O$102*$C120,0) |
| 121 | =IF(L121="Y",+M$102*$C121,0) | Y | =IF(N121="Y",+O$102*$C121,0) |
| 122 | =IF(L122="Y",+M$102*$C122,0) | Y | =IF(N122="Y",+O$102*$C122,0) |
| 123 | =IF(L123="Y",+M$102*$C123,0) | Y | =IF(N123="Y",+O$102*$C123,0) |
| 124 | =IF(L124="Y",+M$102*$C124,0) | Y | =IF(N124="Y",+O$102*$C124,0) |
| 125 | =IF(L125="Y",+M$102*$C125,0) | Y | =IF(N125="Y",+O$102*$C125,0) |
| 126 | =IF(L126="Y",+M$102*$C126,0) | Y | =IF(N126="Y",+O$102*$C126,0) |
| 127 | =IF(L127="Y",+M$102*$C127,0) | Y | =IF(N127="Y",+O$102*$C127,0) |
| 128 | =IF(L128="Y",+M$102*$C128,0) | Y | =IF(N128="Y",+O$102*$C128,0) |
| 129 | =IF(L129="Y",+M$102*$C129,0) | Y | =IF(N129="Y",+O$102*$C129,0) |
| 130 | =IF(L130="Y",+M$102*$C130,0) | Y | =IF(N130="Y",+O$102*$C130,0) |
| 131 | =IF(L131="Y",+M$102*$C131,0) | Y | =IF(N131="Y",+O$102*$C131,0) |
| 132 | =IF(L132="Y",+M$102*$C132,0) | Y | =IF(N132="Y",+O$102*$C132,0) |
| 133 | =IF(L133="Y",+M$102*$C133,0) | Y | =IF(N133="Y",+O$102*$C133,0) |
| 134 | =IF(L134="Y",+M$102*$C134,0) | Y | =IF(N134="Y",+O$102*$C134,0) |
| 135 | =IF(L135="Y",+M$102*$C135,0) | Y | =IF(N135="Y",+O$102*$C135,0) |

| | P | Q | R | S |
|---|---|---|---|---|
| 101 | PAYING=Y | 3/94 | PAYING=Y | 4/94 |
| 102 | | =H22 | | =H23 |
| 118 | Y | =IF(P118="Y",+Q$102*$C118,0) | Y | =IF(R118="Y",+S$102*$C118,0) |
| 119 | Y | =IF(P119="Y",+Q$102*$C119,0) | Y | =IF(R119="Y",+S$102*$C119,0) |
| 120 | Y | =IF(P120="Y",+Q$102*$C120,0) | Y | =IF(R120="Y",+S$102*$C120,0) |
| 121 | Y | =IF(P121="Y",+Q$102*$C121,0) | Y | =IF(R121="Y",+S$102*$C121,0) |
| 122 | Y | =IF(P122="Y",+Q$102*$C122,0) | Y | =IF(R122="Y",+S$102*$C122,0) |
| 123 | Y | =IF(P123="Y",+Q$102*$C123,0) | Y | =IF(R123="Y",+S$102*$C123,0) |
| 124 | Y | =IF(P124="Y",+Q$102*$C124,0) | Y | =IF(R124="Y",+S$102*$C124,0) |
| 125 | Y | =IF(P125="Y",+Q$102*$C125,0) | Y | =IF(R125="Y",+S$102*$C125,0) |
| 126 | Y | =IF(P126="Y",+Q$102*$C126,0) | Y | =IF(R126="Y",+S$102*$C126,0) |
| 127 | Y | =IF(P127="Y",+Q$102*$C127,0) | Y | =IF(R127="Y",+S$102*$C127,0) |
| 128 | Y | =IF(P128="Y",+Q$102*$C128,0) | Y | =IF(R128="Y",+S$102*$C128,0) |
| 129 | Y | =IF(P129="Y",+Q$102*$C129,0) | Y | =IF(R129="Y",+S$102*$C129,0) |
| 130 | Y | =IF(P130="Y",+Q$102*$C130,0) | Y | =IF(R130="Y",+S$102*$C130,0) |
| 131 | Y | =IF(P131="Y",+Q$102*$C131,0) | Y | =IF(R131="Y",+S$102*$C131,0) |
| 132 | Y | =IF(P132="Y",+Q$102*$C132,0) | Y | =IF(R132="Y",+S$102*$C132,0) |
| 133 | Y | =IF(P133="Y",+Q$102*$C133,0) | Y | =IF(R133="Y",+S$102*$C133,0) |
| 134 | Y | =IF(P134="Y",+Q$102*$C134,0) | Y | =IF(R134="Y",+S$102*$C134,0) |
| 135 | Y | =IF(P135="Y",+Q$102*$C135,0) | Y | =IF(R135="Y",+S$102*$C135,0) |

| | T | U |
|---|---|---|
| 101 | PAYING=Y | |
| 102 | | =H24 |
| 118 | Y | |
| 119 | Y | |
| 120 | Y | |
| 121 | Y | |
| 122 | Y | |
| 123 | Y | |
| 124 | Y | |
| 125 | Y | |
| 126 | Y | |
| 127 | Y | |
| 128 | Y | |
| 129 | Y | |
| 130 | Y | |
| 131 | Y | |
| 132 | Y | |
| 133 | Y | |
| 134 | Y | |
| 135 | Y | |

| | A | B | C | D |
|---|---|---|---|---|
| 101 | | Unit | TOTAL | Owner |
| 102 | | | SHARES | |
| 136 | =IF(F136="y",C136,0) | 11A 464 | | BLDG |
| 137 | =IF(F137="y",C137,0) | 11B 488 | | JOHNSON |
| 138 | =IF(F138="y",C138,0) | 11C 340 | | WARREN |
| 139 | =IF(F139="y",C139,0) | 12A 469 | | GRUSKY EISMAN |
| 140 | =IF(F140="y",C140,0) | 12B 493 | | GITOW/LALONDE |
| 141 | =IF(F141="y",C141,0) | 12C 343 | | BASCH/FLEGENHEIM |
| 142 | =IF(F142="y",C142,0) | 14A 474 | | DIME |
| 143 | =IF(F143="y",C143,0) | 14B 498 | | BLDG |
| 144 | =IF(F144="y",C144,0) | 14C 346 | | NEFF |
| 145 | =IF(F145="y",C145,0) | 15A 479 | | ALLEN |
| 146 | =IF(F146="y",C146,0) | 15B 503 | | URBAN/MALMAN |
| 147 | =IF(F147="y",C147,0) | 15C 349 | | ORFUSS |
| 148 | =IF(F148="y",C148,0) | 16A 484 | | BLDG |
| 149 | =IF(F149="y",C149,0) | 16B 508 | | BLDG |
| 150 | =IF(F150="y",C150,0) | 16C 352 | | SMILOVIK |
| 151 | =IF(F151="y",C151,0) | PH 905 | | BLDG |
| 152 | | | ----- | |
| 153 | =SUM(A104:A152) | | =SUM(C104:C152) | |

| | E | F | G | H |
|---|---|---|---|---|
| 101 | Tenant | PAYING=Y | 10/93 | PAYING=Y |
| 102 | | | =H17 | |
| 136 | SIMON | N | =IF(F136="Y",+G$102*$C136,0) | N |
| 137 | | Y | =IF(F137="Y",+G$102*$C137,0) | Y |
| 138 | | Y | =IF(F138="Y",+G$102*$C138,0) | Y |
| 139 | | Y | =IF(F139="Y",+G$102*$C139,0) | Y |
| 140 | | Y | =IF(F140="Y",+G$102*$C140,0) | Y |
| 141 | | Y | =IF(F141="Y",+G$102*$C141,0) | Y |
| 142 | CASTILE | Y | =IF(F142="Y",+G$102*$C142,0) | Y |
| 143 | PEARSON | N | =IF(F143="Y",+G$102*$C143,0) | N |
| 144 | | Y | =IF(F144="Y",+G$102*$C144,0) | Y |
| 145 | | Y | =IF(F145="Y",+G$102*$C145,0) | Y |
| 146 | KARIA | Y | =IF(F146="Y",+G$102*$C146,0) | Y |
| 147 | | Y | =IF(F147="Y",+G$102*$C147,0) | Y |
| 148 | WALLACE | N | =IF(F148="Y",+G$102*$C148,0) | N |
| 149 | MURRAY | N | =IF(F149="Y",+G$102*$C149,0) | N |
| 150 | | Y | =IF(F150="Y",+G$102*$C150,0) | Y |
| 151 | KAPLAN | N | =IF(F151="Y",+G$102*$C151,0) | N |
| 152 | | | | |
| 153 | | | =SUM(G104:G152) | |

| | I | J | K | L |
|---|---|---|---|---|
| 101 | 11/93 | PAYING=Y | 12/93 | PAYING=Y |
| 102 | =H18 | | =H19 | |
| 136 | =IF(H136="Y",+I$102*$C136,0) | N | =IF(J136="Y",+K$102*$C136,0) | N |
| 137 | =IF(H137="Y",+I$102*$C137,0) | Y | =IF(J137="Y",+K$102*$C137,0) | Y |
| 138 | =IF(H138="Y",+I$102*$C138,0) | Y | =IF(J138="Y",+K$102*$C138,0) | Y |
| 139 | =IF(H139="Y",+I$102*$C139,0) | Y | =IF(J139="Y",+K$102*$C139,0) | Y |
| 140 | =IF(H140="Y",+I$102*$C140,0) | Y | =IF(J140="Y",+K$102*$C140,0) | Y |
| 141 | =IF(H141="Y",+I$102*$C141,0) | Y | =IF(J141="Y",+K$102*$C141,0) | Y |
| 142 | =IF(H142="Y",+I$102*$C142,0) | Y | =IF(J142="Y",+K$102*$C142,0) | Y |
| 143 | =IF(H143="Y",+I$102*$C143,0) | N | =IF(J143="Y",+K$102*$C143,0) | N |
| 144 | =IF(H144="Y",+I$102*$C144,0) | Y | =IF(J144="Y",+K$102*$C144,0) | Y |
| 145 | =IF(H145="Y",+I$102*$C145,0) | Y | =IF(J145="Y",+K$102*$C145,0) | Y |
| 146 | =IF(H146="Y",+I$102*$C146,0) | Y | =IF(J146="Y",+K$102*$C146,0) | Y |
| 147 | =IF(H147="Y",+I$102*$C147,0) | Y | =IF(J147="Y",+K$102*$C147,0) | Y |
| 148 | =IF(H148="Y",+I$102*$C148,0) | N | =IF(J148="Y",+K$102*$C148,0) | N |
| 149 | =IF(H149="Y",+I$102*$C149,0) | N | =IF(J149="Y",+K$102*$C149,0) | N |
| 150 | =IF(H150="Y",+I$102*$C150,0) | Y | =IF(J150="Y",+K$102*$C150,0) | Y |
| 151 | =IF(H151="Y",+I$102*$C151,0) | N | =IF(J151="Y",+K$102*$C151,0) | N |
| 152 | | | | |
| 153 | =SUM(I104:I152) | | =SUM(K104:K152) | |

| | M | N | O |
|---|---|---|---|
| 101 | 1/94 | PAYING=Y | 2/94 |
| 102 | =H20 | | =H21 |
| 136 | =IF(L136="Y",+M$102*$C136,0) | N | =IF(N136="Y",+O$102*$C136,0) |
| 137 | =IF(L137="Y",+M$102*$C137,0) | Y | =IF(N137="Y",+O$102*$C137,0) |
| 138 | =IF(L138="Y",+M$102*$C138,0) | Y | =IF(N138="Y",+O$102*$C138,0) |
| 139 | =IF(L139="Y",+M$102*$C139,0) | Y | =IF(N139="Y",+O$102*$C139,0) |
| 140 | =IF(L140="Y",+M$102*$C140,0) | Y | =IF(N140="Y",+O$102*$C140,0) |
| 141 | =IF(L141="Y",+M$102*$C141,0) | Y | =IF(N141="Y",+O$102*$C141,0) |
| 142 | =IF(L142="Y",+M$102*$C142,0) | Y | =IF(N142="Y",+O$102*$C142,0) |
| 143 | =IF(L143="Y",+M$102*$C143,0) | N | =IF(N143="Y",+O$102*$C143,0) |
| 144 | =IF(L144="Y",+M$102*$C144,0) | Y | =IF(N144="Y",+O$102*$C144,0) |
| 145 | =IF(L145="Y",+M$102*$C145,0) | Y | =IF(N145="Y",+O$102*$C145,0) |
| 146 | =IF(L146="Y",+M$102*$C146,0) | Y | =IF(N146="Y",+O$102*$C146,0) |
| 147 | =IF(L147="Y",+M$102*$C147,0) | Y | =IF(N147="Y",+O$102*$C147,0) |
| 148 | =IF(L148="Y",+M$102*$C148,0) | N | =IF(N148="Y",+O$102*$C148,0) |
| 149 | =IF(L149="Y",+M$102*$C149,0) | N | =IF(N149="Y",+O$102*$C149,0) |
| 150 | =IF(L150="Y",+M$102*$C150,0) | Y | =IF(N150="Y",+O$102*$C150,0) |
| 151 | =IF(L151="Y",+M$102*$C151,0) | N | =IF(N151="Y",+O$102*$C151,0) |
| 152 | | | |
| 153 | =SUM(M104:M152) | | =SUM(O104:O152) |

| | P | Q | R | S |
|---|---|---|---|---|
| 101 | PAYING=Y | 3/94 | PAYING=Y | 4/94 |
| 102 | | =H22 | | =H23 |
| 136 | N | =IF(P136="Y",+Q$102*$C136,0) | N | =IF(R136="Y",+S$102*$C136,0) |
| 137 | Y | =IF(P137="Y",+Q$102*$C137,0) | Y | =IF(R137="Y",+S$102*$C137,0) |
| 138 | Y | =IF(P138="Y",+Q$102*$C138,0) | Y | =IF(R138="Y",+S$102*$C138,0) |
| 139 | Y | =IF(P139="Y",+Q$102*$C139,0) | Y | =IF(R139="Y",+S$102*$C139,0) |
| 140 | N | =IF(P140="Y",+Q$102*$C140,0) | N | =IF(R140="Y",+S$102*$C140,0) |
| 141 | Y | =IF(P141="Y",+Q$102*$C141,0) | Y | =IF(R141="Y",+S$102*$C141,0) |
| 142 | Y | =IF(P142="Y",+Q$102*$C142,0) | Y | =IF(R142="Y",+S$102*$C142,0) |
| 143 | N | =IF(P143="Y",+Q$102*$C143,0) | N | =IF(R143="Y",+S$102*$C143,0) |
| 144 | Y | =IF(P144="Y",+Q$102*$C144,0) | Y | =IF(R144="Y",+S$102*$C144,0) |
| 145 | Y | =IF(P145="Y",+Q$102*$C145,0) | Y | =IF(R145="Y",+S$102*$C145,0) |
| 146 | Y | =IF(P146="Y",+Q$102*$C146,0) | Y | =IF(R146="Y",+S$102*$C146,0) |
| 147 | Y | =IF(P147="Y",+Q$102*$C147,0) | Y | =IF(R147="Y",+S$102*$C147,0) |
| 148 | N | =IF(P148="Y",+Q$102*$C148,0) | N | =IF(R148="Y",+S$102*$C148,0) |
| 149 | N | =IF(P149="Y",+Q$102*$C149,0) | N | =IF(R149="Y",+S$102*$C149,0) |
| 150 | Y | =IF(P150="Y",+Q$102*$C150,0) | Y | =IF(R150="Y",+S$102*$C150,0) |
| 151 | N | =IF(P151="Y",+Q$102*$C151,0) | N | =IF(R151="Y",+S$102*$C151,0) |
| 152 | | | | |
| 153 | | =SUM(Q104:Q152) | | =SUM(S104:S152) |

| | T | U |
|---|---|---|
| 101 | PAYING=Y | |
| 102 | | =H24 |
| 136 | N | |
| 137 | Y | |
| 138 | Y | |
| 139 | Y | |
| 140 | N | |
| 141 | Y | |
| 142 | Y | |
| 143 | N | |
| 144 | Y | |
| 145 | Y | |
| 146 | Y | |
| 147 | Y | |
| 148 | N | |
| 149 | N | |
| 150 | Y | |
| 151 | N | |
| 152 | | |
| 153 | =SUM(G153:S153) | |

TABLE II – C

| | A | B | C | D |
|---|---|---|---|---|
| 154 | | Prepayments | | Unit |
| 155 | | | | Shares |
| 156 | | | | Prin. Amt/Share |
| 157 | | | | Total |
| 158 | | | | |
| 159 | | | | Unit |
| 160 | | | | Shares |
| 161 | | | | Prin. Amt/Share |
| 162 | | | | Total |
| 163 | | | | |
| 164 | | | | Unit |
| 165 | | | | Shares |
| 166 | | | | Prin. Amt/Share |
| 167 | | | | Total |
| 168 | | | | |
| 169 | | | | |
| 170 | | | | |
| 171 | | | | |

| | E | F | G | H |
|---|---|---|---|---|
| 154 | | | | |
| 155 | | | | |
| 156 | | | | |
| 157 | | | | |
| 158 | | | | |
| 159 | | | | |
| 160 | | | | |
| 161 | | | | |
| 162 | | | | |
| 163 | | | | |
| 164 | | | | |
| 165 | | | | |
| 166 | | | | |
| 167 | | | | |
| 168 | | | | |
| 169 | | | | |
| 170 | | | | |
| 171 | | | | |

| | I | J | K | L |
|---|---|---|---|---|
| 154 | | | | |
| 155 | | | | |
| 156 | | | | |
| 157 | | | | |
| 158 | | | | |
| 159 | | | | |
| 160 | | | | |
| 161 | | | | |
| 162 | | | | |
| 163 | | | | |
| 164 | | | | |
| 165 | | | | |
| 166 | | | | |
| 167 | | | | |
| 168 | | | | |
| 169 | | | | |
| 170 | | | | |
| 171 | | | | |

| | M | N | O |
|---|---|---|---|
| 154 | | | 12B |
| 155 | | | 493 |
| 156 | | | 63.91 |
| 157 | | | =O156*O155 |
| 158 | | | |
| 159 | | | |
| 160 | | | |
| 161 | | | |
| 162 | | | |
| 163 | | | |
| 164 | | | |
| 165 | | | |
| 166 | | | |
| 167 | | | |
| 168 | | | |
| 169 | | | |
| 170 | | | |
| 171 | | | |

| | P | Q | R | S |
|---|---|---|---|---|
| 154 | | 5A | | |
| 155 | | 434 | | |
| 156 | | 63.05 | | |
| 157 | | =Q156*Q155 | | |
| 158 | | | | |
| 159 | | | | |
| 160 | | | | |
| 161 | | | | |
| 162 | | | | |
| 163 | | | | |
| 164 | | | | |
| 165 | | | | |
| 166 | | | | |
| 167 | | | | |
| 168 | | | | |
| 169 | Total Prepayment | | | |
| 170 | | | | |
| 171 | | | | |

| | T | U |
|---|---|---|
| 154 | | |
| 155 | | |
| 156 | | |
| 157 | =SUM(G157:S157) | |
| 158 | | |
| 159 | | |
| 160 | | |
| 161 | | |
| 162 | =SUM(G162:S162) | |
| 163 | | |
| 164 | | |
| 165 | | |
| 166 | | |
| 167 | | |
| 168 | | |
| 169 | =SUM(T153:T162) | |
| 170 | | |
| 171 | | |

| | A | B | C | D |
|---|---|---|---|---|
| 172 | **Reconciliation** | | | |
| 173 | | | | |
| 174 | Principal due | | 6Mos | |
| 175 | | | April | |
| 176 | Less: | | 2 mos 12B | |
| 177 | | | 1mos 5A | |
| 178 | Monthly Amort. Cllect | | | |
| 179 | | | | |
| 180 | us Due on Sale Payments | | 12A | |
| 181 | | | 5A | |
| 182 | | | | |
| 183 | Amount Collected: | | | |
| 184 | Timing Differences | | | |
| 185 | | | | |
| 186 | | | | |
| 187 | | =B105 | =C105 | =D105 |
| 188 | | =B108 | =C108 | =D108 |
| 189 | | =B110 | =C110 | =D110 |
| 190 | | =B111 | =C111 | =D111 |
| 191 | | =B136 | =C136 | =D136 |

| | E | F | G | H |
|---|---|---|---|---|
| 172 | To Be Paid | | | |
| 173 | | | | |
| 174 | =F23 | | | |
| 175 | =F29/6 | | | |
| 176 | =-G140*2 | | | |
| 177 | =-Q117 | | | |
| 178 | =SUM(E174:E177) | | | |
| 179 | | | | |
| 180 | =O157 | | | |
| 181 | =P157 | | | |
| 182 | =SUM(E178:E181) | | | |
| 183 | =-T169 | | | |
| 184 | =E182+E183 | | | |
| 185 | | | | |
| 186 | | | | |
| 187 | =E105 | | | |
| 188 | =E108 | | | |
| 189 | =E110 | | | |
| 190 | =E111 | | | |
| 191 | =E136 | | | |

| | I | J | K | L |
|---|---|---|---|---|
| 172 | | | | |
| 173 | | | | |
| 174 | | | | |
| 175 | | | | |
| 176 | | | | |
| 177 | | | | |
| 178 | | | | |
| 179 | | | | |
| 180 | | | | |
| 181 | | | | |
| 182 | | | | |
| 183 | | | | |
| 184 | | | | |
| 185 | | | | |
| 186 | | | | |
| 187 | | | | |
| 188 | | | | |
| 189 | | | | |
| 190 | | | | |
| 191 | | | | |

| | M | N | O |
|---|---|---|---|
| 172 | | | |
| 173 | | | |
| 174 | | | |
| 175 | | | |
| 176 | | | |
| 177 | | | |
| 178 | | | |
| 179 | | | |
| 180 | | | |
| 181 | | | |
| 182 | | | |
| 183 | | | |
| 184 | | | |
| 185 | | | |
| 186 | | | |
| 187 | | | |
| 188 | | | |
| 189 | | | |
| 190 | | | |
| 191 | | | |

| | P | Q | R | S |
|---|---|---|---|---|
| 172 | | | | |
| 173 | | | | |
| 174 | | | | |
| 175 | | | | |
| 176 | | | | |
| 177 | | | | |
| 178 | | | | |
| 179 | | | | |
| 180 | | | | |
| 181 | | | | |
| 182 | | | | |
| 183 | | | | |
| 184 | | | | |
| 185 | | | | |
| 186 | | | | |
| 187 | | | | |
| 188 | | | | |
| 189 | | | | |
| 190 | | | | |
| 191 | | | | |

| | T | U |
|---|---|---|
| 172 | | |
| 173 | | |
| 174 | | |
| 175 | | |
| 176 | | |
| 177 | | |
| 178 | | |
| 179 | | |
| 180 | | |
| 181 | | |
| 182 | | |
| 183 | | |
| 184 | | |
| 185 | | |
| 186 | | |
| 187 | | |
| 188 | | |
| 189 | | |
| 190 | | |
| 191 | | |

| | A | B | C | D |
|---|---|---|---|---|
| 192 | | =B143 | =C143 | =D143 |
| 193 | | =B148 | =C148 | =D148 |
| 194 | | =B149 | =C149 | =D149 |
| 195 | | =B151 | =C151 | =D151 |
| 196 | | | =SUM(C187:C195) | |
| 197 | | | | |
| 198 | | | | |
| 199 | | | | |
| 200 | | | | |
| 201 | | | | |
| 202 | | =B106 | =C106 | =D106 |
| 203 | | =B113 | =C113 | =D113 |
| 204 | | =B120 | =C120 | =D120 |
| 205 | | =B121 | =C121 | =D121 |
| 206 | | =B124 | =C124 | =D124 |
| 207 | | =B126 | =C126 | =D126 |
| 208 | | =B142 | =C142 | =D142 |
| 209 | | =B146 | =C146 | =D146 |
| 210 | | | ----- | |
| 211 | | | =SUM(C202:C210) | |

| | E | F | G | H |
|---|---|---|---|---|
| 192 | =E143 | | | |
| 193 | =E148 | | | |
| 194 | =E149 | | | |
| 195 | =E151 | | | |
| 196 | | | | |
| 197 | | | | |
| 198 | | | | |
| 199 | | | | |
| 200 | | | | |
| 201 | | | | |
| 202 | =E106 | | | |
| 203 | =E113 | | | |
| 204 | =E120 | | | |
| 205 | =E121 | | | |
| 206 | =E124 | | | |
| 207 | =E126 | | | |
| 208 | =E142 | | | |
| 209 | =E146 | | | |
| 210 | | | | |
| 211 | | | | |

| | I | J | K | L |
|---|---|---|---|---|
| 192 | | | | |
| 193 | | | | |
| 194 | | | | |
| 195 | | | | |
| 196 | | | | |
| 197 | | | | |
| 198 | | | | |
| 199 | | | | |
| 200 | | | | |
| 201 | | | | |
| 202 | | | | |
| 203 | | | | |
| 204 | | | | |
| 205 | | | | |
| 206 | | | | |
| 207 | | | | |
| 208 | | | | |
| 209 | | | | |
| 210 | | | | |
| 211 | | | | |

| | M | N | O |
|---|---|---|---|
| 192 | | | |
| 193 | | | |
| 194 | | | |
| 195 | | | |
| 196 | | | |
| 197 | | | |
| 198 | | | |
| 199 | | | |
| 200 | | | |
| 201 | | | |
| 202 | | | |
| 203 | | | |
| 204 | | | |
| 205 | | | |
| 206 | | | |
| 207 | | | |
| 208 | | | |
| 209 | | | |
| 210 | | | |
| 211 | | | |

| | P | Q | R | S |
|---|---|---|---|---|
| 192 | | | | |
| 193 | | | | |
| 194 | | | | |
| 195 | | | | |
| 196 | | | | |
| 197 | | | | |
| 198 | | | | |
| 199 | | | | |
| 200 | | | | |
| 201 | | | | |
| 202 | | | | |
| 203 | | | | |
| 204 | | | | |
| 205 | | | | |
| 206 | | | | |
| 207 | | | | |
| 208 | | | | |
| 209 | | | | |
| 210 | | | | |
| 211 | | | | |

| | T | U |
|---|---|---|
| 192 | | |
| 193 | | |
| 194 | | |
| 195 | | |
| 196 | | |
| 197 | | |
| 198 | | |
| 199 | | |
| 200 | | |
| 201 | | |
| 202 | | |
| 203 | | |
| 204 | | |
| 205 | | |
| 206 | | |
| 207 | | |
| 208 | | |
| 209 | | |
| 210 | | |
| 211 | | |

TABLE III

Confidential and Proprietary, Chusid/Whitehead Associates

| | A | B | C | D | E | F | G |
|---|---|---|---|---|---|---|---|
| 1 | 08-Jun-94 | | **160 Bleecker Street** | | | | |
| 2 | | FOR DISCUSSION PURPOSES ONLY | | | | | |
| 3 | The information contained herein is proprietary to Chusid/Whitehead Asociates | | | | | | |
| 4 | ("C/W") and should not be discussed with any other party without the express | | | | | | |
| 5 | written consent of C/W. This proposal does not represent a commitment or an offer | | | | | | |
| 6 | to commit on the part of either C/W or Bleecker Street. The information provided | | | | | | |
| 7 | herein is from sources C/W believes to be reliable but C/W does not represent that | | | | | | |
| 8 | it is accurate or complete or suitable for any specific purpose. Additionally, parties | | | | | | |
| 9 | to whom this information is given should be aware that C/W is in the process of completing | | | | | | |
| 10 | a patent application for the process described herein and, in the event | | | | | | |
| 11 | of any infringement of its rights, will avail itself of any legal remedies to which | | | | | | |
| 12 | it is entitled. | | | | | | |
| 13 | | | | | | | |
| 14 | **I. CURRENT MORTGAGE** | | | | | | |
| 15 | | | Interest | Annual | Annual | Total | |
| 16 | | Principal | Rate | Interest | Amortiz. | Dbt. Svce. | |
| 17 | 1st* | 4,500,000 | 9.500% | 427,500 | 0 | 427,500 | |
| 18 | 2nd | 0 | 0.00% | 0 | 0 | 0 | |
| 19 | Total | 4,500,000 | | 427,500 | 0 | 427,500 | |
| 20 | | | | | | | |

Confidential and Proprietary, Chusid/Whitehead Associates

| | H | I | J | K | L | M | N |
|---|---|---|---|---|---|---|---|
| 1 | | | | | | | |
| 2 | | | | | | | |
| 3 | | | | | | | |
| 4 | | | | | | | |
| 5 | | | | | | | |
| 6 | | | | | | | |
| 7 | | | | | | | |
| 8 | | | | | | | |
| 9 | | | | | | | |
| 10 | | | | | | | |
| 11 | | | | | | | |
| 12 | | | | | | | |
| 13 | | | | | | | |
| 14 | | | | | | | |
| 15 | | | | | | | |
| 16 | | | | | | | |
| 17 | | | | | | | |
| 18 | | | | | | | |
| 19 | | | | | | | |
| 20 | | | | | | | |

Confidential and Proprietary, Chusid/Whitehead Associates

| | A | B | C | D | E | F | G |
|---|---|---|---|---|---|---|---|
| 21 | * Based on original face amount not including agreed upon accrued interest | | | | | | |
| 22 | writeoff or reduction. Held by Lincoln Savings. | | | | | | |
| 23 | | | | | | | |
| 24 | **II. GENERAL INFORMATION/ASSUMPTIONS** | | | | | | |
| 25 | | | | | | | |
| 26 | Total Rooms | | 531 | | Market Rental/Mo - Studio | | |
| 27 | Sold Rooms | | 257.5 | | Market Rental/Mo - 1 Br | | |
| 28 | Unsold Rooms | | 273.5 | | Market Rental/Mo - Loft | | |
| 29 | Total Units | | 189 | | Mortgage/Unit | | |
| 30 | Sold Units | | 83 | | Mortgage/Room | | |
| 31 | Unsold Units | | 106 | | Mortgage/Share | | |
| 32 | Total Shares | | 41,979 | | | | |
| 33 | Sold Shares | | 17,892 | | | | |
| 34 | Unsold Shares | | 24,087 | | | | |
| 35 | Avg Shares/Unit | | 222 | | | | |
| 36 | Avg Rooms/Unit | | 2.8 | | | | |
| 37 | Avg. Shares/Room | | 79 | | | | |
| 38 | Maint/Sh/Yr | | 35.28 | | | | |
| 39 | Maint/Sh/Month | | 2.94 | | | | |
| 40 | Avg Maint/Unit/Mo | | 653 | | | | |

Confidential and Proprietary, Chusid/Whitehead Associates

| | H | I | J | K | L | M | N |
|---|---|---|---|---|---|---|---|
| 21 | | | | | | | |
| 22 | | | | | | | |
| 23 | | | | | | | |
| 24 | | | | | | | |
| 25 | | | | | | | |
| 26 | 850 | | | | | | |
| 27 | 1,000 | | | | | | |
| 28 | 1,250 | | | | | | |
| 29 | 23,810 | | | | | | |
| 30 | 8,475 | | | | | | |
| 31 | 107 | | | | | | |
| 32 | | | | | | | |
| 33 | | | | | | | |
| 34 | | | | | | | |
| 35 | | | | | | | |
| 36 | | | | | | | |
| 37 | | | | | | | |
| 38 | | | | | | | |
| 39 | | | | | | | |
| 40 | | | | | | | |

Confidential and Proprietary, Chusid/Whitehead Associates

| | A | B | C | D | E | F | G |
|---|---|---|---|---|---|---|---|
| 41 | Avg Maint/Rm/Mo | | 232 | | | | |
| 42 | Annual Budget* | | 1,481,019 | | | | |
| 43 | Annual Debt Service | | 427,500 | | | | |
| 44 | Dbt Svc/Unit/Mo | | 188 | | | | |
| 45 | Dbt Svc as % Maint | | 29% | | | | |
| 46 | Base Expenses - Annual | | 1,053,519 | | | | |
| 47 | Bases Expenses/Unit/Mo | | 465 | | | | |
| 48 | Real Estate Taxes** | | 480,000 | | | | |
| 49 | Est'd Tax Adjustment | | 240,000 | | | | |
| 50 | | | | | | | |
| 51 | | Shares | Units | Rent | Rent/Unit | Shares/Unit | Rent/Share |
| 52 | Rent Control*** | 9,938 | 44 | 22,610 | 514 | 226 | 2.28 |
| 53 | Rent Stabilized*** | 10,181 | 44 | 31,408 | 714 | 231 | 3.08 |
| 54 | Total Regulated** | 20,119 | 88 | 54,019 | 614 | 229 | 2.68 |
| 55 | Vacancies*** | 1,318 | 6 | 0 | 0 | 220 | 0.00 |
| 56 | Unregulated*** | 2,650 | 12 | 11,658 | 972 | 221 | 4.40 |
| 57 | | 24,087 | 106 | 65,677 | 620 | 227 | 2.73 |
| 58 | | | | | | | |
| 59 | * Net of commercial space | | | | | | |
| 60 | ** Pending possible reduction to $240,000 (savings of 50% or $105 per unit per month). | | | | | | |

Confidential and Proprietary, Chusid/Whitehead Associates

| | H | I | J | K | L | M | N |
|---|---|---|---|---|---|---|---|
| 41 | | | | | | | |
| 42 | | | | | | | |
| 43 | | | | | | | |
| 44 | | | | | | | |
| 45 | | | | | | | |
| 46 | | | | | | | |
| 47 | | | | | | | |
| 48 | | | | | | | |
| 49 | | | | | | | |
| 50 | | | | | | | |
| 51 | Rent/Room | | Maint./Unit | Maint/Mo | Shortfall/Mo | Shortfall/Yr | Rooms/Unit |
| 52 | 180 | | 664 | 29,218 | (6,607) | (79,288) | 2.1 |
| 53 | 244 | | 680 | 29,932 | 1,476 | 17,713 | 2.0 |
| 54 | 212 | | 672 | 59,150 | (5,131) | (61,575) | |
| 55 | 0 | | 646 | 3,875 | (3,875) | (46,499) | 2.2 |
| 56 | 348 | | 649 | 7,791 | 3,867 | 46,404 | 2.6 |
| 57 | 216 | | 668 | 70,816 | (5,139) | (61,670) | 2.1 |
| 58 | | | | | | | |
| 59 | | | | | | | |
| 60 | | | | | | | |

Confidential and Proprietary, Chusid/Whitehead Associates

| | A | B | C | D | E | F | G |
|---|---|---|---|---|---|---|---|
| 61 | ***Based on information received on sponsor's rent roll dated 8/92 and not independently verified. | | | | | | |
| 62 | | | | | | | |
| 63 | **III. PROPOSED RESTRUCTURING** | | | | | | |
| 64 | | | | | | | |
| 65 | 1. Obtain agreement from Lincoln to be paid off ($3MM incl. refinancing costs) | | | | | | |
| 66 | 2. Secure CPS-6; offer units for sale to insiders (sales will be contingent upon closing refinancing; financing will be | | | | | | |
| 67 | provided from bulk lender made available to potential purchasers via bulk end loan financing commitment - to be obtained) | | | | | | |
| 68 | 3. Secure financing for 1st and 2nd mortgages contingent on sellout of 65% (see 2.) | | | | | | |
| 69 | 4. Close units sales; close refinancing | | | | | | |
| 70 | 5. Sell remaining unsold units in bulk | | | | | | |
| 71 | | | | | | | |
| 72 | Note: Refinancing structure assumes only enough units sold to close refinancing and create | | | | | | |
| 73 | reserve to cover costs of remaining unsold units for two years during which time | | | | | | |
| 74 | it is assumed bulk sale will be completed; to extent additional unsold shares are sold | | | | | | |
| 75 | as part of restructuring, proceeds will be used to reduce OPA and mortgage. | | | | | | |
| 76 | | | | | | | |
| 77 | **A. Financing Impact** | | | | | | |
| 78 | | | | | | | |
| 79 | Uses: | | | | Sources: | | |
| 80 | | | | | | | |

| Confidential and Proprietary, Chusid/Whitehead Associates | | | | | | | |
|---|---|---|---|---|---|---|---|
| H | I | J | K | L | M | N | |
| 61 | | | | | | | |
| 62 | | | | | | | |
| 63 | | | | | | | |
| 64 | | | | | | | |
| 65 | | | | | | | |
| 66 | | | | | | | |
| 67 | | | | | | | |
| 68 | | | | | | | |
| 69 | | | | | | | |
| 70 | | | | | | | |
| 71 | | | | | | | |
| 72 | | | | | | | |
| 73 | | | | | | | |
| 74 | | | | | | | |
| 75 | | | | | | | |
| 76 | | | | | | | |
| 77 | | | | | | | |
| 78 | | | | | | | |
| 79 | | | | | | | |
| 80 | | | | | | | |

Confidential and Proprietary, Chusid/Whitehead Associates

| | A | B | C | D | E | F | G |
|---|---|---|---|---|---|---|---|
| 81 | Repairs/Outstanding Bills | | 550,000 | | 1st Mortgage | | |
| 82 | Real Estate Taxes* | | 1,210,000 | | 2nd Mortgage | | |
| 83 | Lincoln** | | 3,000,000 | | Sales Proceeds-Coop Owned Units | | |
| 84 | Bulk Financing Costs*** | | 555 | | Unregulated | | |
| 85 | Unsold Unit Reserve**** | | 57,152 | | Insider | | |
| 86 | General Reserves | | 32,854 | | | | |
| 87 | | | 4,850,561 | | | | |
| 88 | | | | | | | |
| 89 | | | | | | | |
| 90 | | | | Interest | Annual Prin | Annual | Total |
| 91 | | | Principal | Rate | Amort.-Yrs | Debt Service | Interest Paid |
| 92 | New 1st (MVM) | | 2,500,000 | 8.250% | 0 | 206,250 | 2,062,500 |
| 93 | New 2nd (OPA) | | 1,050,000 | 9.000% | 10 | 159,611 | 546,115 |
| 94 | Total | | 3,550,000 | | | 365,861 | 2,608,615 |
| 95 | | | | | | | |
| 96 | | | Unit | Room | Share | | |
| 97 | MVM - Principal | | 13,228 | 4,708 | 59.55 | | |
| 98 | OPA - Principal***** | | 12,651 | 4,078 | 58.69 | | |
| 99 | | | | | | | |
| 100 | *subject to reduction | | | | | | |

Confidential and Proprietary, Chusid/Whitehead Associates

| | H | I | J | K | L | M | N |
|---|---|---|---|---|---|---|---|
| 81 | 2,500,000 | | | | | | |
| 82 | 1,050,000 | | | | | | |
| 83 | (see Sec. III-C) | | | | | | |
| 84 | 755,427 | | | | | | |
| 85 | 545,135 | | | | | | |
| 86 | 4,850,561 | | | | | | |
| 87 | | | | | | | |
| 88 | | | | | | | |
| 89 | | | | | | | |
| 90 | End Bal. | Annual Prin | Annual | End. Bal. | | | |
| 91 | 10 Years | Amort.-Yrs | Dbt. Svce. | 5 Yrs | | | |
| 92 | 2,500,000 | 30 | #NUM! | 2,500,000 | | | |
| 93 | 0 | 30 | 18,204 | 0 | | | |
| 94 | 2,500,000 | | #NUM! | 2,500,000 | | | |
| 95 | | | | | | | |
| 96 | | | | | | | |
| 97 | | | | | | | |
| 98 | | | | | | | |
| 99 | | | | | | | |
| 100 | | | | | | | |

Confidential and Proprietary, Chusid/Whitehead Associates

| | A | B | C | D | E | F | G |
|---|---|---|---|---|---|---|---|
| 101 | | | | | | | |
| 102 | **Lincoln has indicated a willingness to accept $3,000,000 in full satisfaction of their existing obligation; figure is | | | | | | |
| 103 | | | | | | | |
| 104 | *** bulk end loan placement fee | | | 1.0% | | | |
| 105 | bulk end loan commitment fee | | | 0.5% | | | |
| 106 | | | | 1.5% | | | |
| 107 | | | | | | | |
| 108 | | bulk loan facility req'd: | | Rooms | Price/Share | Fin Req'd | |
| 109 | | Regulated (100% fin) | | 181 | 158 | 28,681 | |
| 110 | | Unregulated (75% fin) | | 44 | 253 | 8,360 | |
| 111 | | | | | | 37,041 | |
| 112 | **** Equals two years of shortfall (if negative) assessment on sold shares only; see section III-C | | | | | | |
| 113 | | | | | | | |
| 114 | ***** Allocated to sold units only | | | | | | |
| 115 | | | | | | | |
| 116 | C. Maintenance Impact (both options) | | | | | | |
| 117 | | | | | | | |
| 118 | Total Shares | | 41,979 | | | | |
| 119 | Current Paying | | 17,892 | | | | |
| 120 | Anticipated Sales | | 8,549 | | | | |

Confidential and Proprietary, Chusid/Whitehead Associates

| | H | I | J | K | L | M | N |
|---|---|---|---|---|---|---|---|
| 101 | | | | | | | |
| 102 | inclusive of refinancing costs (approx. $175,000) | | | | | | |
| 103 | | | | | | | |
| 104 | | | | | | | |
| 105 | | | | | | | |
| 106 | | | | | | | |
| 107 | | | | | | | |
| 108 | | | | | | | |
| 109 | | | | | | | |
| 110 | | | | | | | |
| 111 | | | | | | | |
| 112 | | | | | | | |
| 113 | | | | | | | |
| 114 | | | | | | | |
| 115 | | | | | | | |
| 116 | | | | | | | |
| 117 | | | | | | | |
| 118 | | | | | | | |
| 119 | | | | | | | |
| 120 | | | | | | | |

Confidential and Proprietary, Chusid/Whitehead Associates

| | A | B | C | D | E | F | G |
|---|---|---|---|---|---|---|---|
| 121 | New Paying Shares | | 26,441 | | | | |
| 122 | Remaining Unsold Shares | | 15,538 | | | | |
| 123 | | | | # Shares | Per Allocated | Per Allocated | |
| 124 | Base Maintenance-Op Expenses | | 1,053,519 | allocated over: | Share/Yr | Share/Mo | |
| 125 | | -MVM Service | 206,250 | | | | |
| 126 | | | 1,259,769 | 41,979 | 30.01 | 2.50 | |
| 127 | OPA Service* | | 159,611 | 17,892 | 8.92 | 0.74 | |
| 128 | | | 1,419,381 | | 38.93 | 3.24 | |
| 129 | SPA-Occupied Apts** | | 0 | 17,892 | 0.00 | 0.00 | |
| 130 | Total Maintenance/Assmnt | | 1,419,381 | | 38.93 | 3.24 | |
| 131 | | | | | | | |
| 132 | *Paid by current sold shareholders only; additional unit sales pre-restructuring will reduce this assessment | | | | | | |
| 133 | **Two years of shortfall held in reserve at closing; remaining units assumed sold in bulk sale within two years | | | | | | |
| 134 | | | | | | | |
| 135 | **C. Sales - Projections** | | | | | | |
| 136 | | | | | | | |
| 137 | 1. Assumes only sales required for restructuring are sold individually; remainder are assumed sold in bulk. | | | | | | |
| 138 | To extent more units are sold individually, proceeds will be greater. | | | | | | |
| 139 | 2. Only proceeds from individual sales are included as a funds source; to extent | | | | | | |
| 140 | additional sales occur (individual or bulk) and/or vacancies free up units, proceeds can be used to build reserve fund, | | | | | | |

| | H | I | J | K | L | M | N |
|---|---|---|---|---|---|---|---|
| 121 | | | | | | | |
| 122 | | | | | | | |
| 123 | | | | | | | |
| 124 | | | | | | | |
| 125 | | | | | | | |
| 126 | | | | | | | |
| 127 | | | | | | | |
| 128 | | | | | | | |
| 129 | | | | | | | |
| 130 | | | | | | | |
| 131 | | | | | | | |
| 132 | | | | | 0 | | |
| 133 | | | | | | | |
| 134 | | | | | | | |
| 135 | | | | | | | |
| 136 | | | | | | | |
| 137 | | | | | | | |
| 138 | | | | | | | |
| 139 | | | | | | | |
| 140 | reduce mortgage, etc. | | | | | | |

Confidential and Proprietary, Chusid/Whitehead Associates

| | A | B | C | D | E | F | G |
|---|---|---|---|---|---|---|---|
| 141 | | | | | | | |
| 142 | Gross Market Price Per Share | | | | | | |
| 143 | Outside | | $253 | | | | |
| 144 | Inside - Stabilized | | $158 | Unsold Selling Costs (% of gross) | | | |
| 145 | Inside - Controlled | | $97 | C/W Success Fee | | | 10% |
| 146 | Financing-Regulated | | 100% | Selling Commission | | | 10% |
| 147 | Financing-Unregulated | | 80% | Transfer Tax | | | 1% |
| 148 | End Loan Financing - Term | | 30 | Other Selling Costs (legal, mktg, etc.)** | | | 3% |
| 149 | End Loan Financing - Rate | | 7.5% | | | | 25% |
| 150 | End Loan Financing - Pts | | 2% | Bulk Sale Price - % of Outside Value | | | 15% |
| 151 | Tax Deductibility - Maint | | 65% | | | | |
| 152 | Tax Rate | | 30% | | | | |
| 153 | Op Costs - Unsold Units | | | | | | |
| 154 | Maint/Unit/Year | | 350 | | | | |
| 155 | Mgt/Unit/Yr | | 250 | | | | |
| 156 | % Unsold Units Sold - Unregulated | | 100% | | | | |
| 157 | - Stabilized | | 45% | | | | |
| 158 | - Controlled | | 0% | | | | |
| 159 | | | | | | | |
| 160 | Individual Sales | | | | | | |

Confidential and Proprietary, Chusid/Whitehead Associates

| | H | I | J | K | L | M | N |
|---|---|---|---|---|---|---|---|
| 141 | | | | | | | |
| 142 | | | | | | | |
| 143 | | | | | | | |
| 144 | | | | | | | |
| 145 | | | | | | | |
| 146 | | | | | | | |
| 147 | | | | | | | |
| 148 | | | | | | | |
| 149 | | | | | | | |
| 150 | | | | | | | |
| 151 | | | | | | | |
| 152 | | | | | | | |
| 153 | | | | | | | |
| 154 | | | | | | | |
| 155 | | | | | | | |
| 156 | | | | | | | |
| 157 | | | | | | | |
| 158 | | | | | | | |
| 159 | | | | | | | |
| 160 | | | | | | | |

Confidential and Proprietary, Chusid/Whitehead Associates

| | A | B | C | D | E | F | G |
|---|---|---|---|---|---|---|---|
| 161 | | | | | Avg | Avg. | Total |
| 162 | | Units-Sold | Shares | Rooms/Unit | Rent* | Price/Unit | Financed |
| 163 | Unreg./Vac | 18.0 | 3,968 | 2.8 | 972 | 55,809 | 44,647 |
| 164 | Stabilized | 19.8 | 4,581 | 2.9 | 714 | 36,612 | 36,612 |
| 165 | | 37.8 | | | | | |
| 166 | | | | | | | |
| 167 | Bulk Sale | | | | Gross | Net after | |
| 168 | | Units-Sold | Shares | Price/Share | Proceeds | Sales Costs | |
| 169 | Unregulated | 18 | 0 | 38 | 0 | 0 | |
| 170 | Stabilized | 24.2 | 5,600 | 38 | 212,641 | 159,906 | |
| 171 | Controlled | 44 | 9,938 | 38 | 377,392 | 283,799 | |
| 172 | | | | | 590,033 | 443,705 | |
| 173 | | | | | | | |
| 174 | **D. Carry on Remaining Unsold Units** | | | | | | |
| 175 | | | | | Avg | Total | New Maint. |
| 176 | | Units-Rmng | Shares | Rooms/Unit | Rent/Mo* | Rent/Mo* | Not Pd/Mo |
| 177 | Stabilized | 24.2 | 5,600 | 2.9 | 714 | 17,275 | 14,003 |
| 178 | Controlled | 44 | 9,938 | 2.9 | 514 | 22,610 | 24,853 |
| 179 | | | | | | 39,885 | 38,856 |
| 180 | * Not increased as allowable by law due to sponsor default, disrepair; upon completion of required | | | | | | |

Confidential and Proprietary, Chusid/Whitehead Associates

| | H | I | J | K | L | M | N |
|---|---|---|---|---|---|---|---|
| 161 | New | End | Tax | Aft. Tax | Gross | Prcds-Net | |
| 162 | Maint./Mo. | Loan/Mo. | Dedctn | Costs/Mo. | Procds-Coop | of Sls Costs | |
| 163 | 551 | 312 | -201 | 662 | 1,004,557 | 755,427 | |
| 164 | 578 | 256 | -190 | 645 | 724,913 | 545,135 | |
| 165 | | | | | | | |
| 166 | | | | | | | |
| 167 | | | | | | | |
| 168 | | | | | | | |
| 169 | | | | | | | |
| 170 | | | | | | | |
| 171 | | | | | | | |
| 172 | | | | | | | |
| 173 | | | | | | | |
| 174 | | | | | | | |
| 175 | Mgt | Repair | Shortfall/ | Shortfall/ | | | |
| 176 | Fees/Mo | Costs/Mo | Month | Year | | | |
| 177 | 504 | 706 | 2,061 | 24,735 | | | |
| 178 | 917 | 1283 | (4,443) | (53,311) | | | |
| 179 | 1,421 | 1,989 | (2,381) | (28,576) | | | |
| 180 | work and financial stabilization, necessary increase | | | | | | |

Confidential and Proprietary, Chusid/Whitehead Associates

| | A | B | C | D | E | F | G |
|---|---|---|---|---|---|---|---|
| 181 | normal rent increases and MCI/J51 applications will be filed potentially allowing estimated to total 15% of | | | | | | |
| 182 | | | | | | | |
| 183 | ** Excludes gains tax which may be charged on sale | | | | | | |
| 184 | | | | | | | |
| 185 | **IV. IMPACT ON SHAREHOLDER MAINTENANCE/UNIT MARKETABILITY** | | | | | | |
| 186 | | | | | | | |
| 187 | | | | | Average Unit | Per Room | Per Share |
| 188 | Current Maint/Monthly | | | | 634 | 204 | 2.94 |
| 189 | Plus Maintenance Shortfall on Unsold Units | | | | 62 | 20 | |
| 190 | Adjusted Current Maintenance | | | | $696 | $224 | |
| 191 | | | | | | | |
| 192 | Restructuring Maint./Mo | | | | 699 | 225 | 3.24 |
| 193 | Change from Adjusted Current Maintenance | | | | 4 | 1 | 0.02 |
| 194 | Restructuring Maint/Post Sale-Net OPA | | | | 539 | 174 | 2.50 |
| 195 | Change from Adjusted Current Maintenance | | | | (157) | (50) | -0.44 |
| 196 | | | | | | | |
| 197 | Annual Difference | | | | (1,879) | (606) | -8.46 |
| 198 | Value of Diff at Cap Rate of: | | | 9.5% | [illegible] | 6,376 | 89 |
| 199 | RSM Assmnt | | | | [illegible] | 4,078 | |
| 200 | | | | | | | |

Confidential and Proprietary, Chusid/Whitehead Associates

| | H | I | J | K | L | M | N |
|---|---|---|---|---|---|---|---|
| 181 | current rents | | | | | | |
| 182 | | | | | | | |
| 183 | | | | | | | |
| 184 | | | | | | | |
| 185 | | | | | | | |
| 186 | | | | | | | |
| 187 | | | | | | | |
| 188 | | | | | | | |
| 189 | | | | | | | |
| 190 | | | | | | | |
| 191 | | | | | | | |
| 192 | | | | | | | |
| 193 | | | | | | | |
| 194 | | | | | | | |
| 195 | | | | | | | |
| 196 | | | | | | | |
| 197 | | | | | | | |
| 198 | | | | | | | |
| 199 | | | | | | | |
| 200 | | | | | | | |

Confidential and Proprietary, Chusid/Whitehead Associates

| | A | B | C | D | E | F | G |
|---|---|---|---|---|---|---|---|
| 201 | Note: Current shareholder maintenance does not reflect carry of unsold units; | | | | | | |
| 202 | adjustment reflects maintenance-rent shortfall only and does not give effect to | | | | | | |
| 203 | costs of repairs and management incurred in supporting unsold units | | | | | | |
| 204 | | | | | | | |
| 205 | **V. Market Value Mortgage - Valuations** | | | | | | |
| 206 | | | | | | Pre-Restructuring | |
| 207 | 1) Market Rental Value | | | | | | |
| 208 | | | | | | 12,103,609 | |
| 209 | Total Units: | | | 189 | | | |
| 210 | X Market Rental/Unit | | | | | | |
| 211 | Per Month (avg. unreg.) | | 972 | | | | |
| 212 | Per Year | | | 11,658 | | | |
| 213 | | | | 2,203,362 | | | |
| 214 | Less: Base Expenses | | | (1,053,519) | | | |
| 215 | NOI | | | 1,149,843 | | | |
| 216 | Divided by Cap Rate of | | | 9.5% | | | |
| 217 | | | | 12,103,609 | | | |
| 218 | | | | | | | |
| 219 | | | | | | | |
| 220 | | | | | | | |

Confidential and Proprietary, Chusid/Whitehead Associates

| | H | I | J | K | L | M | N |
|---|---|---|---|---|---|---|---|
| 201 | | | | | | | |
| 202 | | | | | | | |
| 203 | | | | | | | |
| 204 | | | | | | | |
| 205 | | | | | | | |
| 206 | Post-Restruct./Tax Rdcn. | | | | | | |
| 207 | | | | | | | |
| 208 | 12,103,609 | | | | | | |
| 209 | | | | | | | |
| 210 | | | | | | | |
| 211 | | | | | | | |
| 212 | | | | | | | |
| 213 | | | | | | | |
| 214 | | | | | | | |
| 215 | | | | | | | |
| 216 | | | | | | | |
| 217 | | | | | | | |
| 218 | | | | | | | |
| 219 | | | | | | | |
| 220 | | | | | | | |

Confidential and Proprietary, Chusid/Whitehead Associates

| | A | B | C | D | E | F | G |
|---|---|---|---|---|---|---|---|
| 221 | 2) Gross Sellout Value | | | | | Pre-Restructuring | |
| 222 | | | | | | | |
| 223 | | | | Per Share Value - Sold | | 253 | |
| 224 | | | | X # Shares | | 17,892 | |
| 225 | | | | Sold Share Value ** | | 2,264,810 | |
| 226 | | | | Per Share Value - Unregltd. | | 0 | |
| 227 | | | | X # Shares | | 3,968 | |
| 228 | | | | Unreg. Share Value | | 0 | |
| 229 | | | | Per Share Value - Stabilized | | 0 | |
| 230 | | | | X # Shares | | 10,181 | |
| 231 | | | | Stabilized Share Value | | 0 | |
| 232 | | | | Per Share Value - Controlled | | 0 | |
| 233 | | | | X # Shares | | 9,938 | |
| 234 | | | | Controlled Share Value | | 0 | |
| 235 | | | | Total Value | | 2,264,810 | |
| 236 | | | | | | | |
| 237 | | | * Proposed amount of new mortgages | | | | |
| 238 | | | ** Sold shares includes sales of unsold shares necessary to complete plan; | | | | |
| 239 | | | | excludes any impact from additional sales to insiders, bulk | | | |
| 240 | | | *** 50% of outside market value pre-restructuring; discount reflects building's | | | | |

Confidential and Proprietary, Chusid/Whitehead Associates

| | H | I | J | K | L | M | N |
|---|---|---|---|---|---|---|---|
| 221 | Post-Restructuring* | | | | | | |
| 222 | | | | | | | |
| 223 | 253 | | | | | | |
| 224 | 26,441 | | | | | | |
| 225 | 6,694,038 | | | | | | |
| 226 | 253 | | | | | | |
| 227 | 3,968 | | | | | | |
| 228 | 1,004,557 | | | | | | |
| 229 | 158 | | | | | | |
| 230 | 10,181 | | | | | | |
| 231 | 1,610,918 | | | | | | |
| 232 | 97 | | | | | | |
| 233 | 9,938 | | | | | | |
| 234 | 963,936 | | | | | | |
| 235 | 10,273,449 | | | | | | |
| 236 | | | | | | | |
| 237 | | | | | | | |
| 238 | | | | | | | |
| 239 | sale or from vacancy turnover | | | | | | |
| 240 | financial difficulties | | | | | | |

Confidential and Proprietary, Chusid/Whitehead Associates

| | A | B | C | D | E | F | G |
|---|---|---|---|---|---|---|---|
| 241 | | | | | | | |
| 242 | VI. Unsold Share Rent Roll | | | | | | |
| 243 | | | | | | | |
| 244 | # | Unit | Rent | Shares | Rooms | Baths | Type |
| 245 | 1 | 10AW | 349.00 | 182 | 2 | 1 | RC |
| 246 | 2 | 10DW | 1115.00 | 290 | 2 | 1.5 | RC |
| 247 | 3 | 10EE | 439.00 | 255 | 2 | 1 | RC |
| 248 | 4 | 10FW | 429.00 | 290 | 2 | 1.5 | RC |
| 249 | 5 | 10GE | 349.00 | 270 | 2 | 1.5 | RC |
| 250 | 6 | 1CW | 1000.00 | 195 | 3 | 1 | RS |
| 251 | 7 | 1DW | 289.00 | 129 | 2 | 1 | RC |
| 252 | 8 | 1HE | 1200.00 | 195 | 1.5 | 1 | U |
| 253 | 9 | 2BW | 339.00 | 210 | 3 | 1 | RC |
| 254 | 10 | 2CW | 379.00 | 210 | 3 | 1 | RC |
| 255 | 11 | 2DW | 289.00 | 132 | 2 | 1 | RC |
| 256 | 12 | 3BE | 305.10 | 215 | 3 | 1 | RC |
| 257 | 13 | 3BW | 339.00 | 215 | 3 | 1 | RC |
| 258 | 14 | 3DW | 588.19 | 237 | 3 | 1 | RS |
| 259 | 15 | 3EE | 850.00 | 176 | 2 | 1 | U |
| 260 | 16 | 3HE | 359.00 | 225 | 3 | 1 | RC |

Confidential and Proprietary, Chusid/Whitehead Associates

| | H | I | J | K | L | M | N |
|---|---|---|---|---|---|---|---|
| 241 | | | | | | | |
| 242 | | | | | | | |
| 243 | BL | | | | | | |
| 244 | Type | Maint. | Shortfall | | | | |
| 245 | B | 535.08 | -186.08 | | | | |
| 246 | B | 852.60 | 262.40 | | | | |
| 247 | B | 749.70 | -310.70 | | | | |
| 248 | B | 852.60 | -423.60 | | | | |
| 249 | B | 793.80 | -444.80 | | | | |
| 250 | B | 573.30 | 426.70 | | | | |
| 251 | B | 379.26 | -90.26 | | | | |
| 252 | B | 573.30 | 626.70 | | | | |
| 253 | B | 617.40 | -278.40 | | | | |
| 254 | B | 617.40 | -238.40 | | | | |
| 255 | B | 388.08 | -99.08 | | | | |
| 256 | B | 632.10 | -327.00 | | | | |
| 257 | B | 632.10 | -293.10 | | | | |
| 258 | B | 696.78 | -108.59 | | | | |
| 259 | B | 517.44 | 332.56 | | | | |
| 260 | B | 661.50 | -302.50 | | | | |

Confidential and Proprietary, Chusid/Whitehead Associates

| | A | B | C | D | E | F | G |
|---|---|---|---|---|---|---|---|
| 261 | 17 | 3KE | 289.00 | 161 | 2 | 1 | RC |
| 262 | 18 | 4DE | 389.00 | 257 | 3 | 1 | RC |
| 263 | 19 | 4EE | 289.00 | 179 | 2 | 1 | RC |
| 264 | 20 | 4JW | 359.00 | 230 | 3 | 1 | RC |
| 265 | 21 | 5BE | 1100.00 | 225 | 3 | 1 | RS |
| 266 | 22 | 5BW | 349.00 | 225 | 3 | 1 | RC |
| 267 | 23 | 5DE | 650.00 | 262 | 3 | 1 | U |
| 268 | 24 | 5GW | 409.00 | 270 | 3 | 1 | RC |
| 269 | 25 | 5HE | 369.00 | 235 | 3 | 1 | RC |
| 270 | 26 | 5JE | 1250.00 | 225 | 3 | 1 | V |
| 271 | 27 | 6DE | 399.00 | 272 | 3 | 1 | RC |
| 272 | 28 | 6DW | 389.00 | 257 | 3 | 1 | RC |
| 273 | 29 | 6HE | 369.00 | 240 | 3 | 1 | RC |
| 274 | 30 | 6KE | 299.00 | 170 | 2 | 1 | RS |
| 275 | 31 | 6KW | 935.00 | 170 | 3 | 1 | U |
| 276 | 32 | 7AE | 309.00 | 163 | 2 | 1 | RC |
| 277 | 33 | 7HW | 379.00 | 245 | 3 | 1 | RC |
| 278 | 34 | 7JW | 379.00 | 245 | 2 | 1 | RC |
| 279 | 35 | 8DE | 619.00 | 287 | 3 | 1 | RC |
| 280 | 36 | 8GE | 419.00 | 285 | 3 | 1 | RC |

Confidential and Proprietary, Chusid/Whitehead Associates

| | H | I | J | K | L | M | N |
|---|---|---|---|---|---|---|---|
| 261 | B | 473.34 | -184.34 | | | | |
| 262 | B | 755.58 | -366.58 | | | | |
| 263 | B | 526.26 | -237.26 | | | | |
| 264 | B | 676.20 | -317.20 | | | | |
| 265 | B | 661.50 | 438.50 | | | | |
| 266 | B | 661.50 | -312.50 | | | | |
| 267 | B | 770.28 | -120.28 | | | | |
| 268 | B | 793.80 | -384.80 | | | | |
| 269 | B | 690.90 | -321.90 | | | | |
| 270 | B | 661.50 | 588.50 | | | | |
| 271 | B | 799.68 | -400.68 | | | | |
| 272 | B | 755.58 | -366.58 | | | | |
| 273 | B | 705.60 | -336.60 | | | | |
| 274 | B | 499.80 | -200.80 | | | | |
| 275 | B | 499.80 | 435.20 | | | | |
| 276 | B | 479.22 | -170.22 | | | | |
| 277 | B | 720.30 | -341.30 | | | | |
| 278 | B | 720.30 | -341.30 | | | | |
| 279 | B | 843.78 | -224.78 | | | | |
| 280 | B | 837.90 | -418.90 | | | | |

Confidential and Proprietary, Chusid/Whitehead Associates

| | A | B | C | D | E | F | G |
|---|---|---|---|---|---|---|---|
| 281 | 37 | 9AE | 319.00 | 169 | 2 | 1 | RC |
| 282 | 38 | 9CE | 389.00 | 255 | 3 | 1 | RC |
| 283 | 39 | 9DW | 1450.00 | 277 | 3 | 1 | U |
| 284 | 40 | 9FE | 319.00 | 194 | 2 | 1 | RC |
| 285 | 41 | 9GE | 429.00 | 290 | 3 | 1 | RC |
| 286 | 42 | 9GW | 429.00 | 290 | 3 | 1 | RC |
| 287 | 43 | 9JW | 389.00 | 255 | 3 | 1 | RC |
| 288 | 44 | 9KW | 319.00 | 179 | 2 | 1 | RC |
| 289 | 45 | 1HW | 990.00 | 195 | 2 | 1 | U |
| 290 | 46 | 3DE | 915.00 | 252 | 3 | 1 | U |
| 291 | 47 | 5JW | 1040.00 | 235 | 3 | 1 | U |
| 292 | 48 | 6BW | 1095.00 | 235 | 3 | 1 | U |
| 293 | 49 | 6EE | 950.00 | 185 | 2 | 1 | U |
| 294 | 50 | 6FE | 884.00 | 185 | 2 | 1 | U |
| 295 | 51 | 8FE | 725.00 | 191 | 2 | 1 | U |
| 296 | 52 | 8FW | 975.00 | 191 | 3 | 1 | U |
| 297 | 53 | 8JE | 1100.00 | 240 | 3 | 1 | U |
| 298 | 54 | 9BW | 850.00 | 255 | 3 | 1 | U |
| 299 | 55 | 9DE | 1250.00 | 292 | 3 | 1 | U |
| 300 | 56 | 9EW | 884.00 | 194 | 2 | 1 | U |

Confidential and Proprietary, Chusid/Whitehead Associates

| | H | I | J | K | L | M | N |
|---|---|---|---|---|---|---|---|
| 281 | B | 496.86 | -177.86 | | | | |
| 282 | B | 749.70 | -360.70 | | | | |
| 283 | B | 814.38 | 635.62 | | | | |
| 284 | B | 570.36 | -251.36 | | | | |
| 285 | B | 852.60 | -423.60 | | | | |
| 286 | B | 852.60 | -423.60 | | | | |
| 287 | B | 749.70 | -360.70 | | | | |
| 288 | B | 526.26 | -207.26 | | | | |
| 289 | PE | 573.30 | 416.70 | | | | |
| 290 | PE | 740.88 | 174.12 | | | | |
| 291 | PE | 690.90 | 349.10 | | | | |
| 292 | PE | 690.90 | 404.10 | | | | |
| 293 | PE | 543.90 | 406.10 | | | | |
| 294 | PE | 543.90 | 340.10 | | | | |
| 295 | PE | 561.54 | 163.46 | | | | |
| 296 | PE | 561.54 | 413.46 | | | | |
| 297 | PE | 705.60 | 394.40 | | | | |
| 298 | PE | 749.70 | 100.30 | | | | |
| 299 | PE | 858.48 | 391.52 | | | | |
| 300 | PE | 570.36 | 313.64 | | | | |

Confidential and Proprietary, Chusid/Whitehead Associates

| | A | B | C | D | E | F | G |
|---|---|---|---|---|---|---|---|
| 301 | 57 | 10BW | 806.96 | 290 | 3 | 1.5 | U |
| 302 | 58 | 10CW | 721.65 | 290 | 2 | 1.5 | U |
| 303 | 59 | 10EW | 803.17 | 275 | 3 | 1.5 | RS |
| 304 | 60 | 10FE | 770.29 | 290 | 2 | 1.5 | RS |
| 305 | 61 | 10GW | 856.00 | 270 | 2 | 1.5 | U |
| 306 | 62 | 10HW | 695.50 | 247 | 2 | 1 | U |
| 307 | 63 | 10KE | 1200.00 | 290 | 2 | 1.5 | U |
| 308 | 64 | 10KW | 1000.00 | 300 | 2 | 1.5 | U |
| 309 | 65 | 2AW | 633.64 | 190 | 3 | 1 | RS |
| 310 | 66 | 2CE | 723.16 | 235 | 3 | 1 | RS |
| 311 | 67 | 2EW | 700.32 | 210 | 3 | 1 | RS |
| 312 | 68 | 3FW | 565.32 | 176 | 2 | 1 | RS |
| 313 | 69 | 3GE | 737.50 | 260 | 3 | 1 | RS |
| 314 | 70 | 3HW | 428.00 | 225 | 3 | 1 | RC |
| 315 | 71 | 3JE | 647.90 | 215 | 3 | 1 | RS |
| 316 | 72 | 4FW | 673.42 | 179 | 2 | 1 | RS |
| 317 | 73 | 4GE | 809.31 | 265 | 3 | 1 | RS |
| 318 | 74 | 4GW | 773.88 | 265 | 3 | 1 | RS |
| 319 | 75 | 4HW | 740.46 | 230 | 3 | 1 | RS |
| 320 | 76 | 4KW | 900.00 | 164 | 2 | 1 | U |

Confidential and Proprietary, Chusid/Whitehead Associates

| | H | I | J | K | L | M | N |
|---|---|---|---|---|---|---|---|
| 301 | RS | 852.60 | -45.64 | | | | |
| 302 | RS | 852.60 | -130.95 | | | | |
| 303 | RS | 808.50 | -5.33 | | | | |
| 304 | RS | 852.60 | -82.31 | | | | |
| 305 | RS | 793.80 | 62.20 | | | | |
| 306 | RS | 726.18 | -30.68 | | | | |
| 307 | RS | 852.60 | 347.40 | | | | |
| 308 | RS | 882.00 | 118.00 | | | | |
| 309 | RS | 558.60 | 75.04 | | | | |
| 310 | RS | 690.90 | 32.26 | | | | |
| 311 | RS | 617.40 | 82.92 | | | | |
| 312 | RS | 517.44 | 47.88 | | | | |
| 313 | RS | 764.40 | -26.90 | | | | |
| 314 | RS | 661.50 | -233.50 | | | | |
| 315 | RS | 632.10 | 15.80 | | | | |
| 316 | RS | 526.26 | 147.16 | | | | |
| 317 | RS | 779.10 | 30.21 | | | | |
| 318 | RS | 779.10 | -5.22 | | | | |
| 319 | RS | 676.20 | 64.26 | | | | |
| 320 | RS | 482.16 | 417.84 | | | | |

Confidential and Proprietary, Chusid/Whitehead Associates

| | A | B | C | D | E | F | G |
|---|---|---|---|---|---|---|---|
| 321 | 77 | 5CE | 509.56 | 225 | 3 | 1 | RS |
| 322 | 78 | 5EW | 583.83 | 182 | 2 | 1 | RS |
| 323 | 79 | 5HW | 649.47 | 235 | 3 | 1 | RS |
| 324 | 80 | 5KE | 527.36 | 167 | 2 | 1 | RS |
| 325 | 81 | 6AE | 674.10 | 157 | 2 | 1 | U |
| 326 | 82 | 6AW | 542.86 | 157 | 2 | 1 | RS |
| 327 | 83 | 6GE | 836.00 | 275 | 3 | 1 | U |
| 328 | 84 | 6GW | 856.00 | 275 | 3 | 1 | U |
| 329 | 85 | 6JW | 585.62 | 240 | 3 | 1 | RS |
| 330 | 86 | 7AW | 582.38 | 163 | 3 | 1 | RS |
| 331 | 87 | 7BE | 582.93 | 245 | 3 | 1 | RS |
| 332 | 88 | 7BW | 624.81 | 245 | 3 | 1 | RS |
| 333 | 89 | 7CE | 629.57 | 245 | 3 | 1 | RS |
| 334 | 90 | 7CW | 537.14 | 245 | 3 | 1 | RS |
| 335 | 91 | 7EW | 558.06 | 188 | 2 | 1 | RS |
| 336 | 92 | 7GE | 718.88 | 280 | 3 | 1 | RS |
| 337 | 93 | 7JE | 1100.00 | 235 | 3 | 1 | U |
| 338 | 94 | 8AE | 601.74 | 166 | 2 | 1 | RS |
| 339 | 95 | 8BW | 739.63 | 250 | 3 | 1 | RS |
| 340 | 96 | 8EE | 975.00 | 191 | 2 | 1 | U |

Confidential and Proprietary, Chusid/Whitehead Associates

| | H | I | J | K | L | M | N |
|---|---|---|---|---|---|---|---|
| 321 | RS | 661.50 | -151.94 | | | | |
| 322 | RS | 535.08 | 48.75 | | | | |
| 323 | RS | 690.90 | -41.43 | | | | |
| 324 | RS | 490.98 | 36.38 | | | | |
| 325 | RS | 461.58 | 212.52 | | | | |
| 326 | RS | 461.58 | 81.28 | | | | |
| 327 | RS | 808.50 | 27.50 | | | | |
| 328 | RS | 808.50 | 47.50 | | | | |
| 329 | RS | 705.60 | -119.98 | | | | |
| 330 | RS | 479.22 | 103.16 | | | | |
| 331 | RS | 720.30 | -137.37 | | | | |
| 332 | RS | 720.30 | -95.49 | | | | |
| 333 | RS | 720.30 | -90.73 | | | | |
| 334 | RS | 720.30 | -183.16 | | | | |
| 335 | RS | 552.72 | 5.34 | | | | |
| 336 | RS | 823.20 | -104.32 | | | | |
| 337 | RS | 690.90 | 409.10 | | | | |
| 338 | RS | 488.04 | 113.70 | | | | |
| 339 | RS | 735.00 | 4.63 | | | | |
| 340 | RS | 561.54 | 413.46 | | | | |

Confidential and Proprietary, Chusid/Whitehead Associates

| | A | B | C | D | E | F | G |
|---|---|---|---|---|---|---|---|
| 341 | 97 | 8HW | 802.50 | 250 | 3 | 1 | U |
| 342 | 98 | 8JW | 689.68 | 250 | 3 | 1 | RS |
| 343 | 99 | 9EE | 526.01 | 194 | 2 | 1 | RS |
| 344 | 100 | 9HE | 788.67 | 255 | 3 | 1 | RS |
| 345 | 101 | 10HE | 0.00 | 247 | 2 | 1 | U |
| 346 | 102 | 1GE | 0.00 | 180 | 1.5 | 1 | U |
| 347 | 103 | 1JW | 0.00 | 195 | 1.5 | 1 | U |
| 348 | 104 | 8CW | 0.00 | 250 | 3 | 1 | U |
| 349 | 105 | 8EW | 0.00 | 191 | 2 | 1 | V |
| 350 | 106 | 9BE | 0.00 | 255 | 3 | 1 | RS |
| 351 | Total | | 65,676.57 | 24,087 | 274 | 111 | |
| 352 | | | | | | | |
| 353 | | | # | Shares | Rent | Avg./Unit | Rooms |
| 354 | | | | | | | |
| 355 | Rent Control | | 44 | 9,938 | 22,610 | 514 | 94.0 |
| 356 | R/S | | 44 | 10,181 | 31,408 | 714 | 87.0 |
| 357 | Unreg./PE | | 12 | 2,650 | 11,658 | 972 | 31.0 |
| 358 | Vacant | | 6 | 1,318 | 0 | 0 | 13.0 |
| 359 | | | 106 | 24,087 | 65,677 | 620 | 225.0 |
| 360 | [ | | | | | | |

Confidential and Proprietary, Chusid/Whitehead Associates

| | H | I | J | K | L | M | N |
|---|---|---|---|---|---|---|---|
| 341 | RS | 735.00 | 67.50 | | | | |
| 342 | RS | 735.00 | -45.32 | | | | |
| 343 | RS | 570.36 | -44.35 | | | | |
| 344 | RS | 749.70 | 38.97 | | | | |
| 345 | V | 726.18 | -726.18 | | | | |
| 346 | V | 529.20 | -529.20 | | | | |
| 347 | V | 573.30 | -573.30 | | | | |
| 348 | V | 735.00 | -735.00 | | | | |
| 349 | V | 561.54 | -561.54 | | | | |
| 350 | V | 749.70 | -749.70 | | | | |
| 351 | | 70,816 | (5,139) | | | | |
| 352 | | | | | | | |
| 353 | Rooms/Unit | | | | | | |
| 354 | | | | | | | |
| 355 | 2.1 | | | | | | |
| 356 | 2.0 | | | | | | |
| 357 | 2.6 | | | | | | |
| 358 | 2.2 | | | | | | |
| 359 | 2.1 | | | | | | |
| 360 | | | | | | | |

Confidential and Proprietary, Chusid/Whitehead Associates

| | A | B | C | D | E | F | G |
|---|---|---|---|---|---|---|---|
| 361 | Rent vs. Buy Analysis | | | | | | |
| 362 | Gross Market Price Per Room (Post-Restructuring) | | | | | | |
| 363 | Outside | | 253 | | | | |
| 364 | Inside | | 158 | | | | |
| 365 | Financing-Regulated | | 100% | | | | |
| 366 | Financing-Unregulated | | 80% | | | | 2.50 |
| 367 | End Loan Financing - Term | | 30 | | | | |
| 368 | End Loan Financing - Rate | | 7.5% | | | | |
| 369 | End Loan Financing - Pts | | 2.0% | | | | |
| 370 | Tax Deductibility - Maint | | 65% | | | | |
| 371 | Tax Rate | | 30% | | | | |
| 372 | | | | | | | |
| 373 | # | Unit | Shares | Type | Rooms | Price | Payment |
| 374 | 1 | 10AW | 182 | B | 2 | 316 | 0 |
| 375 | 2 | 10DW | 290 | B | 2 | 316 | 0 |
| 376 | 3 | 10EE | 255 | B | 2 | 316 | 0 |
| 377 | 4 | 10FW | 290 | B | 2 | 316 | 0 |
| 378 | 5 | 10GE | 270 | B | 2 | 316 | 0 |
| 379 | 6 | 1CW | 195 | B | 3 | 475 | 0 |
| 380 | 7 | 1DW | 129 | B | 2 | 316 | 0 |

Confidential and Proprietary, Chusid/Whitehead Associates

| | H | I | J | K | L | M | N |
|---|---|---|---|---|---|---|---|
| 361 | | | | | | | |
| 362 | | | | | | | |
| 363 | | | | | | | |
| 364 | | | | | | | |
| 365 | | | | | | | |
| 366 | | | | | | | |
| 367 | | | | | | | |
| 368 | | | | | | | |
| 369 | | | | | | | |
| 370 | | | | | | | |
| 371 | | | | | | | |
| 372 | | Monthly | | | | | Maint/Mtg |
| 373 | Financed | Payment | Maint./Mo | Deductible | Maint/Mort | Rent | Less Rent |
| 374 | 316 | 2.21 | 455.14 | 298.06 | 367.94 | 349.00 | 18.94 |
| 375 | 316 | 2.21 | 725.23 | 473.61 | 585.36 | 806.96 | -221.60 |
| 376 | 316 | 2.21 | 637.70 | 416.72 | 514.90 | 721.65 | -206.75 |
| 377 | 316 | 2.21 | 725.23 | 473.61 | 585.36 | 499.00 | 86.36 |
| 378 | 316 | 2.21 | 675.21 | 441.10 | 545.10 | 439.00 | 106.10 |
| 379 | 475 | 3.32 | 487.65 | 320.29 | 394.89 | 803.17 | -408.28 |
| 380 | 316 | 2.21 | 322.60 | 211.90 | 261.24 | 770.29 | -509.05 |

Confidential and Proprietary, Chusid/Whitehead Associates

| | A | B | C | D | E | F | G |
|---|---|---|---|---|---|---|---|
| 381 | 8 | 1HE | 195 | B | 1.5 | 237 | 0 |
| 382 | 9 | 2BW | 210 | B | 3 | 475 | 0 |
| 383 | 10 | 2CW | 210 | B | 3 | 475 | 0 |
| 384 | 11 | 2DW | 132 | B | 2 | 316 | 0 |
| 385 | 12 | 3BE | 215 | B | 3 | 475 | 0 |
| 386 | 13 | 3BW | 215 | B | 3 | 475 | 0 |
| 387 | 14 | 3DW | 237 | B | 3 | 475 | 0 |
| 388 | 15 | 3EE | 176 | B | 2 | 316 | 0 |
| 389 | 16 | 3HE | 225 | B | 3 | 475 | 0 |
| 390 | 17 | 3KE | 161 | B | 2 | 316 | 0 |
| 391 | 18 | 4DE | 257 | B | 3 | 475 | 0 |
| 392 | 19 | 4EE | 179 | B | 2 | 316 | 0 |
| 393 | 20 | 4JW | 230 | B | 3 | 475 | 0 |
| 394 | 21 | 5BE | 225 | B | 3 | 475 | 0 |
| 395 | 22 | 5BW | 225 | B | 3 | 475 | 0 |
| 396 | 23 | 5DE | 262 | B | 3 | 475 | 0 |
| 397 | 24 | 5GW | 270 | B | 3 | 475 | 0 |
| 398 | 25 | 5HE | 235 | B | 3 | 475 | 0 |
| 399 | 26 | 5JE | 225 | B | 3 | 475 | 0 |
| 400 | 27 | 6DE | 272 | B | 3 | 475 | 0 |

Confidential and Proprietary, Chusid/Whitehead Associates

| | H | I | J | K | L | M | N |
|---|---|---|---|---|---|---|---|
| 381 | 237 | 1.66 | 487.65 | 318.63 | 393.72 | 429.00 | -35.28 |
| 382 | 475 | 3.32 | 525.17 | 344.68 | 425.08 | 349.00 | 76.08 |
| 383 | 475 | 3.32 | 525.17 | 344.68 | 425.08 | 856.00 | -430.92 |
| 384 | 316 | 2.21 | 330.10 | 216.78 | 267.28 | 950.00 | -682.72 |
| 385 | 475 | 3.32 | 537.67 | 352.80 | 435.15 | 695.50 | -260.35 |
| 386 | 475 | 3.32 | 537.67 | 352.80 | 435.15 | 834.80 | -399.65 |
| 387 | 475 | 3.32 | 592.69 | 388.57 | 479.44 | 1000.00 | -520.56 |
| 388 | 316 | 2.21 | 440.14 | 288.30 | 355.86 | 379.00 | -23.14 |
| 389 | 475 | 3.32 | 562.68 | 369.06 | 455.28 | 289.00 | 166.28 |
| 390 | 316 | 2.21 | 402.63 | 263.92 | 325.66 | 817.50 | -491.84 |
| 391 | 475 | 3.32 | 642.70 | 421.08 | 519.70 | 800.00 | -280.30 |
| 392 | 316 | 2.21 | 447.64 | 293.18 | 361.90 | 900.00 | -538.10 |
| 393 | 475 | 3.32 | 575.18 | 377.19 | 465.35 | 850.00 | -384.65 |
| 394 | 475 | 3.32 | 562.68 | 369.06 | 455.28 | 633.64 | -178.36 |
| 395 | 475 | 3.32 | 562.68 | 369.06 | 455.28 | 339.00 | 116.28 |
| 396 | 475 | 3.32 | 655.21 | 429.20 | 529.77 | 688.73 | -158.96 |
| 397 | 475 | 3.32 | 675.21 | 442.21 | 545.87 | 379.00 | 166.87 |
| 398 | 475 | 3.32 | 587.69 | 385.32 | 475.41 | 289.00 | 186.41 |
| 399 | 475 | 3.32 | 562.68 | 369.06 | 455.28 | 700.32 | -245.04 |
| 400 | 475 | 3.32 | 680.22 | 445.46 | 549.90 | 305.10 | 244.80 |

Confidential and Proprietary, Chusid/Whitehead Associates

| | A | B | C | D | E | F | G |
|---|---|---|---|---|---|---|---|
| 401 | 28 | 6DW | 257 | B | 3 | 475 | 0 |
| 402 | 29 | 6HE | 240 | B | 3 | 475 | 0 |
| 403 | 30 | 6KE | 170 | B | 2 | 316 | 0 |
| 404 | 31 | 6KW | 170 | B | 3 | 475 | 0 |
| 405 | 32 | 7AE | 163 | B | 2 | 316 | 0 |
| 406 | 33 | 7HW | 245 | B | 3 | 475 | 0 |
| 407 | 34 | 7JW | 245 | B | 2 | 316 | 0 |
| 408 | 35 | 8DE | 287 | B | 3 | 475 | 0 |
| 409 | 36 | 8GE | 285 | B | 3 | 475 | 0 |
| 410 | 37 | 9AE | 169 | B | 2 | 316 | 0 |
| 411 | 38 | 9CE | 255 | B | 3 | 475 | 0 |
| 412 | 39 | 9DW | 277 | B | 3 | 475 | 0 |
| 413 | 40 | 9FE | 194 | B | 2 | 316 | 0 |
| 414 | 41 | 9GE | 290 | B | 3 | 475 | 0 |
| 415 | 42 | 9GW | 290 | B | 3 | 475 | 0 |
| 416 | 43 | 9JW | 255 | B | 3 | 475 | 0 |
| 417 | 44 | 9KW | 179 | B | 2 | 316 | 0 |
| 418 | 45 | 1HW | 195 | PE | 2 | 506 | 101 |
| 419 | 46 | 3DE | 252 | PE | 3 | 759 | 152 |
| 420 | 47 | 5JW | 235 | PE | 3 | 759 | 152 |

Confidential and Proprietary, Chusid/Whitehead Associates

| | H | I | J | K | L | M | N |
|---|---|---|---|---|---|---|---|
| 401 | 475 | 3.32 | 642.70 | 421.08 | 519.70 | 339.00 | 180.70 |
| 402 | 475 | 3.32 | 600.19 | 393.44 | 485.48 | 595.90 | -110.42 |
| 403 | 316 | 2.21 | 425.13 | 278.55 | 343.78 | 588.19 | -244.41 |
| 404 | 475 | 3.32 | 425.13 | 279.66 | 344.56 | 825.00 | -480.44 |
| 405 | 316 | 2.21 | 407.63 | 267.17 | 329.69 | 565.32 | -235.63 |
| 406 | 475 | 3.32 | 612.69 | 401.57 | 495.54 | 716.02 | -220.48 |
| 407 | 316 | 2.21 | 612.69 | 400.46 | 494.77 | 359.00 | 135.77 |
| 408 | 475 | 3.32 | 717.73 | 469.84 | 580.09 | 428.00 | 152.09 |
| 409 | 475 | 3.32 | 712.73 | 466.59 | 576.07 | 608.36 | -32.29 |
| 410 | 316 | 2.21 | 422.63 | 276.92 | 341.77 | 289.00 | 52.77 |
| 411 | 475 | 3.32 | 637.70 | 417.83 | 515.67 | 389.00 | 126.67 |
| 412 | 475 | 3.32 | 692.72 | 453.59 | 559.96 | 289.00 | 270.96 |
| 413 | 316 | 2.21 | 485.15 | 317.56 | 392.10 | 641.36 | -249.26 |
| 414 | 475 | 3.32 | 725.23 | 474.72 | 586.13 | 770.77 | -184.64 |
| 415 | 475 | 3.32 | 725.23 | 474.72 | 586.13 | 737.09 | -150.96 |
| 416 | 475 | 3.32 | 637.70 | 417.83 | 515.67 | 740.46 | -224.79 |
| 417 | 316 | 2.21 | 447.64 | 293.18 | 361.90 | 359.00 | 2.90 |
| 418 | 405 | 2.83 | 487.65 | 319.81 | 394.54 | 625.00 | -230.46 |
| 419 | 608 | 4.25 | 630.20 | 413.88 | 510.28 | 396.67 | 113.61 |
| 420 | 608 | 4.25 | 587.69 | 386.24 | 476.06 | 349.00 | 127.06 |

Confidential and Proprietary, Chusid/Whitehead Associates

| | A | B | C | D | E | F | G |
|---|---|---|---|---|---|---|---|
| 421 | 48 | 6BW | 235 | PE | 3 | 759 | 152 |
| 422 | 49 | 6EE | 185 | PE | 2 | 506 | 101 |
| 423 | 50 | 6FE | 185 | PE | 2 | 506 | 101 |
| 424 | 51 | 8FE | 191 | PE | 2 | 506 | 101 |
| 425 | 52 | 8FW | 191 | PE | 3 | 759 | 152 |
| 426 | 53 | 8JE | 240 | PE | 3 | 759 | 152 |
| 427 | 54 | 9BW | 255 | PE | 3 | 759 | 152 |
| 428 | 55 | 9DE | 292 | PE | 3 | 759 | 152 |
| 429 | 56 | 9EW | 194 | PE | 2 | 506 | 101 |
| 430 | 57 | 10BW | 290 | RS | 3 | 475 | 0 |
| 431 | 58 | 10CW | 290 | RS | 2 | 316 | 0 |
| 432 | 59 | 10EW | 275 | RS | 3 | 475 | 0 |
| 433 | 60 | 10FE | 290 | RS | 2 | 316 | 0 |
| 434 | 61 | 10GW | 270 | RS | 2 | 316 | 0 |
| 435 | 62 | 10HW | 247 | RS | 2 | 316 | 0 |
| 436 | 63 | 10KE | 290 | RS | 2 | 316 | 0 |
| 437 | 64 | 10KW | 300 | RS | 2 | 316 | 0 |
| 438 | 65 | 2AW | 190 | RS | 3 | 475 | 0 |
| 439 | 66 | 2CE | 235 | RS | 3 | 475 | 0 |
| 440 | 67 | 2EW | 210 | RS | 3 | 475 | 0 |

Confidential and Proprietary, Chusid/Whitehead Associates

| | H | I | J | K | L | M | N |
|---|---|---|---|---|---|---|---|
| 421 | 608 | 4.25 | 587.69 | 386.24 | 476.06 | 509.56 | -33.50 |
| 422 | 405 | 2.83 | 462.65 | 303.55 | 374.41 | 650.00 | -275.59 |
| 423 | 405 | 2.83 | 462.65 | 303.55 | 374.41 | 533.83 | -159.42 |
| 424 | 405 | 2.83 | 477.65 | 313.31 | 386.49 | 409.00 | -22.51 |
| 425 | 608 | 4.25 | 477.65 | 314.72 | 387.48 | 369.00 | 18.48 |
| 426 | 608 | 4.25 | 600.19 | 394.37 | 486.13 | 649.47 | -163.34 |
| 427 | 608 | 4.25 | 637.70 | 418.75 | 516.32 | 1800.00 | -1283.68 |
| 428 | 608 | 4.25 | 730.23 | 478.90 | 590.81 | 1800.00 | -1209.19 |
| 429 | 405 | 2.83 | 485.15 | 318.18 | 392.53 | 502.25 | -109.72 |
| 430 | 475 | 3.32 | 725.23 | 474.72 | 586.13 | 642.00 | -55.87 |
| 431 | 316 | 2.21 | 725.23 | 473.61 | 585.36 | 509.73 | 75.63 |
| 432 | 475 | 3.32 | 687.72 | 450.34 | 555.94 | 1095.00 | -539.06 |
| 433 | 316 | 2.21 | 725.23 | 473.61 | 585.36 | 399.00 | 186.36 |
| 434 | 316 | 2.21 | 675.21 | 441.10 | 545.10 | 389.00 | 156.10 |
| 435 | 316 | 2.21 | 617.70 | 403.71 | 498.79 | 650.00 | -151.21 |
| 436 | 316 | 2.21 | 725.23 | 473.61 | 585.36 | 800.00 | -214.64 |
| 437 | 316 | 2.21 | 750.24 | 489.87 | 605.49 | 836.00 | -230.51 |
| 438 | 475 | 3.32 | 475.15 | 312.17 | 384.82 | 856.00 | -471.18 |
| 439 | 475 | 3.32 | 587.69 | 385.32 | 475.41 | 369.00 | 106.41 |
| 440 | 475 | 3.32 | 525.17 | 344.68 | 425.08 | 585.62 | -160.54 |

Confidential and Proprietary, Chusid/Whitehead Associates

| | A | B | C | D | E | F | G |
|---|---|---|---|---|---|---|---|
| 441 | 68 | 3FW | 176 | RS | 2 | 316 | 0 |
| 442 | 69 | 3GE | 260 | RS | 3 | 475 | 0 |
| 443 | 70 | 3HW | 225 | RS | 3 | 475 | 0 |
| 444 | 71 | 3JE | 215 | RS | 3 | 475 | 0 |
| 445 | 72 | 4FW | 179 | RS | 2 | 316 | 0 |
| 446 | 73 | 4GE | 265 | RS | 3 | 475 | 0 |
| 447 | 74 | 4GW | 265 | RS | 3 | 475 | 0 |
| 448 | 75 | 4HW | 230 | RS | 3 | 475 | 0 |
| 449 | 76 | 4KW | 164 | RS | 2 | 316 | 0 |
| 450 | 77 | 5CE | 225 | RS | 3 | 475 | 0 |
| 451 | 78 | 5EW | 182 | RS | 2 | 316 | 0 |
| 452 | 79 | 5HW | 235 | RS | 3 | 475 | 0 |
| 453 | 80 | 5KE | 167 | RS | 2 | 316 | 0 |
| 454 | 81 | 6AE | 157 | RS | 2 | 316 | 0 |
| 455 | 82 | 6AW | 157 | RS | 2 | 316 | 0 |
| 456 | 83 | 6GE | 275 | RS | 3 | 475 | 0 |
| 457 | 84 | 6GW | 275 | RS | 3 | 475 | 0 |
| 458 | 85 | 6JW | 240 | RS | 3 | 475 | 0 |
| 459 | 86 | 7AW | 163 | RS | 3 | 475 | 0 |
| 460 | 87 | 7BE | 245 | RS | 3 | 475 | 0 |

Confidential and Proprietary, Chusid/Whitehead Associates

| | H | I | J | K | L | M | N |
|---|---|---|---|---|---|---|---|
| 441 | 316 | 2.21 | 440.14 | 288.30 | 355.86 | 299.00 | 56.86 |
| 442 | 475 | 3.32 | 650.21 | 425.95 | 525.74 | 850.00 | -324.26 |
| 443 | 475 | 3.32 | 562.68 | 369.06 | 455.28 | 309.00 | 146.28 |
| 444 | 475 | 3.32 | 537.67 | 352.80 | 435.15 | 556.65 | -121.50 |
| 445 | 316 | 2.21 | 447.64 | 293.18 | 361.90 | 582.93 | -221.03 |
| 446 | 475 | 3.32 | 662.71 | 434.08 | 535.80 | 624.81 | -89.01 |
| 447 | 475 | 3.32 | 662.71 | 434.08 | 535.80 | 591.15 | -55.35 |
| 448 | 475 | 3.32 | 575.18 | 377.19 | 465.35 | 511.56 | -46.21 |
| 449 | 316 | 2.21 | 410.13 | 268.80 | 331.70 | 531.49 | -199.79 |
| 450 | 475 | 3.32 | 562.68 | 369.06 | 455.28 | 718.88 | -263.60 |
| 451 | 316 | 2.21 | 455.14 | 298.06 | 367.94 | 379.00 | -11.06 |
| 452 | 475 | 3.32 | 587.69 | 385.32 | 475.41 | 576.20 | -100.79 |
| 453 | 316 | 2.21 | 417.63 | 273.67 | 337.74 | 379.00 | -41.26 |
| 454 | 316 | 2.21 | 392.62 | 257.42 | 317.61 | 556.40 | -238.79 |
| 455 | 316 | 2.21 | 392.62 | 257.42 | 317.61 | 694.49 | -376.88 |
| 456 | 475 | 3.32 | 687.72 | 450.34 | 555.94 | 800.00 | -244.06 |
| 457 | 475 | 3.32 | 687.72 | 450.34 | 555.94 | 619.00 | -63.06 |
| 458 | 475 | 3.32 | 600.19 | 393.44 | 485.48 | 627.00 | -141.52 |
| 459 | 475 | 3.32 | 407.63 | 268.28 | 330.46 | 850.00 | -519.54 |
| 460 | 475 | 3.32 | 612.69 | 401.57 | 495.54 | 725.00 | -229.46 |

Confidential and Proprietary, Chusid/Whitehead Associates

| | A | B | C | D | E | F | G |
|---|---|---|---|---|---|---|---|
| 461 | 88 | 7BW | 245 | RS | 3 | 475 | 0 |
| 462 | 89 | 7CE | 245 | RS | 3 | 475 | 0 |
| 463 | 90 | 7CW | 245 | RS | 3 | 475 | 0 |
| 464 | 91 | 7EW | 188 | RS | 2 | 316 | 0 |
| 465 | 92 | 7GE | 280 | RS | 3 | 475 | 0 |
| 466 | 93 | 7JE | 235 | RS | 3 | 475 | 0 |
| 467 | 94 | 8AE | 166 | RS | 2 | 316 | 0 |
| 468 | 95 | 8BW | 250 | RS | 3 | 475 | 0 |
| 469 | 96 | 8EE | 191 | RS | 2 | 316 | 0 |
| 470 | 97 | 8HW | 250 | RS | 3 | 475 | 0 |
| 471 | 98 | 8JW | 250 | RS | 3 | 475 | 0 |
| 472 | 99 | 9EE | 194 | RS | 2 | 316 | 0 |
| 473 | 100 | 9HE | 255 | RS | 3 | 475 | 0 |
| 474 | 101 | 10HE | 247 | V | 2 | 506 | 101 |
| 475 | 102 | 1GE | 180 | V | 1.5 | 380 | 76 |
| 476 | 103 | 1JW | 195 | V | 1.5 | 380 | 76 |
| 477 | 104 | 8CW | 250 | V | 3 | 759 | 152 |
| 478 | 105 | 8EW | 191 | V | 2 | 506 | 101 |
| 479 | 106 | 9BE | 255 | V | 3 | 759 | 152 |
| 480 | Total | | 24,087 | | 274 | 47,453 | 9,491 |

Confidential and Proprietary, Chusid/Whitehead Associates

| | H | I | J | K | L | M | N |
|---|---|---|---|---|---|---|---|
| 461 | 475 | 3.32 | 612.69 | 401.57 | 495.54 | 800.00 | -304.46 |
| 462 | 475 | 3.32 | 612.69 | 401.57 | 495.54 | 619.00 | -123.46 |
| 463 | 475 | 3.32 | 612.69 | 401.57 | 495.54 | 802.50 | -306.96 |
| 464 | 316 | 2.21 | 470.15 | 307.81 | 380.02 | 775.00 | -394.98 |
| 465 | 475 | 3.32 | 700.22 | 458.46 | 566.00 | 656.84 | -90.84 |
| 466 | 475 | 3.32 | 587.69 | 385.32 | 475.41 | 319.00 | 156.41 |
| 467 | 316 | 2.21 | 415.13 | 272.05 | 335.73 | 611.93 | -276.20 |
| 468 | 475 | 3.32 | 625.20 | 409.70 | 505.61 | 850.00 | -344.39 |
| 469 | 316 | 2.21 | 477.65 | 312.69 | 386.06 | 389.00 | -2.94 |
| 470 | 475 | 3.32 | 625.20 | 409.70 | 505.61 | 1275.00 | -769.39 |
| 471 | 475 | 3.32 | 625.20 | 409.70 | 505.61 | 1250.00 | -744.39 |
| 472 | 316 | 2.21 | 485.15 | 317.56 | 392.10 | 526.01 | -133.91 |
| 473 | 475 | 3.32 | 637.70 | 417.83 | 515.67 | 850.00 | -334.33 |
| 474 | 405 | 2.83 | 617.70 | 404.33 | 499.23 | 319.00 | 180.23 |
| 475 | 304 | 2.12 | 450.14 | 294.72 | 363.85 | 429.00 | -65.15 |
| 476 | 304 | 2.12 | 487.65 | 319.10 | 394.05 | 429.00 | -34.95 |
| 477 | 608 | 4.25 | 625.20 | 410.63 | 506.26 | 788.67 | -282.41 |
| 478 | 405 | 2.83 | 477.65 | 313.31 | 386.49 | 389.00 | -2.51 |
| 479 | 608 | 4.25 | 637.70 | 418.75 | 516.32 | 319.00 | 197.32 |
| 480 | 45,225 | | 70,816 | | | 66,018.77 | (17,306.97) |

Confidential and Proprietary, Chusid/Whitehead Associates

| | A | B | C | D | E | F | G |
|---|---|---|---|---|---|---|---|
| 481 | | | | | | | |
| 482 | 1- for purposes of shortfall analyses, rent on vacancies is assumed to be $1000 | | | | | | |
| 483 | | | | | | | |
| 484 | VII. MONTHLY DEBT SERVICE SCHEDULE | | | | | | |
| 485 | | | | | | | |
| 486 | MVM | Principal | 2,500,000 | | | | OPA |
| 487 | | Interest | 8.250% | | | | |
| 488 | | Amortization-Yr | 0 | | | | |
| 489 | | Pmt Amount/M | 17,188 | | | | |
| 490 | | | | | | | |
| 491 | | | | | | | |
| 492 | Year | Month | BB | Interest | Prin Amrt | EB | Year |
| 493 | | | | | | | |
| 494 | 1 | 1 | 2,500,000 | 17,188 | 0 | 2,500,000 | 1 |
| 495 | | 2 | 2,500,000 | 17,188 | 0 | 2,500,000 | |
| 496 | | 3 | 2,500,000 | 17,188 | 0 | 2,500,000 | |
| 497 | | 4 | 2,500,000 | 17,188 | 0 | 2,500,000 | |
| 498 | | 5 | 2,500,000 | 17,188 | 0 | 2,500,000 | |
| 499 | | 6 | 2,500,000 | 17,188 | 0 | 2,500,000 | |
| 500 | | 7 | 2,500,000 | 17,188 | 0 | 2,500,000 | |

Confidential and Proprietary, Chusid/Whitehead Associates

| | H | I | J | K | L | M | N |
|---|---|---|---|---|---|---|---|
| 481 | | | | | | | |
| 482 | | | | | | | |
| 483 | | | | | | | |
| 484 | | | | | | | |
| 485 | | | | | | | |
| 486 | Principal | 1,050,000 | | | | | |
| 487 | Interest | 9.000% | | | | | |
| 488 | Amortization-Y | 10 | | | | | |
| 489 | Pmt Amount/M | 13,301 | | | | | |
| 490 | | | | | | | |
| 491 | | | | | | | |
| 492 | Month | BB | Interest | Prin Amrt | EB | | |
| 493 | | | | | | | |
| 494 | 1 | 1,050,000 | 7,875 | 5,426 | 1,044,574 | | |
| 495 | 2 | 1,044,574 | 7,834 | 5,467 | 1,039,107 | | |
| 496 | 3 | 1,039,107 | 7,793 | 5,508 | 1,033,600 | | |
| 497 | 4 | 1,033,600 | 7,752 | 5,549 | 1,028,051 | | |
| 498 | 5 | 1,028,051 | 7,710 | 5,591 | 1,022,460 | | |
| 499 | 6 | 1,022,460 | 7,668 | 5,633 | 1,016,828 | | |
| 500 | 7 | 1,016,828 | 7,626 | 5,675 | 1,011,153 | | |

Confidential and Proprietary, Chusid/Whitehead Associates

| | A | B | C | D | E | F | G |
|---|---|---|---|---|---|---|---|
| 501 | | 8 | 2,500,000 | 17,188 | 0 | 2,500,000 | |
| 502 | | 9 | 2,500,000 | 17,188 | 0 | 2,500,000 | |
| 503 | | 10 | 2,500,000 | 17,188 | 0 | 2,500,000 | |
| 504 | | 11 | 2,500,000 | 17,188 | 0 | 2,500,000 | |
| 505 | | 12 | 2,500,000 | 17,188 | 0 | 2,500,000 | |
| 506 | 2 | 1 | 2,500,000 | 17,188 | 0 | 2,500,000 | 2 |
| 507 | | 2 | 2,500,000 | 17,188 | 0 | 2,500,000 | |
| 508 | | 3 | 2,500,000 | 17,188 | 0 | 2,500,000 | |
| 509 | | 4 | 2,500,000 | 17,188 | 0 | 2,500,000 | |
| 510 | | 5 | 2,500,000 | 17,188 | 0 | 2,500,000 | |
| 511 | | 6 | 2,500,000 | 17,188 | 0 | 2,500,000 | |
| 512 | | 7 | 2,500,000 | 17,188 | 0 | 2,500,000 | |
| 513 | | 8 | 2,500,000 | 17,188 | 0 | 2,500,000 | |
| 514 | | 9 | 2,500,000 | 17,188 | 0 | 2,500,000 | |
| 515 | | 10 | 2,500,000 | 17,188 | 0 | 2,500,000 | |
| 516 | | 11 | 2,500,000 | 17,188 | 0 | 2,500,000 | |
| 517 | | 12 | 2,500,000 | 17,188 | 0 | 2,500,000 | |
| 518 | 3 | 1 | 2,500,000 | 17,188 | 0 | 2,500,000 | 3 |
| 519 | | 2 | 2,500,000 | 17,188 | 0 | 2,500,000 | |
| 520 | | 3 | 2,500,000 | 17,188 | 0 | 2,500,000 | |

Confidential and Proprietary, Chusid/Whitehead Associates

| | H | I | J | K | L | M | N |
|---|---|---|---|---|---|---|---|
| 501 | 8 | 1,011,153 | 7,584 | 5,717 | 1,005,436 | | |
| 502 | 9 | 1,005,436 | 7,541 | 5,760 | 999,675 | | |
| 503 | 10 | 999,675 | 7,498 | 5,803 | 993,872 | | |
| 504 | 11 | 993,872 | 7,454 | 5,847 | 988,025 | | |
| 505 | 12 | 988,025 | 7,410 | 5,891 | 982,134 | | |
| 506 | 1 | 982,134 | 7,366 | 5,935 | 976,199 | | |
| 507 | 2 | 976,199 | 7,321 | 5,979 | 970,220 | | |
| 508 | 3 | 970,220 | 7,277 | 6,024 | 964,196 | | |
| 509 | 4 | 964,196 | 7,231 | 6,069 | 958,126 | | |
| 510 | 5 | 958,126 | 7,186 | 6,115 | 952,011 | | |
| 511 | 6 | 952,011 | 7,140 | 6,161 | 945,850 | | |
| 512 | 7 | 945,850 | 7,094 | 6,207 | 939,643 | | |
| 513 | 8 | 939,643 | 7,047 | 6,254 | 933,390 | | |
| 514 | 9 | 933,390 | 7,000 | 6,301 | 927,089 | | |
| 515 | 10 | 927,089 | 6,953 | 6,348 | 920,741 | | |
| 516 | 11 | 920,741 | 6,906 | 6,395 | 914,346 | | |
| 517 | 12 | 914,346 | 6,858 | 6,443 | 907,903 | | |
| 518 | 1 | 907,903 | 6,809 | 6,492 | 901,411 | | |
| 519 | 2 | 901,411 | 6,761 | 6,540 | 894,870 | | |
| 520 | 3 | 894,870 | 6,712 | 6,589 | 888,281 | | |

Confidential and Proprietary, Chusid/Whitehead Associates

| | A | B | C | D | E | F | G |
|---|---|---|---|---|---|---|---|
| 521 | | 4 | 2,500,000 | 17,188 | 0 | 2,500,000 | |
| 522 | | 5 | 2,500,000 | 17,188 | 0 | 2,500,000 | |
| 523 | | 6 | 2,500,000 | 17,188 | 0 | 2,500,000 | |
| 524 | | 7 | 2,500,000 | 17,188 | 0 | 2,500,000 | |
| 525 | | 8 | 2,500,000 | 17,188 | 0 | 2,500,000 | |
| 526 | | 9 | 2,500,000 | 17,188 | 0 | 2,500,000 | |
| 527 | | 10 | 2,500,000 | 17,188 | 0 | 2,500,000 | |
| 528 | | 11 | 2,500,000 | 17,188 | 0 | 2,500,000 | |
| 529 | | 12 | 2,500,000 | 17,188 | 0 | 2,500,000 | |
| 530 | 4 | 1 | 2,500,000 | 17,188 | 0 | 2,500,000 | 4 |
| 531 | | 2 | 2,500,000 | 17,188 | 0 | 2,500,000 | |
| 532 | | 3 | 2,500,000 | 17,188 | 0 | 2,500,000 | |
| 533 | | 4 | 2,500,000 | 17,188 | 0 | 2,500,000 | |
| 534 | | 5 | 2,500,000 | 17,188 | 0 | 2,500,000 | |
| 535 | | 6 | 2,500,000 | 17,188 | 0 | 2,500,000 | |
| 536 | | 7 | 2,500,000 | 17,188 | 0 | 2,500,000 | |
| 537 | | 8 | 2,500,000 | 17,188 | 0 | 2,500,000 | |
| 538 | | 9 | 2,500,000 | 17,188 | 0 | 2,500,000 | |
| 539 | | 10 | 2,500,000 | 17,188 | 0 | 2,500,000 | |
| 540 | | 11 | 2,500,000 | 17,188 | 0 | 2,500,000 | |

Confidential and Proprietary, Chusid/Whitehead Associates

| | H | I | J | K | L | M | N |
|---|---|---|---|---|---|---|---|
| 521 | 4 | 888,281 | 6,662 | 6,639 | 881,642 | | |
| 522 | 5 | 881,642 | 6,612 | 6,689 | 874,954 | | |
| 523 | 6 | 874,954 | 6,562 | 6,739 | 868,215 | | |
| 524 | 7 | 868,215 | 6,512 | 6,789 | 861,425 | | |
| 525 | 8 | 861,425 | 6,461 | 6,840 | 854,585 | | |
| 526 | 9 | 854,585 | 6,409 | 6,892 | 847,694 | | |
| 527 | 10 | 847,694 | 6,358 | 6,943 | 840,750 | | |
| 528 | 11 | 840,750 | 6,306 | 6,995 | 833,755 | | |
| 529 | 12 | 833,755 | 6,253 | 7,048 | 826,707 | | |
| 530 | 1 | 826,707 | 6,200 | 7,101 | 819,607 | | |
| 531 | 2 | 819,607 | 6,147 | 7,154 | 812,453 | | |
| 532 | 3 | 812,453 | 6,093 | 7,208 | 805,245 | | |
| 533 | 4 | 805,245 | 6,039 | 7,262 | 797,983 | | |
| 534 | 5 | 797,983 | 5,985 | 7,316 | 790,667 | | |
| 535 | 6 | 790,667 | 5,930 | 7,371 | 783,296 | | |
| 536 | 7 | 783,296 | 5,875 | 7,426 | 775,870 | | |
| 537 | 8 | 775,870 | 5,819 | 7,482 | 768,388 | | |
| 538 | 9 | 768,388 | 5,763 | 7,538 | 760,850 | | |
| 539 | 10 | 760,850 | 5,706 | 7,595 | 753,256 | | |
| 540 | 11 | 753,256 | 5,649 | 7,652 | 745,604 | | |

Confidential and Proprietary, Chusid/Whitehead Associates

| | A | B | C | D | E | F | G |
|---|---|---|---|---|---|---|---|
| 541 | | 12 | 2,500,000 | 17,188 | 0 | 2,500,000 | |
| 542 | 5 | 1 | 2,500,000 | 17,188 | 0 | 2,500,000 | 5 |
| 543 | | 2 | 2,500,000 | 17,188 | 0 | 2,500,000 | |
| 544 | | 3 | 2,500,000 | 17,188 | 0 | 2,500,000 | |
| 545 | | 4 | 2,500,000 | 17,188 | 0 | 2,500,000 | |
| 546 | | 5 | 2,500,000 | 17,188 | 0 | 2,500,000 | |
| 547 | | 6 | 2,500,000 | 17,188 | 0 | 2,500,000 | |
| 548 | | 7 | 2,500,000 | 17,188 | 0 | 2,500,000 | |
| 549 | | 8 | 2,500,000 | 17,188 | 0 | 2,500,000 | |
| 550 | | 9 | 2,500,000 | 17,188 | 0 | 2,500,000 | |
| 551 | | 10 | 2,500,000 | 17,188 | 0 | 2,500,000 | |
| 552 | | 11 | 2,500,000 | 17,188 | 0 | 2,500,000 | |
| 553 | | 12 | 2,500,000 | 17,188 | 0 | 2,500,000 | |
| 554 | 6 | 1 | 2,500,000 | 17,188 | 0 | 2,500,000 | 6 |
| 555 | | 2 | 2,500,000 | 17,188 | 0 | 2,500,000 | |
| 556 | | 3 | 2,500,000 | 17,188 | 0 | 2,500,000 | |
| 557 | | 4 | 2,500,000 | 17,188 | 0 | 2,500,000 | |
| 558 | | 5 | 2,500,000 | 17,188 | 0 | 2,500,000 | |
| 559 | | 6 | 2,500,000 | 17,188 | 0 | 2,500,000 | |
| 560 | | 7 | 2,500,000 | 17,188 | 0 | 2,500,000 | |

Confidential and Proprietary, Chusid/Whitehead Associates

| | H | I | J | K | L | M | N |
|---|---|---|---|---|---|---|---|
| 541 | 12 | 745,604 | 5,592 | 7,709 | 737,895 | | |
| 542 | 1 | 737,895 | 5,534 | 7,767 | 730,128 | | |
| 543 | 2 | 730,128 | 5,476 | 7,825 | 722,303 | | |
| 544 | 3 | 722,303 | 5,417 | 7,884 | 714,420 | | |
| 545 | 4 | 714,420 | 5,358 | 7,943 | 706,477 | | |
| 546 | 5 | 706,477 | 5,299 | 8,002 | 698,475 | | |
| 547 | 6 | 698,475 | 5,239 | 8,062 | 690,412 | | |
| 548 | 7 | 690,412 | 5,178 | 8,123 | 682,289 | | |
| 549 | 8 | 682,289 | 5,117 | 8,184 | 674,105 | | |
| 550 | 9 | 674,105 | 5,056 | 8,245 | 665,860 | | |
| 551 | 10 | 665,860 | 4,994 | 8,307 | 657,553 | | |
| 552 | 11 | 657,553 | 4,932 | 8,369 | 649,184 | | |
| 553 | 12 | 649,184 | 4,869 | 8,432 | 640,752 | | |
| 554 | 1 | 640,752 | 4,806 | 8,495 | 632,257 | | |
| 555 | 2 | 632,257 | 4,742 | 8,559 | 623,698 | | |
| 556 | 3 | 623,698 | 4,678 | 8,623 | 615,074 | | |
| 557 | 4 | 615,074 | 4,613 | 8,688 | 606,386 | | |
| 558 | 5 | 606,386 | 4,548 | 8,753 | 597,633 | | |
| 559 | 6 | 597,633 | 4,482 | 8,819 | 588,815 | | |
| 560 | 7 | 588,815 | 4,416 | 8,885 | 579,930 | | |

Confidential and Proprietary, Chusid/Whitehead Associates

| | A | B | C | D | E | F | G |
|---|---|---|---|---|---|---|---|
| 561 | | 8 | 2,500,000 | 17,188 | 0 | 2,500,000 | |
| 562 | | 9 | 2,500,000 | 17,188 | 0 | 2,500,000 | |
| 563 | | 10 | 2,500,000 | 17,188 | 0 | 2,500,000 | |
| 564 | | 11 | 2,500,000 | 17,188 | 0 | 2,500,000 | |
| 565 | | 12 | 2,500,000 | 17,188 | 0 | 2,500,000 | |
| 566 | 7 | 1 | 2,500,000 | 17,188 | 0 | 2,500,000 | 7 |
| 567 | | 2 | 2,500,000 | 17,188 | 0 | 2,500,000 | |
| 568 | | 3 | 2,500,000 | 17,188 | 0 | 2,500,000 | |
| 569 | | 4 | 2,500,000 | 17,188 | 0 | 2,500,000 | |
| 570 | | 5 | 2,500,000 | 17,188 | 0 | 2,500,000 | |
| 571 | | 6 | 2,500,000 | 17,188 | 0 | 2,500,000 | |
| 572 | | 7 | 2,500,000 | 17,188 | 0 | 2,500,000 | |
| 573 | | 8 | 2,500,000 | 17,188 | 0 | 2,500,000 | |
| 574 | | 9 | 2,500,000 | 17,188 | 0 | 2,500,000 | |
| 575 | | 10 | 2,500,000 | 17,188 | 0 | 2,500,000 | |
| 576 | | 11 | 2,500,000 | 17,188 | 0 | 2,500,000 | |
| 577 | | 12 | 2,500,000 | 17,188 | 0 | 2,500,000 | |
| 578 | 8 | 1 | 2,500,000 | 17,188 | 0 | 2,500,000 | 8 |
| 579 | | 2 | 2,500,000 | 17,188 | 0 | 2,500,000 | |
| 580 | | 3 | 2,500,000 | 17,188 | 0 | 2,500,000 | |

Confidential and Proprietary, Chusid/Whitehead Associates

| | H | I | J | K | L | M | N |
|---|---|---|---|---|---|---|---|
| 561 | 8 | 579,930 | 4,349 | 8,951 | 570,978 | | |
| 562 | 9 | 570,978 | 4,282 | 9,019 | 561,960 | | |
| 563 | 10 | 561,960 | 4,215 | 9,086 | 552,873 | | |
| 564 | 11 | 552,873 | 4,147 | 9,154 | 543,719 | | |
| 565 | 12 | 543,719 | 4,078 | 9,223 | 534,496 | | |
| 566 | 1 | 534,496 | 4,009 | 9,292 | 525,204 | | |
| 567 | 2 | 525,204 | 3,939 | 9,362 | 515,842 | | |
| 568 | 3 | 515,842 | 3,869 | 9,432 | 506,410 | | |
| 569 | 4 | 506,410 | 3,798 | 9,503 | 496,907 | | |
| 570 | 5 | 496,907 | 3,727 | 9,574 | 487,333 | | |
| 571 | 6 | 487,333 | 3,655 | 9,646 | 477,687 | | |
| 572 | 7 | 477,687 | 3,583 | 9,718 | 467,968 | | |
| 573 | 8 | 467,968 | 3,510 | 9,791 | 458,177 | | |
| 574 | 9 | 458,177 | 3,436 | 9,865 | 448,313 | | |
| 575 | 10 | 448,313 | 3,362 | 9,939 | 438,374 | | |
| 576 | 11 | 438,374 | 3,288 | 10,013 | 428,361 | | |
| 577 | 12 | 428,361 | 3,213 | 10,088 | 418,273 | | |
| 578 | 1 | 418,273 | 3,137 | 10,164 | 408,109 | | |
| 579 | 2 | 408,109 | 3,061 | 10,240 | 397,869 | | |
| 580 | 3 | 397,869 | 2,984 | 10,317 | 387,552 | | |

Confidential and Proprietary, Chusid/Whitehead Associates

| | A | B | C | D | E | F | G |
|---|---|---|---|---|---|---|---|
| 581 | | 4 | 2,500,000 | 17,188 | 0 | 2,500,000 | |
| 582 | | 5 | 2,500,000 | 17,188 | 0 | 2,500,000 | |
| 583 | | 6 | 2,500,000 | 17,188 | 0 | 2,500,000 | |
| 584 | | 7 | 2,500,000 | 17,188 | 0 | 2,500,000 | |
| 585 | | 8 | 2,500,000 | 17,188 | 0 | 2,500,000 | |
| 586 | | 9 | 2,500,000 | 17,188 | 0 | 2,500,000 | |
| 587 | | 10 | 2,500,000 | 17,188 | 0 | 2,500,000 | |
| 588 | | 11 | 2,500,000 | 17,188 | 0 | 2,500,000 | |
| 589 | | 12 | 2,500,000 | 17,188 | 0 | 2,500,000 | |
| 590 | 9 | 1 | 2,500,000 | 17,188 | 0 | 2,500,000 | 9 |
| 591 | | 2 | 2,500,000 | 17,188 | 0 | 2,500,000 | |
| 592 | | 3 | 2,500,000 | 17,188 | 0 | 2,500,000 | |
| 593 | | 4 | 2,500,000 | 17,188 | 0 | 2,500,000 | |
| 594 | | 5 | 2,500,000 | 17,188 | 0 | 2,500,000 | |
| 595 | | 6 | 2,500,000 | 17,188 | 0 | 2,500,000 | |
| 596 | | 7 | 2,500,000 | 17,188 | 0 | 2,500,000 | |
| 597 | | 8 | 2,500,000 | 17,188 | 0 | 2,500,000 | |
| 598 | | 9 | 2,500,000 | 17,188 | 0 | 2,500,000 | |
| 599 | | 10 | 2,500,000 | 17,188 | 0 | 2,500,000 | |
| 600 | | 11 | 2,500,000 | 17,188 | 0 | 2,500,000 | |

Confidential and Proprietary, Chusid/Whitehead Associates

| | H | I | J | K | L | M | N |
|---|---|---|---|---|---|---|---|
| 581 | 4 | 387,552 | 2,907 | 10,394 | 377,157 | | |
| 582 | 5 | 377,157 | 2,829 | 10,472 | 366,685 | | |
| 583 | 6 | 366,685 | 2,750 | 10,551 | 356,134 | | |
| 584 | 7 | 356,134 | 2,671 | 10,630 | 345,504 | | |
| 585 | 8 | 345,504 | 2,591 | 10,710 | 334,795 | | |
| 586 | 9 | 334,795 | 2,511 | 10,790 | 324,005 | | |
| 587 | 10 | 324,005 | 2,430 | 10,871 | 313,134 | | |
| 588 | 11 | 313,134 | 2,349 | 10,952 | 302,181 | | |
| 589 | 12 | 302,181 | 2,266 | 11,035 | 291,147 | | |
| 590 | 1 | 291,147 | 2,184 | 11,117 | 280,029 | | |
| 591 | 2 | 280,029 | 2,100 | 11,201 | 268,828 | | |
| 592 | 3 | 268,828 | 2,016 | 11,285 | 257,544 | | |
| 593 | 4 | 257,544 | 1,932 | 11,369 | 246,174 | | |
| 594 | 5 | 246,174 | 1,846 | 11,455 | 234,720 | | |
| 595 | 6 | 234,720 | 1,760 | 11,541 | 223,179 | | |
| 596 | 7 | 223,179 | 1,674 | 11,627 | 211,552 | | |
| 597 | 8 | 211,552 | 1,587 | 11,714 | 199,838 | | |
| 598 | 9 | 199,838 | 1,499 | 11,802 | 188,036 | | |
| 599 | 10 | 188,036 | 1,410 | 11,891 | 176,145 | | |
| 600 | 11 | 176,145 | 1,321 | 11,980 | 164,165 | | |

Confidential and Proprietary, Chusid/Whitehead Associates

| | A | B | C | D | E | F | G |
|---|---|---|---|---|---|---|---|
| 601 | | 12 | 2,500,000 | 17,188 | 0 | 2,500,000 | |
| 602 | 10 | 1 | 2,500,000 | 17,188 | 0 | 2,500,000 | 10 |
| 603 | | 2 | 2,500,000 | 17,188 | 0 | 2,500,000 | |
| 604 | | 3 | 2,500,000 | 17,188 | 0 | 2,500,000 | |
| 605 | | 4 | 2,500,000 | 17,188 | 0 | 2,500,000 | |
| 606 | | 5 | 2,500,000 | 17,188 | 0 | 2,500,000 | |
| 607 | | 6 | 2,500,000 | 17,188 | 0 | 2,500,000 | |
| 608 | | 7 | 2,500,000 | 17,188 | 0 | 2,500,000 | |
| 609 | | 8 | 2,500,000 | 17,188 | 0 | 2,500,000 | |
| 610 | | 9 | 2,500,000 | 17,188 | 0 | 2,500,000 | |
| 611 | | 10 | 2,500,000 | 17,188 | 0 | 2,500,000 | |
| 612 | | 11 | 2,500,000 | 17,188 | 0 | 2,500,000 | |
| 613 | | 12 | 2,500,000 | 17,188 | 0 | 2,500,000 | |

Confidential and Proprietary, Chusid/Whitehead Associates

| | H | I | J | K | L | M | N |
|---|---|---|---|---|---|---|---|
| 601 | 12 | 164,165 | 1,231 | 12,070 | 152,095 | | |
| 602 | 1 | 152,095 | 1,141 | 12,160 | 139,935 | | |
| 603 | 2 | 139,935 | 1,050 | 12,251 | 127,684 | | |
| 604 | 3 | 127,684 | 958 | 12,343 | 115,340 | | |
| 605 | 4 | 115,340 | 865 | 12,436 | 102,904 | | |
| 606 | 5 | 102,904 | 772 | 12,529 | 90,375 | | |
| 607 | 6 | 90,375 | 678 | 12,623 | 77,752 | | |
| 608 | 7 | 77,752 | 583 | 12,718 | 65,034 | | |
| 609 | 8 | 65,034 | 488 | 12,813 | 52,221 | | |
| 610 | 9 | 52,221 | 392 | 12,909 | 39,312 | | |
| 611 | 10 | 39,312 | 295 | 13,006 | 26,306 | | |
| 612 | 11 | 26,306 | 197 | 13,104 | 13,202 | | |
| 613 | 12 | 13,202 | 99 | 13,202 | 0 | | |

What is claimed is:

1. A method for implementing by a computer, a restructuring exchange of an excessive debt defined by an underlying mortgage on a property having a property value so that the total amount of the restructured debt remains substantially the same as a remaining unpaid principal balance of the underlying mortgage prior to the restructuring exchange, said property being owned by a plurality of shareholders each owning at least one share defining for each said shareholder a pro rata portion of the property and each holding a proprietary lease on a predetermined portion of the property and each said shareholder paying a periodic assessment representing the shareholder's pro rata share of a periodic payment due on the underlying mortgage, said method comprising:

determining a remaining unpaid principal balance of the underlying mortgage;

determining a current desired mortgage amount which is less than the value of the property;

defining a desired mortgage secured by the property and having a principal equal to the current desired mortgage amount;

calculating an excess portion of the underlying mortgage by subtracting the current desired mortgage amount from the remaining unpaid principal balance of the underlying mortgage;

defining an excess portion mortgage secured by an assessment on shareholders in the amount of the excess portion mortgage which in turn is secured by a first lien on the shares and proprietary lease of each said shareholder and having a principal equal to the excess portion of the underlying mortgage;

transforming the underlying mortgage into a restructured debt by exchanging the underlying mortgage for a combination of the desired mortgage amount and the excess portion mortgage, whereby a sum of the principals of the desired mortgage and excess portion mortgage is substantially the same as the unpaid principal balance of the existing underlying mortgage;

calculating by said computer for each shareholder:

(a) a periodic payment representing each shareholder's pro rata portion of a periodic payment due on the desired mortgage; and (b) a periodic payment representing each shareholder's pro rata portion of a periodic payment due on the excess portion mortgage.

2. The method for implementing a restructuring exchange of an excessive undivided debt as set forth in claim 1 comprising the additional step of printing on a printing means for each shareholder a report listing the periodic payments in said calculating step.

3. The method for implementing a restructuring exchange of an excessive undivided debt as set forth in claim 1 wherein after said periodic payment representing each said shareholder's pro rata proportion of a periodic payment due on the excess portion mortgage is calculated, calculating by said computer a sequence of amounts, each said amount representing a total payment, for a predetermined point in time, required to fully satisfy at said time each said shareholder's remaining periodic payment obligations under the excess portion mortgage, said each shareholder being obligated to fully satisfy each shareholder's remaining periodic payment obligations under the excess portion mortgage upon a sale of the at least one share of each shareholder into a data processing system.

4. The method for implementing a restructuring exchange of an excessive undivided debt as set forth in claim 1 comprising the additional step of printing on a printing means for each shareholder a report listing said sequence of amounts.

5. The method for implementing a restructuring exchange of an excessive undivided debt as set forth in claim 1 wherein in said calculating an excess portion of the underlying mortgage step, said excess portion of the underlying mortgage is calculated on a means for entering said excess portion mortgage.

6. The method for implementing a restructuring exchange of an excessive undivided debt as set forth in claim 1 wherein, the system prints a report on said output means which details the excess portion of the underlying mortgage, the principal balance and payments of the excess portion of the underlying mortgage and the interest paid by the shareholder.

7. The method for implementing a restructuring exchange of an excessive undivided debt as set forth in claim 1 wherein said calculating for each shareholder step is calculated on a data input means having a data entry means and a processing unit for calculating said periodic payments and said sequence of amounts.

8. A method for implementing a restructuring exchange of an excessive undivided debt defined by an underlying mortgage on a property having a property value so that the total amount of the restructured debt remains substantially the same as a principal balance of the underlying mortgage prior to the restructuring exchange, said property being owned by a plurality of shareholders each owning at least one share defining for each said shareholder a pro rata portion of the property and each holding a proprietary lease on a predetermined portion of the property and each said shareholder paying a periodic assessment representing the shareholder's pro rata share of a periodic payment due on the underlying mortgage, said method comprising:

determining a remaining proposed principal balance of the underlying mortgage;

determining a current desired mortgage amount which is less than the value of the property;

defining a desired mortgage secured by the property and having a principal equal to the current desired mortgage amount;

calculating an excess portion of the underlying mortgage by subtracting the current desired mortgage amount from the remaining proposed principal balance of the underlying mortgage;

defining an excess portion mortgage secured by an assessment on shareholders in the amount of the excess portion mortgage which is secured by a first lien on the shares and proprietary lease of each said shareholder and having a principal equal to the excess portion of the underlying mortgage;

transforming the underlying mortgage into a restructured debt by exchanging the underlying mortgage for a combination of the desired mortgage and the excess portion mortgage, whereby a sum of the principals of the desired mortgage and excess portion mortgage is substantially the same as the unpaid principal balance of the proposed underlying mortgage;

calculating by a computer for each shareholder:

(a) a periodic payment representing each shareholder's pro rata portion of a periodic payment due on the desired mortgage; and (b) a periodic payment representing each shareholder's pro rata proportion of a periodic payment due on the excess portion mortgage.

9. The method for implementing a restructuring exchange of an excessive undivided debt as set forth in claim 8 comprising the additional step of printing on a printing means for each shareholder a report listing the periodic payments in said calculating step.

10. The method for implementing a restructuring exchange of an excessive undivided debt as set forth in claim 8 wherein after said periodic payment representing each said shareholder's pro rata proportion of a periodic payment due on the excess portion mortgage is calculated, calculating by said computer a sequence of amounts, each said amount representing a total payment, for a predetermined point in time, required to fully satisfy at said time each said shareholder's remaining periodic payment obligations under the excess portion mortgage, said each shareholder being obligated to fully satisfy each shareholder's remaining periodic payment obligations under the excess portion mortgage upon a sale of the at least one share of each shareholder into a data processing system.

11. The method for implementing a restructuring exchange of an excessive undivided debt as set forth in claim 8 comprising the additional step of printing on a printing means for each shareholder a report listing said sequence of amounts.

* * * * *